(12) United States Patent
Goren

(10) Patent No.: US 7,190,351 B1
(45) Date of Patent: *Mar. 13, 2007

(54) SYSTEM AND METHOD FOR DATA INPUT

(76) Inventor: Michael Goren, 17 Dublin Dr., Niskayuna, NY (US) 12309

( * ) Notice: Subject to any disclaimer, the term of this patent is extended or adjusted under 35 U.S.C. 154(b) by 704 days.

This patent is subject to a terminal disclaimer.

(21) Appl. No.: 10/142,506

(22) Filed: May 10, 2002

(51) Int. Cl.
*G09G 5/00* (2006.01)
(52) U.S. Cl. ............... 345/173; 345/156; 715/864
(58) Field of Classification Search ........... 345/156, 345/169–173; 715/840, 841, 854, 713, 864; 455/556.1, 556.2
See application file for complete search history.

(56) References Cited

U.S. PATENT DOCUMENTS

| | | | |
|---|---|---|---|
| 4,737,980 A | 4/1988 | Curtin et al. | |
| 4,804,279 A | 2/1989 | Berkelmans et al. | 400/94 |
| 4,913,573 A | 4/1990 | Retter | 400/489 |
| 5,003,301 A | 3/1991 | Romberg | 340/711 |
| 5,109,352 A | 4/1992 | O'Dell | 395/150 |
| 5,124,702 A | 6/1992 | van Ardenne | 341/22 |
| 5,148,155 A | 9/1992 | Martin et al. | 340/712 |
| 5,210,689 A | 5/1993 | Baker et al. | 364/419 |
| 5,252,951 A | 10/1993 | Tannenbaum et al. | |
| 5,260,697 A | 11/1993 | Barrett et al. | 345/173 |
| 5,521,986 A | 5/1996 | Curtin, II et al. | |
| 5,604,861 A | 2/1997 | Douglas et al. | |
| 5,613,137 A | 3/1997 | Bertram et al. | 395/800 |
| 5,627,980 A | 5/1997 | Schilit et al. | |
| 5,657,378 A | 8/1997 | Haddock et al. | 379/93.23 |
| 5,664,896 A | 9/1997 | Blumberg | 400/485 |
| 5,681,220 A | 10/1997 | Bertram et al. | 463/37 |
| 5,689,253 A | 11/1997 | Hargreaves et al. | 341/22 |
| 5,786,776 A | 7/1998 | Kisaichi et al. | 341/23 |
| 5,790,115 A | 8/1998 | Pleyer et al. | 345/327 |

(Continued)

FOREIGN PATENT DOCUMENTS

| | | |
|---|---|---|
| AU | 693553 | 11/1998 |
| NZ | 285346 | 6/1999 |

OTHER PUBLICATIONS

Miika Silfverberg, I. Scott MacKenzie, and Panu Korhonen, Predicting Text Entry Speed on Mobile Phones, Apr. 2000, 30 pages. Pages from www.thumscript.com downloaded Jan. 4, 2002, publication date unknown.

*Primary Examiner*—Alexander Eisen
(74) *Attorney, Agent, or Firm*—Fliesler Meyer LLP

(57) ABSTRACT

The invention provides a system and a method for data input that can be used with or incorporated into electronic, computer, and portable devices. The interface includes a small set of control buttons or keys that are used to provide access to an associated set of secondary keys, from which the user can select a character for input into the device. Intelligent ordering and grouping of the control and secondary keys allows the user to input information in a manner conducive to speed, accuracy, and ease of use, while the interface can be minimized to require less real estate than traditional keyboards. In accordance with one embodiment, a set of characters or symbols is divided into subsets, each subset being represented by a control button. Selecting a control button displays a secondary set of buttons representing actual characters or symbols that can be selected, stored, or displayed.

6 Claims, 35 Drawing Sheets

U.S. PATENT DOCUMENTS

| | | | |
|---|---|---|---|
| 5,797,098 A | 8/1998 | Schroeder et al. | 455/464 |
| 5,799,267 A | 8/1998 | Siegal | 704/1 |
| 5,870,492 A | 2/1999 | Shimizu et al. | 382/187 |
| 5,875,311 A | 2/1999 | Bertram et al. | 395/309 |
| 5,889,506 A | 3/1999 | Lopresti et al. | |
| 5,896,126 A | 4/1999 | Shieh | 345/173 |
| 5,900,864 A | 5/1999 | MacDonald | 345/172 |
| 5,924,803 A | 7/1999 | Curtin, IV et al. | |
| 5,943,044 A | 8/1999 | Martinelli et al. | 345/174 |
| 5,945,928 A | 8/1999 | Kushler et al. | 341/28 |
| 5,956,021 A | 9/1999 | Kubota et al. | 345/179 |
| 5,974,238 A | 10/1999 | Chase, Jr. | 395/200.78 |
| 5,982,303 A | 11/1999 | Smith | 341/22 |
| 5,990,890 A | 11/1999 | Etheredge | 345/347 |
| 6,002,390 A | 12/1999 | Masui | |
| 6,005,496 A | 12/1999 | Hargreaves et al. | 341/22 |
| 6,008,799 A | 12/1999 | Van Kleeck | 345/173 |
| 6,011,554 A | 1/2000 | King et al. | 345/352 |
| 6,016,142 A | 1/2000 | Chang et al. | 345/334 |
| 6,094,197 A | 7/2000 | Buxton et al. | 345/358 |
| 6,098,086 A | 8/2000 | Krueger | 707/535 |
| 6,121,960 A | 9/2000 | Carroll et al. | 345/173 |
| 6,169,538 B1 | 1/2001 | Nowlan et al. | 345/168 |
| 6,204,848 B1 * | 3/2001 | Nowlan et al. | 715/810 |
| 6,271,835 B1 | 8/2001 | Hoeksma | 345/168 |
| 6,295,052 B1 | 9/2001 | Kato | 345/179 |
| 6,307,541 B1 | 10/2001 | Ho et al. | 345/171 |
| 6,320,570 B2 | 11/2001 | Robb | 345/179 |
| 6,323,846 B1 | 11/2001 | Westerman et al. | |
| 6,377,966 B1 | 4/2002 | Cooper et al. | 707/542 |
| 6,389,386 B1 | 5/2002 | Hetherington | 704/8 |
| 6,405,060 B1 * | 6/2002 | Schroeder et al. | 455/566 |
| 6,597,345 B2 * | 7/2003 | Hirshberg | 345/168 |
| 6,812,940 B2 * | 11/2004 | Arnold | 715/817 |
| 2005/0022140 A1 * | 1/2005 | Vale | 715/864 |

* cited by examiner

SYSTEM AND METHOD FOR DATA INPUT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention provides a system and a method for data input that can be used with electronic devices to allow a user to enter input via a control key or device mechanism.

CROSS REFERENCE TO RELATED APPLICATIONS

This application is related to United States Patent Application entitled "RAPID ENTRY OF DATA AND INFORMATION ON A REDUCED SIZE INPUT AREA", Ser. No. 09/592,323, filed Jun. 13, 2000, which is herein incorporated by reference in its entirety.

BACKGROUND OF THE INVENTION

The ever increasing number of portable handheld devices, and other electronic devices, have placed demands on manufacturers to create new techniques and mechanisms by which to enter data and information into a device. For example, the common PDA device in everyday usage is typically used for storing addresses and contact information, in addition to schedules and other types of data storage. Such a device normally requires the user to enter data within a small input space. Typically these input mechanisms used for data entry are unwieldy or difficult to learn. Even when proficient, the user is often hampered by this small space within which data is entered. As a result many users find the data input speed is quite low, and typing accuracy is diminished compared to full size keyboards that are traditionally used with conventional computer systems. This barrier tends to discourage users from entering large amounts of data into the device, and as such most PDA devices are largely used merely to passively read or to access data already stored either in the device or elsewhere, including increasingly on the Web. While the typical PDA is very useful for such purposes, it's alternate purpose as a data-input device has been much less favored.

As each new electronic, portable, or PDA type device is created, manufacturers have attempted to create new mechanisms for data entry, including such mechanisms as small touch screen devices, character recognition including handwriting recognition, small keyboard style mechanisms, chorded keyboards, and wheel type or jog devices for selecting particular keys. Another common alternatives is to provide mechanical add-ons, such as plug-in keyboards that can be used with the device to allow the user to enter occasional data. The field of such devices and applications has grown in recent years to include PDA devices, gaming machines, cell phones, Web appliances such as small computers with a Web-enabled screen, handheld devices, pagers, email devices, digital remote controls with display screens, corporate handheld devices such as used by delivery drivers and law enforcement professionals, medical devices, information kiosks which are often found in airports and hotels, and Automatic Teller Machines (ATM's). Some or all of these devices currently make use of technologies such as add-on keyboards and/or touch screen devices, to allow a user to enter data in a reasonably easy manner, but with widely varying degrees of success.

Some manufacturers have attempted to address the data input issue by using handwriting recognition as it is applied to a touch sensitive display. For example, the Palm Graffiti language, and the Handspring means of data entry, uses a stylus that is applied to a touch screen device to enter data in a handwritten manner. The disadvantage of such systems is that the shorthand type of data entry must be learned before using the device, and requires sufficiently accurate handwriting on the part of the user. The learning curve can be somewhat substantial at times, in that for example the Graffiti letters do not typically look like the letters they are supposed to represent. In addition, the Graffiti language is often written in a particular part of the screen one letter at a time, making it uncomfortable for a user to learn, and often resulting in a reduction in potential data entry speed. Systems such as Graffiti often require recalibration of the device, particularly if the device is shared by two or more users who have different handwriting characteristics.

Some manufacturers have expanded on the Graffiti language to create methods of data entry by character recognition that approximates the normal handwritten language more closely. One such example of this system is the "Jot" system by Communication in Intelligence Corporation. Jot allows the user to write characters directly on a Palm screen, with uppercase letters in one section of the screen, and lowercase letters in another section. Numbers can be written on another section. However, the letters do not appear exactly as the alphabet and the issues of adequate penmanship and multiple users is the same with the Jot system as with the normal Graffiti system. Other manufacturers such as Electric Pocket, Informal Software, and Paragon Software have also developed systems for data entry that use one or more of the Graffiti style of data input and suffer from the same problems.

An alternate form of data entry in such handheld and other electronic devices is voice input. Some systems provide a speech input platform that allows a user to enter data using just the user's voice. However, the accuracy may vary widely not only between users but also for one user on certain days if the user's voice is affected. In addition, many users are unfamiliar with the mode of entering data by voice, and prefer to be able to enter data by text or on the screen in some manner.

Blackberry style devices, and other small portable devices such as Web-enabled cell phones, and PDA style cell phones, sometimes provide a keypad for use in data entry. The keypad is often a QWERTY style keypad with a full character set. However, the buttons are typically very small, and difficult to use, which reduces the overall speed in which a user can type. Some keypads do not provide a full QWERTY style keypad but instead assign two or more characters to each button. However, this problem usually requires a user to take many additional steps to input a particular key, and is often cumbersome to use. Other manufacturers use on-screen QWERTY style keyboards to allow a user to select one or more keys from a full on-screen displayed keyboard. However, these systems are typically not very fast, and also suffer from the fact that they use too much of the available real estate of the device.

Other keyboard mechanisms and modifications which have been used in the past to allow for data entry on small handheld devices include the chorded keywords often found in DVORAK keyboards and predictive text inputs for telephone-style keypads such as those supplied by Tegic or Eatoni Ergonomics, which attempt to predict a user's data input by the phrase that appears before the present input.

When a user inputs data through a small QWERTY keyboard with small keys or tiny buttons, speed and accuracy are reduced because the keyboards are typically awkward and not ergonomic. QWERTY keyboards will always pose the problem of needing to hunt and peck, and therefore more space is required which in turn increases the size of the device or requires yet another device. Portable folding QWERTY keyboards attachable to handhelds and sized at full or near full scale are essentially extra luggage, increasing weight and space needs for mobile users.

Cell phone input of information via small alphanumeric keys is cumbersome, slow and inaccurate, and multitapping on telephone keypads is awkward. Reduced keyboard disambiguating programs are usually inefficient, prone to error and often require the user to choose from a long list of potential words to find a word that is derived from any certain combination of keystrokes. This requires pressing a sequence of keys and then filtering the word out from a list. Additionally, the device may need to use a large amount of storage capacity in order to process this information. Also, disambiguating programs may be less useful when more than one language is used. Another problem is the cost and placement of the button-type alphanumeric keyboard on a device such as a cell phone, so that it does not take away space from the small display screens found on the device. The newer Internet enabled PDA-cell phone hybrids need an improved input method and system to best realize their potential.

Pen-based methods of input have advantages over smaller keyboards, but are also cumbersome and require learning handwritten symbols. The computer is required to translate the handwritten symbols of a new alphabet into known associated characters. Users must convert into a new alphabet and the devices are prone to mismatching symbols. Users with poor handwriting are disadvantaged with Graffiti type input. In addition, many users do not like the ergonomic feel of writing on glass.

Auditory input methods are improving, but there are many reasons why a user will want to have the ability to input without speaking. Many users find it easier to convey their ideas by writing or typing rather than through dictating into a device. Also, there are many settings in which the user will not want to be overheard.

Full on-screen keyboards take up a good deal of display space and also require the user to hunt and peck. Even full desktop keyboards not only take up a good deal of room, but require all but reasonably expert typists to "hunt and peck" over a large keyboard. This is similar for wireless keyboards.

All of the conventional interfaces and input means and systems have substantial drawbacks for easy, rapid and accurate input. Users find the above input methods to be either not truly portable, or slow and frustrating to use.

SUMMARY OF THE INVENTION

Generally described, the invention provides a system and a method for data input that can be incorporated into electronic devices to allow a user to enter input data and information via a keyboard-type mechanism. None of the traditional methods satisfactorily address the need for accurate, quick entry of text or other types of data or information into small portable handheld electronic devices. Yet users are finding tremendous value in devices that have a small overall size and that maximize viewing area on the display screen of such device. The invention can be used to provide a better user interface for inputting data in a more user-friendly manner, and can be used with, or incorporated into a wide variety of electronic, computer, or portable devices including PDAs, Web Tablets, Web Pads, Internet appliances, game devices, interactive TVs devices, digital remote controls, touch screen devices, key entry devices, email access devices, viewing devices, avionic display screens, portable computing devices, video display devices, joysticks, goggles, binoculars, eyeglass display screens, computers, pagers, PDA/Cell phone hybrids, portable input devices, personal communication devices, field personnel data entry devices and cellular telephones.

As described herein, the traditional notion of a miniaturized, but otherwise conventional, keyboard arrangement is replaced by an interface having a small set of control buttons or keys that can be used to provide access to an associated set of secondary keys, from which the user can select a character for entry into the device. Intelligent, and in many aspects intuitive, ordering and grouping of both the control and the secondary keys allows the user to enter input into the device in a manner conducive to speed, accuracy, and ease of use, while the interface can be made physically smaller and require less "real estate" of the device than traditional keyboard arrangements. As used herein the terms "intelligent", "intuitive", "standard", "standardized", "related", "well known", "learned", "predictive", "sequential", and other related terms, are used in a variety of contexts to refer to a relative arrangement of keys or buttons (and the characters, letters, numbers, or symbols represented by those keys or buttons) that are distributed or related in such a manner that they make sense to the operator or user. The actual distribution varies with the application, and for example with the language used by the operator. In a typical English-language implementation for example, an English-speaking operator understands the difference between vowels and consonants, and understands their relative placement within the English alphabet. Thus, setting the control keys as vowels A, E, I, O and U, and the secondary keys as the intervening consonants, is an intuitive or predictive arrangement for an English-language operator. It will be evident that the invention can be easily extended in other embodiments and implementations to address other languages and applications, and to use distributions of control and secondary keys that are intuitive in those languages.

A feature of the interface in providing just an initially small set of control buttons, followed by an associated set of secondary keys (which is also typically small in number), is that the entire interface can be implemented using only a small total number of real or virtual keys. This allows the overall physical dimensions of the individual keys to be made larger, in some instances large enough that they can even be operated by the user using just fingers, without a need for an external stylus or pointer. The ability to control a small portable, computing, communications, or electronic device using just the fingers is advantageous in those instances in which using a stylus is either uncomfortable or undesirable. The larger key size is also beneficial to those users whom have poorer sight, and for who using a regular PDA interface may be either difficult or impossible. The positioning and layout of both the control buttons and associated keys can be varied to best suit the needs of the particular user, application, and/or device, and the combination of larger key size, ease of use, and intelligent ordering can be used to provide a highly efficient means of data input.

A typical system that may incorporate the invention includes a screen with a data viewing area and an input mechanism wherein the input mechanism may form part of the viewing area (as might be used with a touch-screen interface), or can be separated in some way and displayed, for example, on a separate screen. The input mechanism displays a first screen or short list of characters, letters, numbers, text or symbols arranged in a particular order. Upon receiving a user input, the first screen changes to a second screen that displays a different set of characters, letters or other symbols, or alternatively only a portion of the first screen may change. Depending on the user input at the first screen, a particular set of characters is displayed on the second screen that reflects a sub-set or branch of the first character. The user may select any characters from the second set for display on the screen, entry into a data application, and/or for other data input.

Some features provided by the current invention build upon or are related to some of the features disclosed in related application "RAPID ENTRY OF DATA AND INFORMATION ON A REDUCED SIZE INPUT AREA", Ser. No. 09/592,323, filed Jun. 13, 2000, which is incorporated herein in its entirety.

The present invention uses these features to provide a means for entry of data, information, text, numbers, symbols, punctuation and characters into electronic, computer, Internet, handheld, communicating, networked, gaming devices, music device, entertainment devices, video devices, texting devices, remote controls, Web pads, Internet appliances, remote keyboards, text messaging devices, small word processors, portables, PDA's, Cell/phone hybrids, cell phones, email devices, pagers, online chat, and other devices, and which is ideally suited for input-centric applications such as instant text messaging, word processing, browsing the Web, emails, articles, reports, and electronic chat. The user is provided with an easy-to-use and intuitive interface that provides for rapid and accurate input. The invention benefits the user by reducing any excessive hand movement, and eliminating the need for the eyes to roam between the display area and the keyboard while at the same time providing for comfortable and intuitive character entry for rapid, error-free word processing on small portable devices with display screens. In some implementations the user may use one hand within a very limited area to input text very rapidly. By way of illustration, in accordance with some implementations, rapid word processing only requires the use of the index and middle fingers. Alternatively, a user may use the thumb and the middle finger; one thumb (if holding with one hand); two thumbs (if holding with two hands), or other combinations that provide comfort, ease, accuracy and speed. The location, size and proximity of the on-screen keys makes for fast and accurate typing with one or two fingers, one or two thumbs, or with two index fingers, without the need to hunt around to find the keys.

In accordance with one embodiment, the invention comprises a device with a touch screen viewing area, where the viewing area may be used for both the input and display of information, or alternatively for a device where the input area on the touch screen may be separate from the input area of the touch screen, and including a control input mechanism, comprising a plurality of control input devices, each of which control input device is associated with a set of secondary input devices; a secondary input mechanism, comprising a plurality of secondary input devices, wherein sets of the secondary input devices are associated with a control input device, and wherein each secondary input device can represent a character or symbol; an input source for allowing a user to select a particular control input device, and an associated secondary input device associated with that particular control input device; and, a display or storage medium for display or storage of the character or symbol associated with the selected secondary input device.

Operators and users may prefer to (1) rest the device and input with one or two hands, or (2) to hold the device in one hand and input with either that hand or the other hand, or (3) hold the device in two hands and input with both hands. This invention accomplishes all of these objectives for both right-handed and left handed users. The present invention is simple, user-friendly, fast, intuitive, accurate, intuitive, and easy to learn. The present invention is also compatible and easy to integrate with many other applications. It can work with a host of languages and can help users overcome physical and cognitive disabilities.

DETAILED DESCRIPTION

Figure 1:
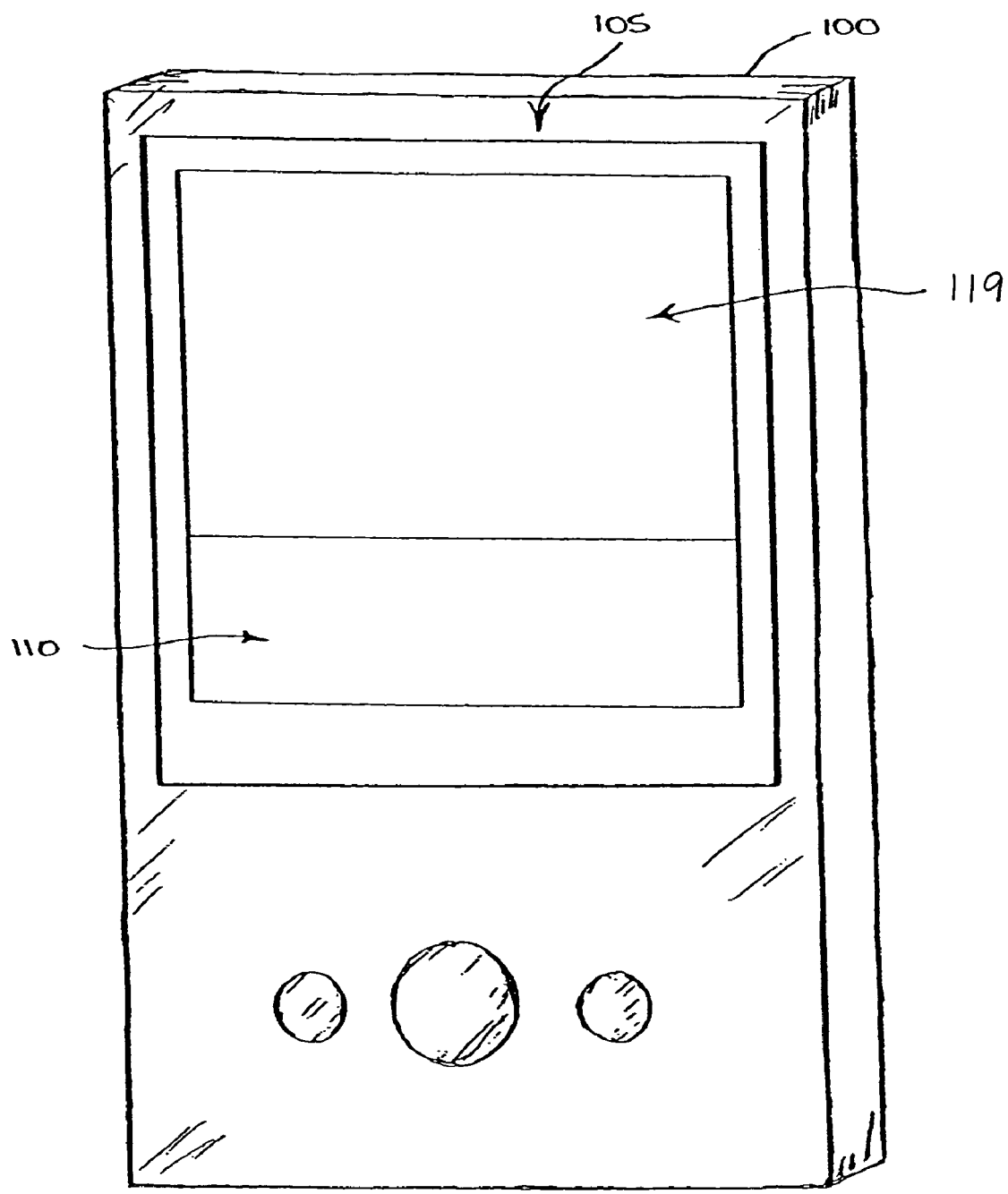
FIG. 1 shows a general illustration of a typical character selection interface provided by an embodiment of the invention.

Generally described, the present invention is designed to improve the speed, accuracy, and ease of inputting information into an electronic or computing device while minimizing the size of the input area required, and thus in some instances contributing to an overall reduction in the size of the device. Computing devices that can be used in accordance with the invention may include desktop computers, personal digital assistants (PDAs), mobile phones, Interactive TV devices, pagers, Internet appliances, Web appliances, Web tablets, game devices, digital remote controls, and other information devices.

As described herein, the traditional notion of a miniaturized, but otherwise conventional, keyboard arrangement is replaced by an interface having a small set of control buttons or keys that can be used to provide access to an associated set of secondary keys, from which the user can select a character for entry into the device. Intelligent, and in many aspects intuitive, ordering and grouping of both the control and the secondary keys allows the user to enter input into the device in a manner conducive to speed, accuracy, and ease of use, while the interface can be made physically smaller and require less "real estate" of the device than traditional keyboard arrangements. As used herein the terms "intelligent", "intuitive", "standard", "standardized", "related", "well known", "learned", "predictive", "sequential", and other related terms, are used in a variety of contexts to refer to a relative arrangement of keys or buttons (and the characters, letters, numbers, or symbols represented by those keys or buttons) that are distributed or related in such a manner that they make sense to the operator or user. The actual distribution varies with the application, and for example with the language used by the operator. In a typical English-language implementation for example, an English-speaking operator understands the difference between vowels and consonants, and understands their relative placement within the English alphabet. Thus, setting the control keys as vowels A, E, I, O and U, and the secondary keys as the intervening consonants, is an intuitive or predictive arrangement for an English-language operator. It will be evident that the invention can be easily extended in other embodiments and implementations to address other languages and applications, and to use distributions of control and secondary keys that are intuitive in those languages.

A typical system that may incorporate the invention includes a viewing area that can be used for both input and display of information or alternatively just for input. The viewing area is used for displaying a short list of characters or other symbols in an arranged order. Each character or symbol in the short list is each in turn associated with a subset of characters or symbols from which the user may easily make an input selection. A user-selected character or other symbol is then displayed either in the same viewing area, on a separate portion of the same viewing area, on a separate display screen, or on both. Examples of embodiments of the present invention are described more fully below. In one embodiment, the system includes a viewing area and an input mechanism. The viewing area displays a first screen or short list of characters, letters or symbols arranged in a particular order. Upon receiving a user input, the first screen changes to a second screen at the viewing area that displays a different set of characters, letters or other symbols, or a portion of the first screen changes to display a different set of characters, letters or other symbols. Depending on the user input at the first screen, a particular set of characters is displayed on the second screen that reflects a sub-set or branch of the first character. The user may select any characters from the second set for display on the screen and/or for other data input. The user may also double tap some keys, for example, a vowel, from the control buttons to enter that key directly from the first screen.

By providing an initially small set of control buttons, followed by an associated set of secondary keys (which is also typically small in number), the entire interface can be implemented using only a small total number of keys. This allows the overall physical dimensions of the individual keys to be made larger, in some instances large enough that they can even be operated by the user using just fingers, without a need for an external stylus. The ability to control a small portable electronic device using just the fingers is advantageous in those instances in which using a stylus is either uncomfortable, slow, or undesirable. The larger key size is also beneficial to those users who have poorer sight, and for whom using a regular PDA interface is either uncomfortable, difficult, or impossible. The positioning and layout of both the control buttons and associated keys can be varied to best suit the needs of the particular user, application, and/or device, and the combination of larger key size, ease of use, and intelligent ordering can be used to provide a highly efficient means of data input.

General Interface Layout

FIG. 1 shows an illustration of a typical handheld or computer device together with a character selection interface provided by an (horizontal) embodiment of the invention. In the embodiment shown in FIG. 1, the device 100 includes an interface comprising a viewing area 105, which uses a touch-sensitive screen or screens (110, 119) to provide both an input section 110 and a display section 119. The arrangement of the input section 110 and the display section 119 of the viewing area 100 can be presented with the input section positioned below the display section, as shown in FIG. 1, side-by-side with the display section, or in any other arrangement. While shown as distinct areas in FIG. 1, it will be evident that the input display sections may instead form part of one contiguous touch screen, in which the device manufacturer or developer can specify a portion of the screen to be used for input, and another portion of the screen to be used for display. The input section 110 of the viewing area 100 typically displays characters or other symbols for selection by a user. The display section 119 of the viewing area 105 subsequently displays the secondary characters or other symbols that the user has selected. In other embodiments, rather than being part of the same viewing area 105, the display section 119 can be viewed on a physically separate display, thereby allowing the user full use of the viewing area 105 as an input section 110. Such a physically separate display can be incorporated within the same device as input section 110, or it can be incorporated into another device (for example a remote or wireless keyboard or control section) that in turn communicates with the device incorporating input section 110.

When a user enters information in the input section 110, the processor receives a signal from the input section 110 of the viewing area 105, and either displays additional information (such as an additional set of characters or other symbols) on the input section 110, stores the information input by the user on a storage medium or memory (not shown), or sends a signal to the display section 119 to display thereon the information input by the user. The display section 119 of the viewing area 105, in response to the processor signal, displays the information. The information can then be manipulated, saved, edited, etc. as with any other data input.

Figure 2:
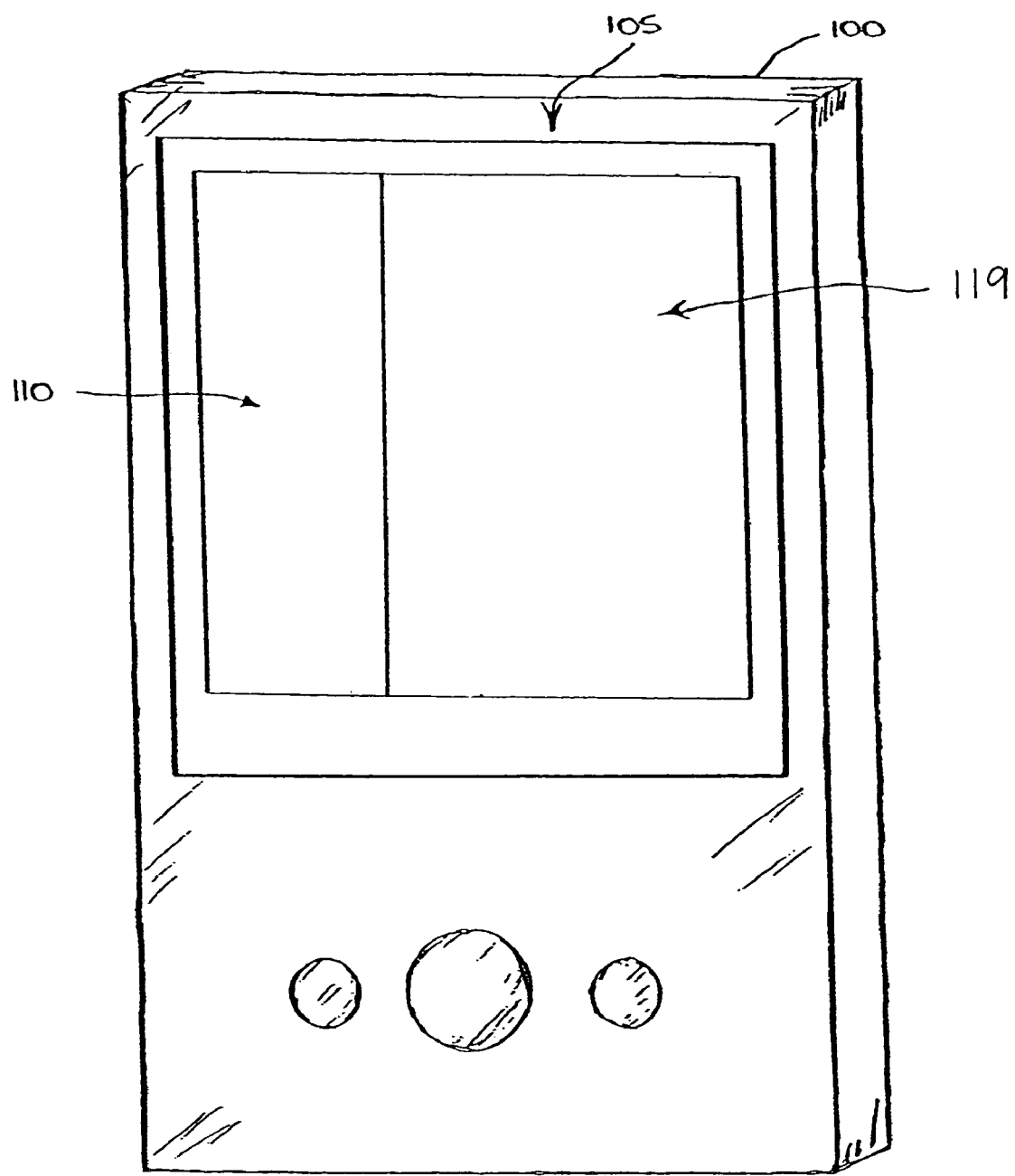
FIG. 2 illustrates an alternate embodiment of a typical handheld computer device in which the character selection interface is provided in a vertical manner.

FIG. 2 illustrates an alternate (vertical) embodiment of the invention as it may be used with a typical handheld computer device, in which the character selection interface is distributed in a vertical manner, and allows the arrangement of the input section and the display section to be presented side-by-side with each other. As shown in FIG. 2, this particular implementation of the device 100 includes an interface 105, which in turn comprises an input section 110 arranged vertically within the interface, and a corresponding display section 119 also arranged vertically beside the input section. Again, it will be evident that the input display sections may form part of one contiguous touch screen, or may be comprised of individual touch screens or interfaces.

Figure 3B:
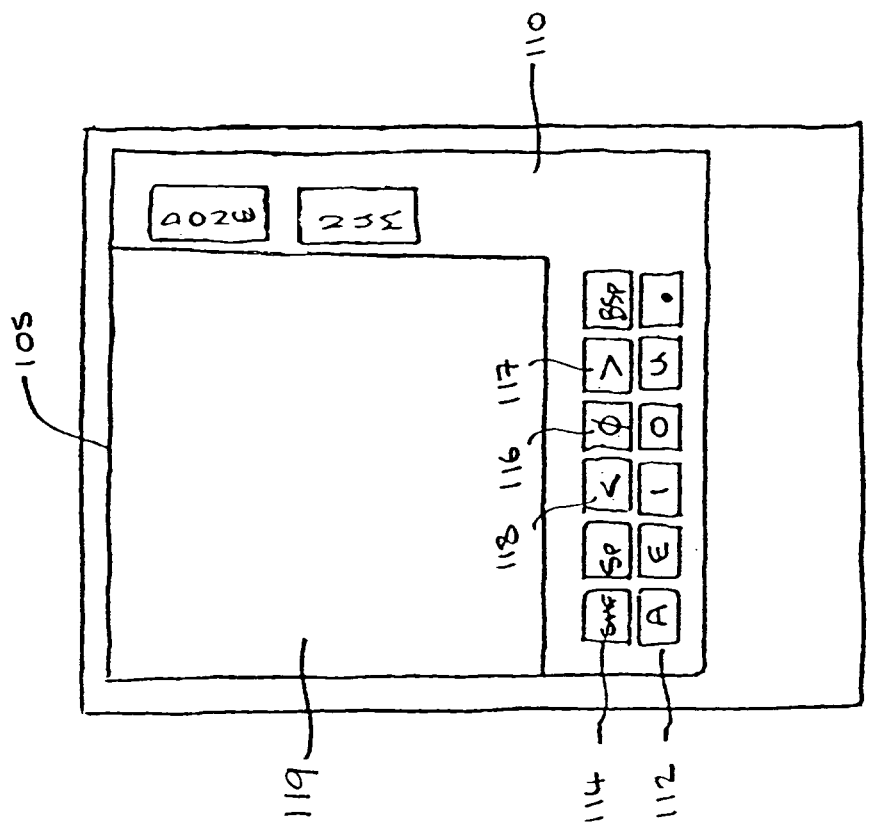
FIGS. 3A and 3B illustrate how a device can use an interface, in which the input section is distributable both vertically and/or horizontally.
Figure 3A:
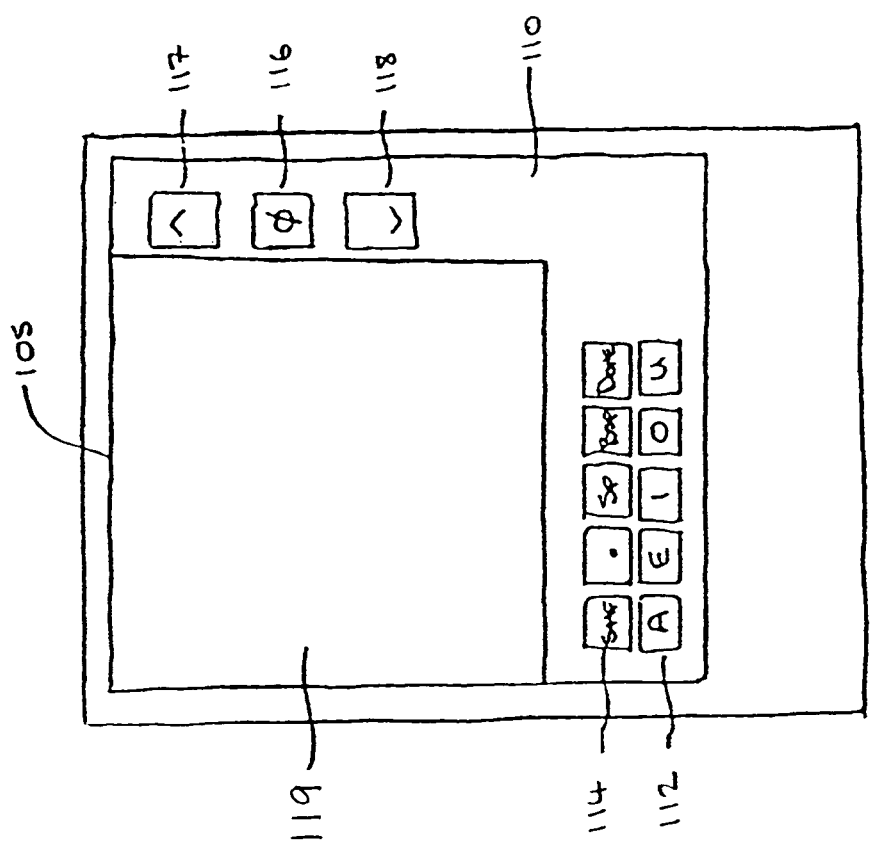

FIGS. 3A and 3B illustrates an alternate embodiment of the invention as it may be used with an electronic, PDA, PDA/Cell phone hybrid, or computer, electronic, or communicating device in which the input section is distributed, at least partially, both vertically and horizontally. In some instances, arranging various elements of the input mechanisms both horizontally and vertically can make the best use of the limited display space, and provide for a more ergonomic and/or intuitive means of data entry. As shown in FIG. 3A, the embodiment of the interface shown therein includes a 5-key variant of an alphabetic and punctuation key selection input mechanism 112, 114 distributed in two rows horizontally along the bottom of the interface, while a numeric data input mechanism 116, 117, 118 is distributed vertically alongside the display portion. Using the control keys and secondary selection keys, the user may quickly enter data into the display region. The secondary numeric input source is used to select and enter numbers quickly and easily. The numeric entry portion includes a number screen, together with up and down arrows that are used to increase or decrease the selected number. When the user is happy with the number displayed in the number selection screen, they can simply click on the number selection screen to enter that particular number into the display space.

FIG. 3B illustrates an alternate 6-key variant of the interface, in which there are two rows of 6 keys distributed across the device, including a numeric entry portion 116. It will be evident that the invention is not limited to the variants described above but can include many other distribution of letters and input mechanisms, in addition to the 5 and 6 key embodiments shown.

Control Key and Secondary Character Selection Process

Figure 4:
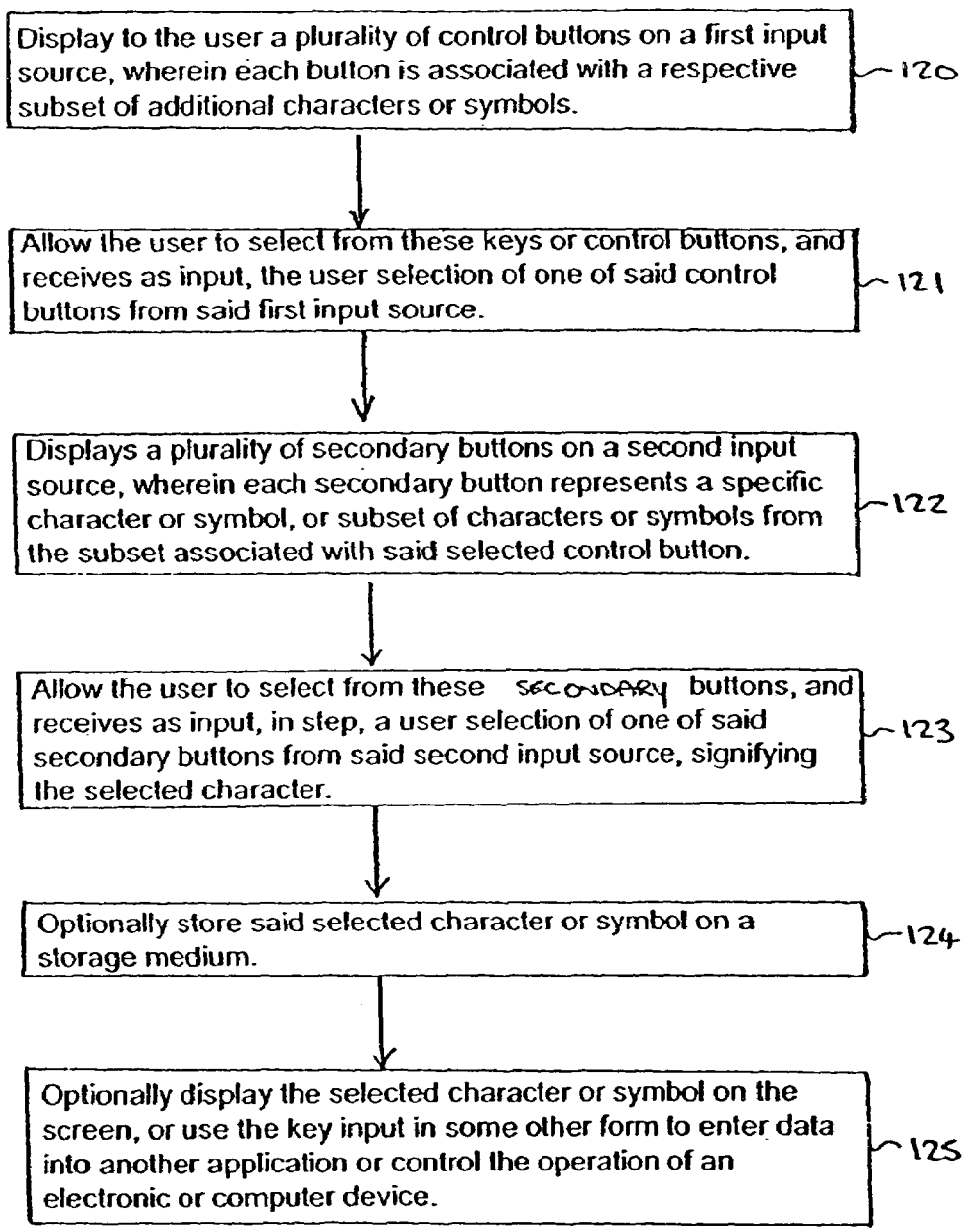
FIG. 4 shows a flowchart of a character selection method provided by an embodiment of the invention.

FIG. 4 shows a flowchart of a character selection method provided by an embodiment of the invention. As shown in FIG. 4, in step 120, the system displays to the user a plurality of control buttons on a first input source. The first input source may be a physical keyboard (i.e. a keyboard with real or hard keys), or a set of touch-sensitive keys displayed on a display screen, or some other form of selection mechanism, wherein each button is associated with a respective subset of additional characters or symbols. The system allows the user to select from these keys or control buttons, and receives as input, in step 121, the users selection of one of said control buttons from said first input source. The system then displays, in step 122, a plurality of secondary buttons on a secondary input source. Again, the secondary input source may be a physical keyboard, perhaps with small display screens on each key, or a secondary set of touch-sensitive keys displayed on a display screen, or some other form of selection mechanism, wherein each secondary button represents a specific character or symbol, or subset of characters or symbols from the subset associated with the selected control button. It will be evident that the secondary input source and the first input source may be distributed on the same physical device, for example, they may be two portions or regions of a single touch-screen display, as described above. They may also be the actual same display device(s) or portion(s) of the display, in which case the secondary buttons can be overlaid or otherwise replace the control keys upon selection of a particular control key or button. The display reverts to the original control key representation after an input or specified period of time. Regardless of the actual distribution used, the system allows the user to select from the secondary buttons, and receives as input, in step 123, a user selection of one of said secondary buttons from said second input source. The system may then optionally, in step 124, store the selected character or symbol on a storage medium such as a memory device, or in step 125, display the selected character or symbol on the screen, or use the key input in some other form to enter data to control the operation of an electronic or computer device.

Five-Button Interface Layout for Portable Devices

Embodiments of the invention can be used with, or incorporated into, small electronic, communicating, or computing devices, such as PDA devices, handheld computing devices, Web Tablets, digital remote control devices, cell phone/PDA hybrids, Internet appliances, pagers, and cellular telephones. Typically, the interface can be used to control the actual operation of the device, or to enter data into the device, or to enter data or input into a software application running on the device. Such a software application may be, for example, a word processing application running on a handheld computing device, or instant messaging, emails, Web browsing, chat, or contacts/address book software applications running on a PDA, PDA/Cell phone hybrid, digital remote control, Internet appliance, or cellular telephone. The invention is flexible enough to be used with all manner of devices and software applications running thereon, and can be adapted to suit the particular features of the device, or needs of the user. Particularly, those embodiments that utilize a touch-sensitive screen can be modified by modifying the underlying software controlling the touch-sensitive interface. In these embodiments, variations of the invention can be quickly adapted or customized to suit the needs of a particular software application.

Figure 5:
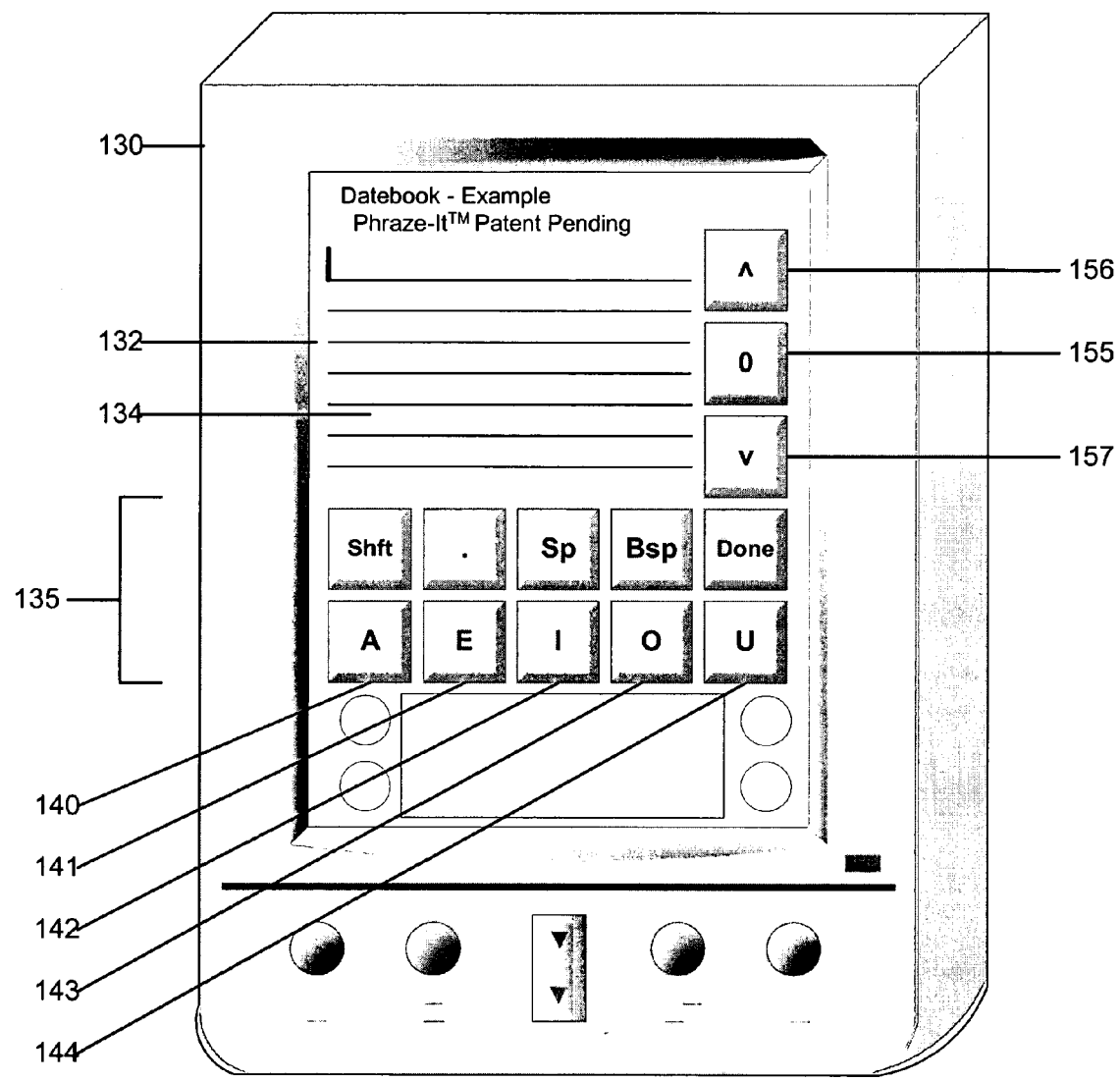
FIG. 5 illustrates one embodiment of the interface provided by the invention as it may incorporated into a small handheld or electronic device, such as a PDA device or cellular telephone, cell phone/PDA hybrid, Internet appliance, Web Tablet, digital remote control, etc.

FIG. 5 illustrates one embodiment of the interface provided by the invention as it may be incorporated into a small handheld, computing, communicating, or electronic device 130, such as a PDA device, cellular telephone, digital remote control, portable keyboard, Web Tablet, Internet appliance, pager or other portable device. As shown in FIG. 5, the interface is used to provide a means by which a user can enter data into the device, or more commonly into a software application running on the device, for example, a contacts, calendar or datebook application. In a typical implementation, such as that shown in FIG. 5, the interface 132 includes a data display area 134 to the upper left of the screen, together with a data input section 135, 155 (and 156, 157) by which the user can select characters for entry into the device. In the embodiment shown in FIG. 5, this input mechanism 135, 155 (and 156, 157) is distributed horizontally and vertically within the interface, with the character selection mechanism 135 distributed horizontally along the bottom of the display area, and a numeric input mechanism 155 distributed vertically to the right of the display area. A set of control buttons 135 (including character or vowel keys 140, 141, 142, 143, 144) are displayed within the key selection mechanism, representing an initial set of control keys, although it will be evident that any key within the input mechanism 135, 155 can act as a control key, the specific choice and operation of which is dependant on the implementation used. In this instance the vowels A, E, I, O and U are distributed along a bottom set of control keys while a selection of commonly used punctuation and control keys including Shift, period (used both for inserting a '.' and as a symbol for punctuation), space, backspace and done are distributed along an upper row of the control key mechanism. It will be evident that other key representations can be used for the control key mechanism, depending on the particular device or needs of the application. It will also be evident that while two rows of control keys are used in this implementation, other implementations may instead use a single set of control keys distributed along a single line of characters. In addition, while only five keys are distributed horizontally in this embodiment, it will similarly be evident that other interfaces can use two, three, four, five, six, seven or more keys in each row of control keys. It can be seen that, using the interface provided, the overall physical dimensions of the individual keys can be made larger, in some instances large enough that they can even be operated by the user using just fingers, without a need for an external stylus or pointing device. As described above, the ability to control a small portable electronic device using just the fingers is advantageous. The larger key size is also beneficial to those users whom have poorer sight, and for who using a regular PDA interface is either uncomfortable or impossible.

Selecting the punctuation key brings up a screen with punctuation symbols, and pressing the shift and punctuation key brings up an additional screen with alternate punctuation symbols, as described in further detail below. The "done" button is optional in some implementations and indeed is not required in those implementations wherein the done feature can be implied, (such as in applications that revert back to the original data entry point when input is concluded). The numeric input mechanism can be operated by a user presses shift and the middle key on the numbers slider. They get the numeric screen and the middle character on the slider turns onto a return button. In this manner, numbers can also be entered into the document.

Figure 6:
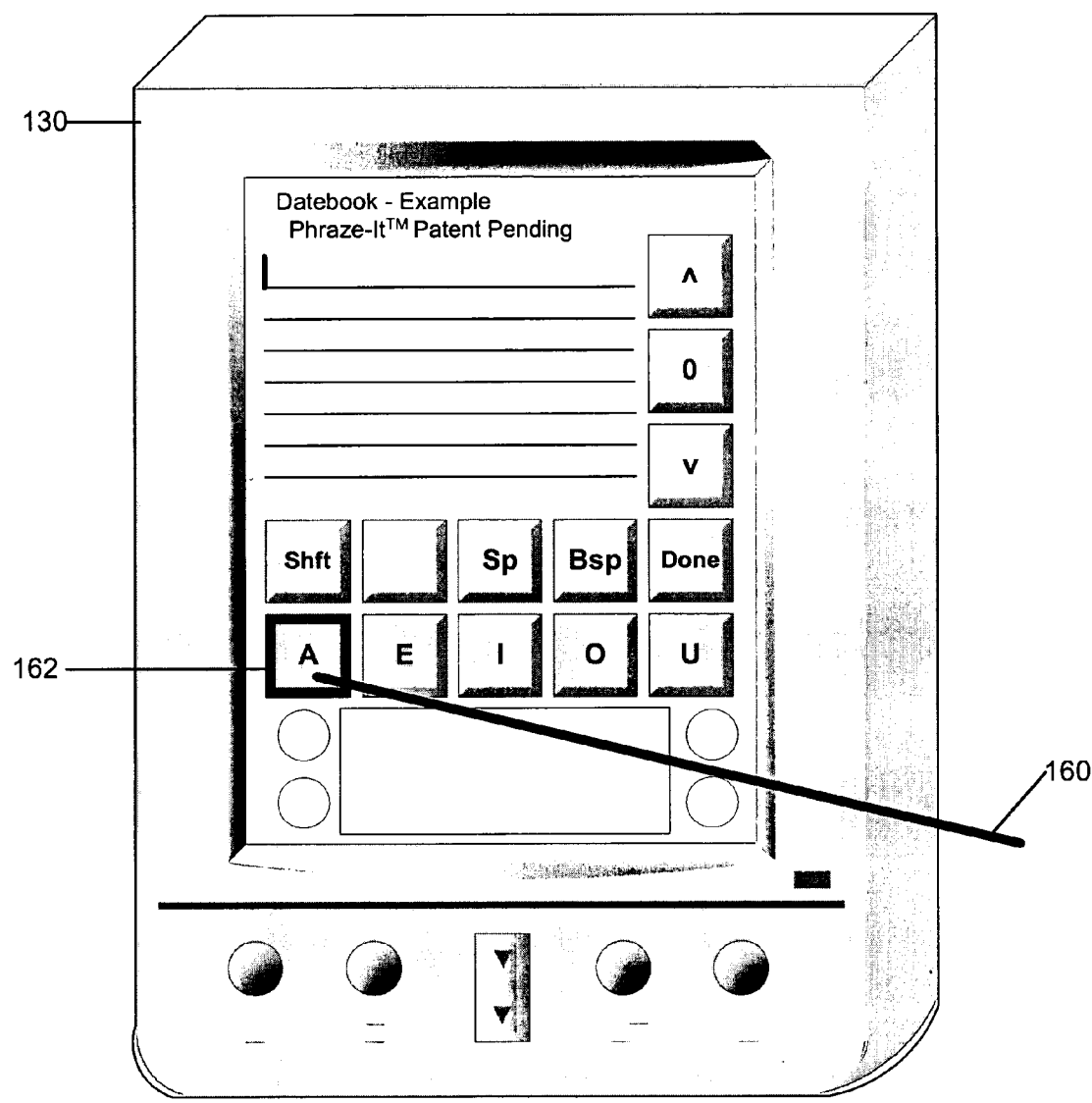
FIG. 6 illustrates how a user can select an initial control key for entering data into the device.

FIG. 6 illustrates how a user can select an initial control key for entering data into the device. In most implementations the user or operator uses a stylus 160 or the user's finger(s), to select a particular control key from the control key mechanism, (although a keyboard, trackball, touchpad, mouse, virtual pointing device, or alternate pointing device can be used). In the example shown in FIG. 6, the "A" key is selected. Once selected, the control key can be set to change in appearance (shown as the highlighted "A' key 162 in FIG. 6) to indicate its selection. Alternatively a portion of the input region can be changed to display new keys. Since each control key is linked to a set of related secondary keys, the user can quickly select many different keys by selecting a primary control key.

Figure 7:
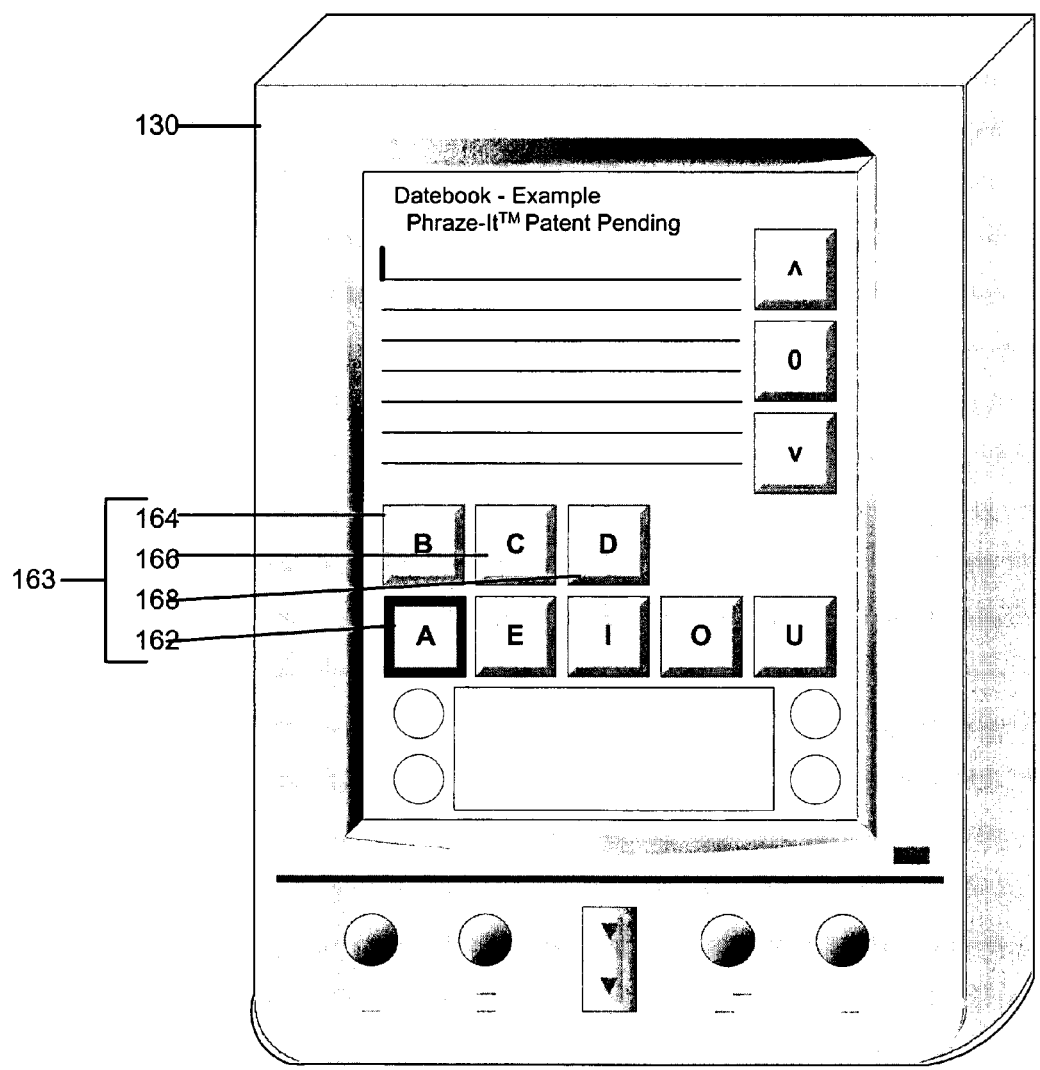
FIG. 7 illustrates how the display of the device changes when an initial control key is selected.

FIG. 7 illustrates how the display of the device changes when an initial control key is selected. As shown in FIG. 7, once the "A" key is selected by the user, either by means of a stylus, keyboard, finger, or other selection device, a secondary set of buttons 163 is displayed by which the user can select the actual key or character for entry into the device. In the example shown in FIG. 7, five keys are distributed initially along the bottom of the interface. When one of these keys, for example the "A" key is selected 162, the secondary keys 164, 166, 168 associated with the "A" key are represented to the user. In this instance the secondary keys are the "B", "C" and D keys. It will be evident to one skilled in the art that, while in the implementation shown in FIG. 7 the secondary keys are displayed on top of, or as a replacement to, the second row of control key mechanisms, the secondary control keys can also be displayed in any alternate portion of the screen. Other implementations may display the second set of control keys within the same space as the initial control keys. For example, the keys "A", "E", "I", "O" and "U" could be replaced by the keys "A", "B", "C" and "D" when the "A" key is selected. The important point to note is that the selection of one or more control keys presents to the user a set of additional or secondary keys, such that the user can then select from that set of secondary keys. The actual placement and arrangement of the secondary set of keys may be implementation-specific, and need not necessarily appear as in FIG. 7.

Figure 8:
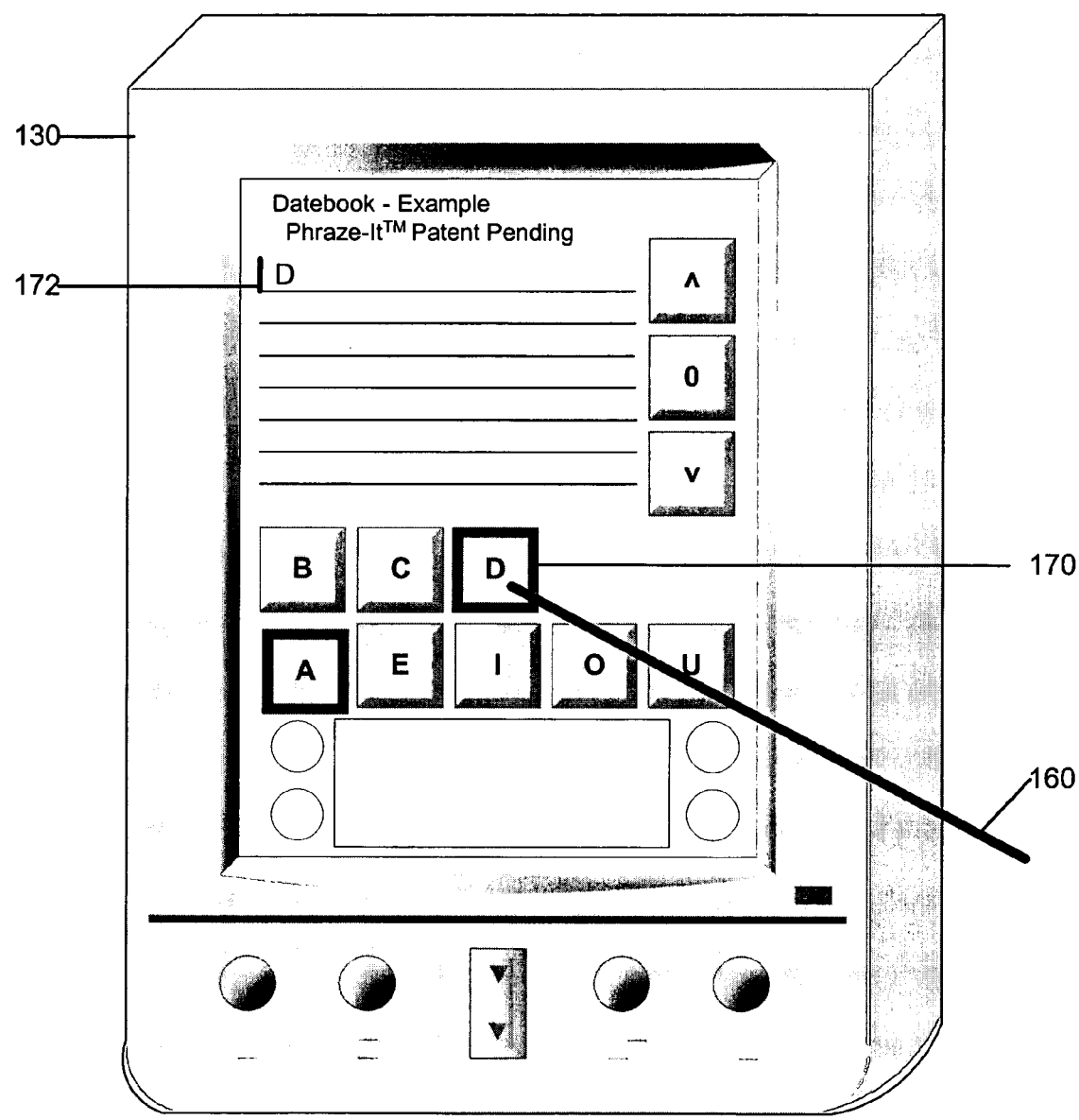
FIG. 8 illustrates how the user may then select from one of the set of secondary keys to enter a character into the application or the PDA device.

FIG. 8 illustrates how, once the secondary set of keys have been displayed, the user may then select from one of the set of secondary keys to enter a character into the application or into the PDA device. Once the initial control key, or combination of control keys, in this case the "A" key has been selected, the secondary set of additional keys, in this instance "B", "C" and "D", then appear on the interface. In the example shown in FIG. 8, the user or operator may select the "D" key 170 for entering a character "D" 172 into the device. In this five button embodiment a vowel can be selected by tapping the vowel on the control button twice. In addition, the shift button can be used to capitalize a letter. The shift button can be used to affect the operation of the keys. Shift before a letter capitalizes. Shift before punctuation brings up a second punctuation screen and shift before the middle number button on the top right brings up a numeric screen. Once up, the numeric screen changes the middle button in the slider to a RET button, so that once the user is done with the numeric screen, the user hits RET to return to the vowels screen. In most implementations, once the key has been selected and input, the display returns to the original display shown in FIG. 5, so that the user can proceed to select additional keys, and enter additional data.

The actual functioning of how the control keys and secondary keys operate may be device specific such that in some instances the secondary set of keys can be made to be "sticky", so that once an initial set of keys has been selected and the secondary set of keys appear, the secondary set remains on the screen until the user selects at least one of those keys. In other implementations the secondary set of keys may be set to disappear after a particular period of time, for example, two or three seconds of inactivity, after which the default screen (first screen with vowels on one row and the characters on the second row can reappear).

Figure 9:
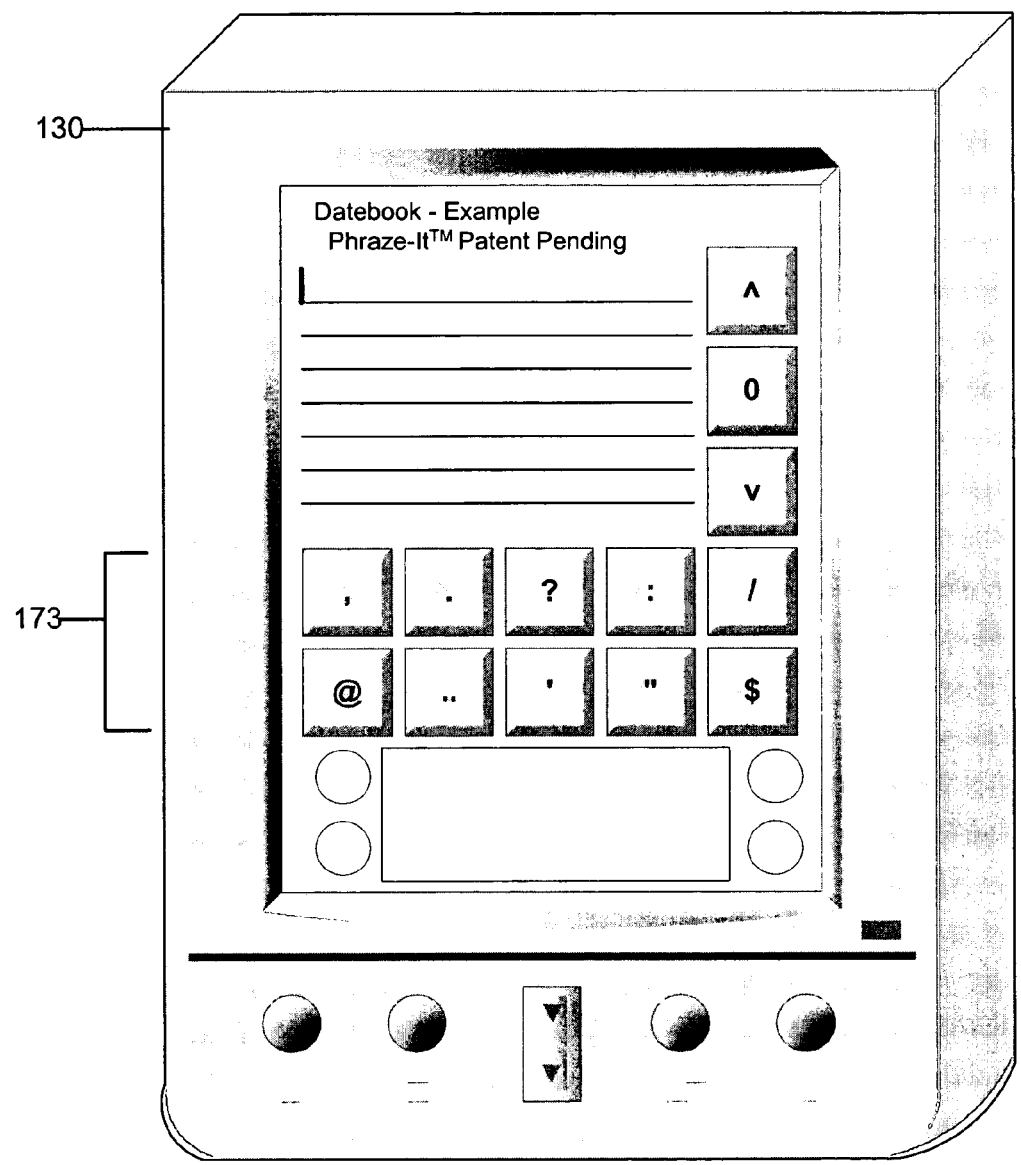
FIG. 9 illustrates the use of a punctuation key selection feature in accordance with an embodiment of the invention.

FIG. 9 illustrates the use of a punctuation key selection feature in accordance with an embodiment of the invention. In a typical implementation, the period key can either be tapped twice to enter an actual period, or tapped just once in which case it is considered a punctuation key. Selecting the punctuation key displays a screen with punctuation symbols 173, while pressing the shift and the punctuation key together can be used to display an additional screen with alternate punctuation symbols. The punctuation symbols can be selected as with any other keys for entry of those characters into the device.

Figure 10:
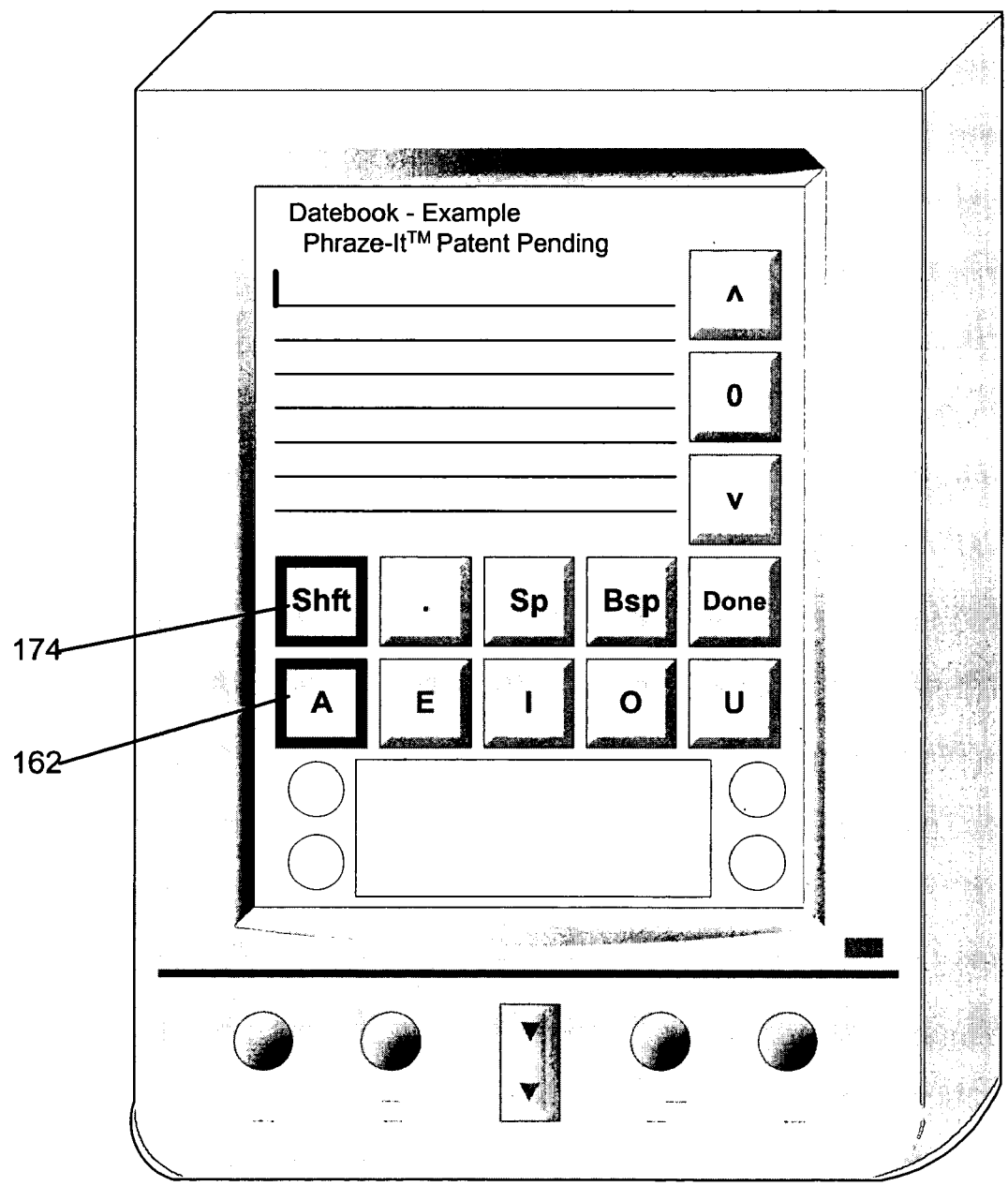
FIG. 10 illustrates a capitalized key selection feature in accordance with an embodiment of the invention.

FIG. 10 illustrates a capitalized key selection feature in accordance with an embodiment of the invention. Selecting the Shift (Shft) key 174 is a sticky input, in that the Shft key remains selected for a predetermined period of time. If in this time the user selects another key, for example the "A" key 162 the resultant character is capitalized.

Figure 11:
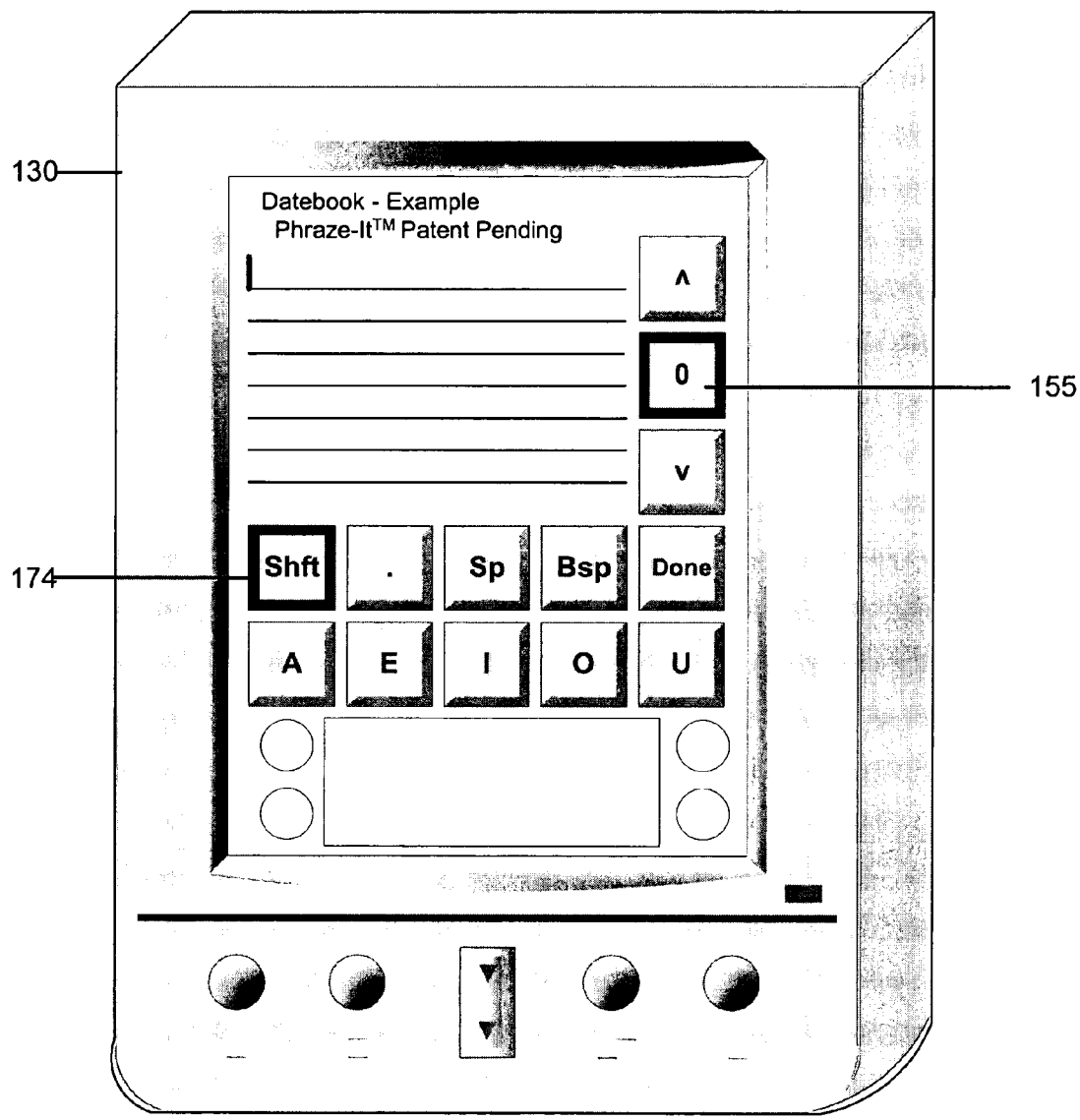
FIG. 11 illustrates the use of a shift Num feature in accordance with an embodiment of the invention.

FIG. 11 illustrates the use of a shift Num feature in accordance with an embodiment of the invention. Again, the Shift (Shft) key 174 is a sticky input, in that the Shft key remains selected for a predetermined period of time. If the user then selects the Num key 155 (in this instance represented by the numeral 0), then the display changes to that shown in FIG. 12 for entry of numeric data.

Figure 12:
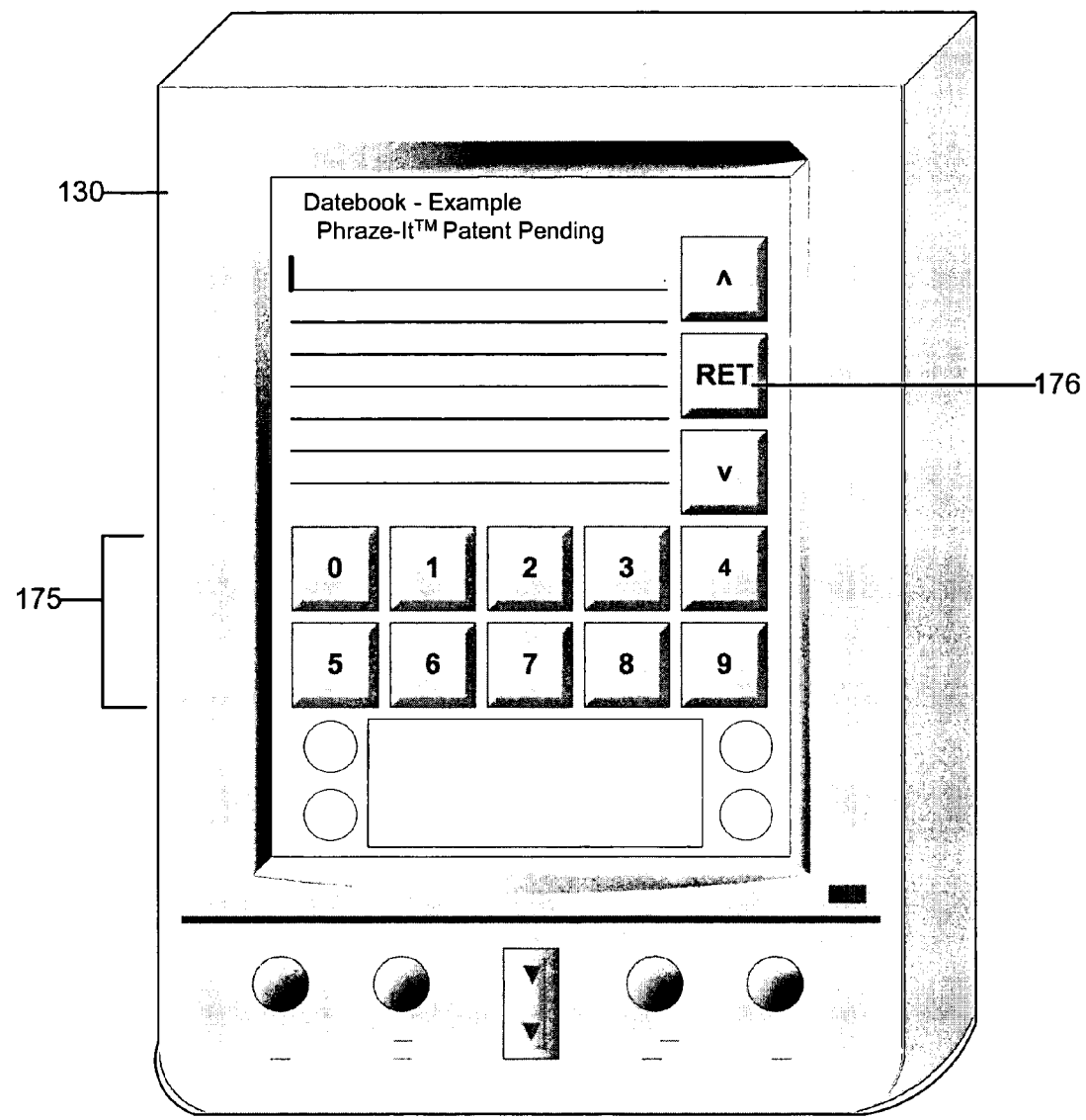
FIG. 12 illustrates an alternate view of a shift Num features in accordance with an embodiment of the invention.

FIG. 12 illustrates an alternate view of a shift Num features in accordance with an embodiment of the invention, resulting from the operation shown in FIG. 11. The typically alphabetic control keys are rpelaced by a set of numeric control keys 175 for assistance in entering numeric data, and a Return (RET) key 176 for returning back to the alphabetic input mechanism.

Figure 13:
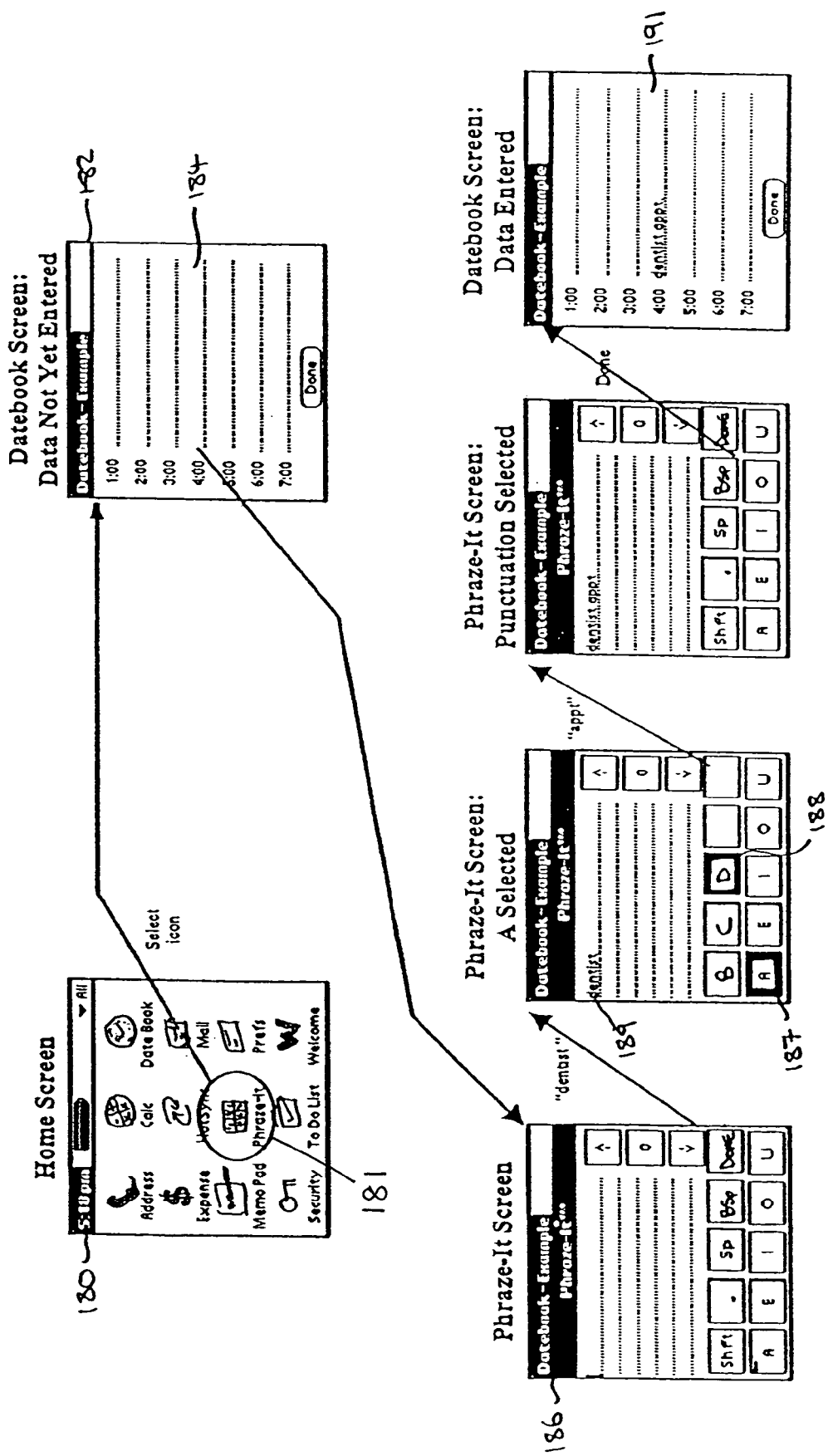
FIG. 13 shows an illustration of an embodiment of the invention that can be incorporated into a PDA-style or computer device and used to enter text.

FIG. 13 illustrates one example of how the interface provided by the invention can be incorporated into a software or operating system that executes on a portable device, such as, for example, a portable electronic or computing device, a personal digital assistant, or a cellular telephone device. Other forms of devices and computer systems may be used to incorporate the invention in this manner. As shown in FIG. 13, the operating system or application system running on the device typically includes a mechanism for starting the software, for example, as shown in FIG. 13, the software includes a home screen 180 that further includes an icon 181 that allows the user to select or operate the interface. When the interface is selected, typically by selecting the icon using either a finger, stylus or mouse device, the user is then presented with a datebook screen 182, which allows the user to enter schedule information. For example, the user may wish to enter an appointment at 4:00 PM, as shown by entry 184 in the datebook screen. When the user clicks on the time to enter a schedule or appointment detail, the data input interface screen 186 is brought up. As shown in FIG. 13, the implementation of the interface screen includes a data input area, which may include a cursor showing the user where the input is to begin. A key selection interface is provided at the bottom of the interface, allowing the user to select keys from the keyboard for entry into the device. A set of control keys, including in this implementation the vowel keys A, E, I, O, and U, together with a punctuation key is provided to allow the user to select sets of keys for further entry into the device. When the operator selects the "A" key 187 a secondary set of buttons, including the keys A, B, C, and D is presented to the user for selection and entry into the device. The user continues to select keys 188 as described above, and as each key is selected the corresponding character is entered into the data display region 189. To select a punctuation screen, the user selects the punctuation key which brings up a number of common punctuation symbols. The user may then select one of these punctuation keys for entry into the device. When the user is finished with this particular entry they may click on a "done" key, which exits the interface application and in this example returns to the datebook. The data input that the user had just entered using the interface now appears in the appropriate place within the datebook software application 191. In other operating systems, devices, and applications, there may be no need for a Done button. If the Done button is not necessary, or is implied by the application, then the key can be used for different or other functions necessary or desirable to the users and manufacturers.

It will be evident that the interface such as described in FIG. 13 can be used with other software applications in addition to datebook applications. For example, the interface may be used with word processing application, contacts, email, forms, instant messaging, or chat applications, and Web browser type applications. The ability to use the interface with a particular software application is determined only by the desires of the user and the features provided by the manufacturer of the PDA or other computer device or software.

Six-Button Interface Layout for Portable Devices

Figure 14:
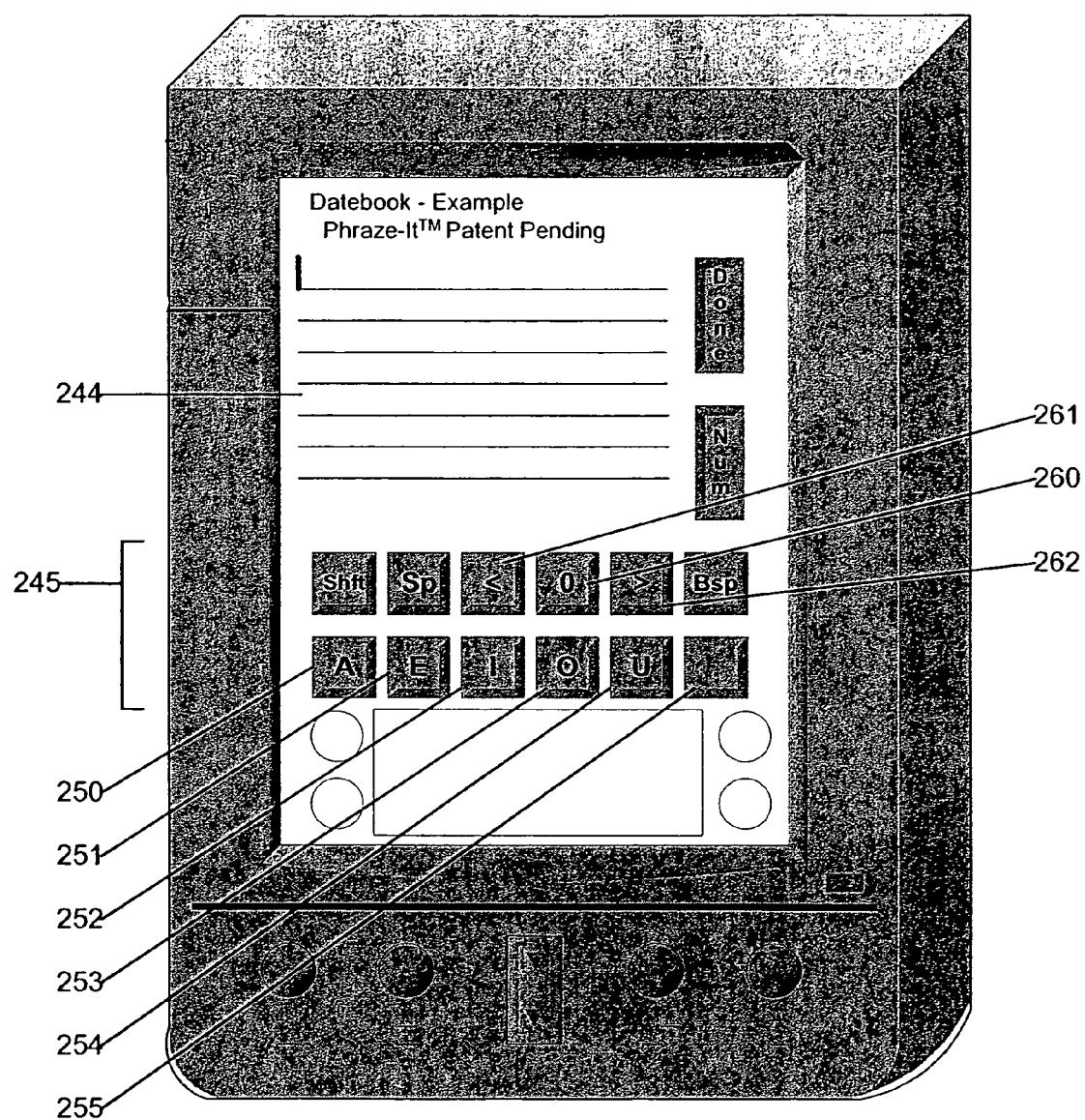
FIG. 14 illustrates an alternate embodiment of the invention, in which the control keys form an input mechanism that includes six keys arranged horizontally across the device

FIG. 14 illustrates an alternate embodiment 240 of the invention, in which the control keys 245 comprise an input mechanism that includes six keys 250–255 arranged horizontally across the device, in this instance in two rows of control keys (including keys 260–262). Again, it will be evident that a single set of control keys can be used, arranged in one line along the device, or that multiple sets of control keys can be used in different layouts and positions, depending on the particular needs of the application.

Figure 15:
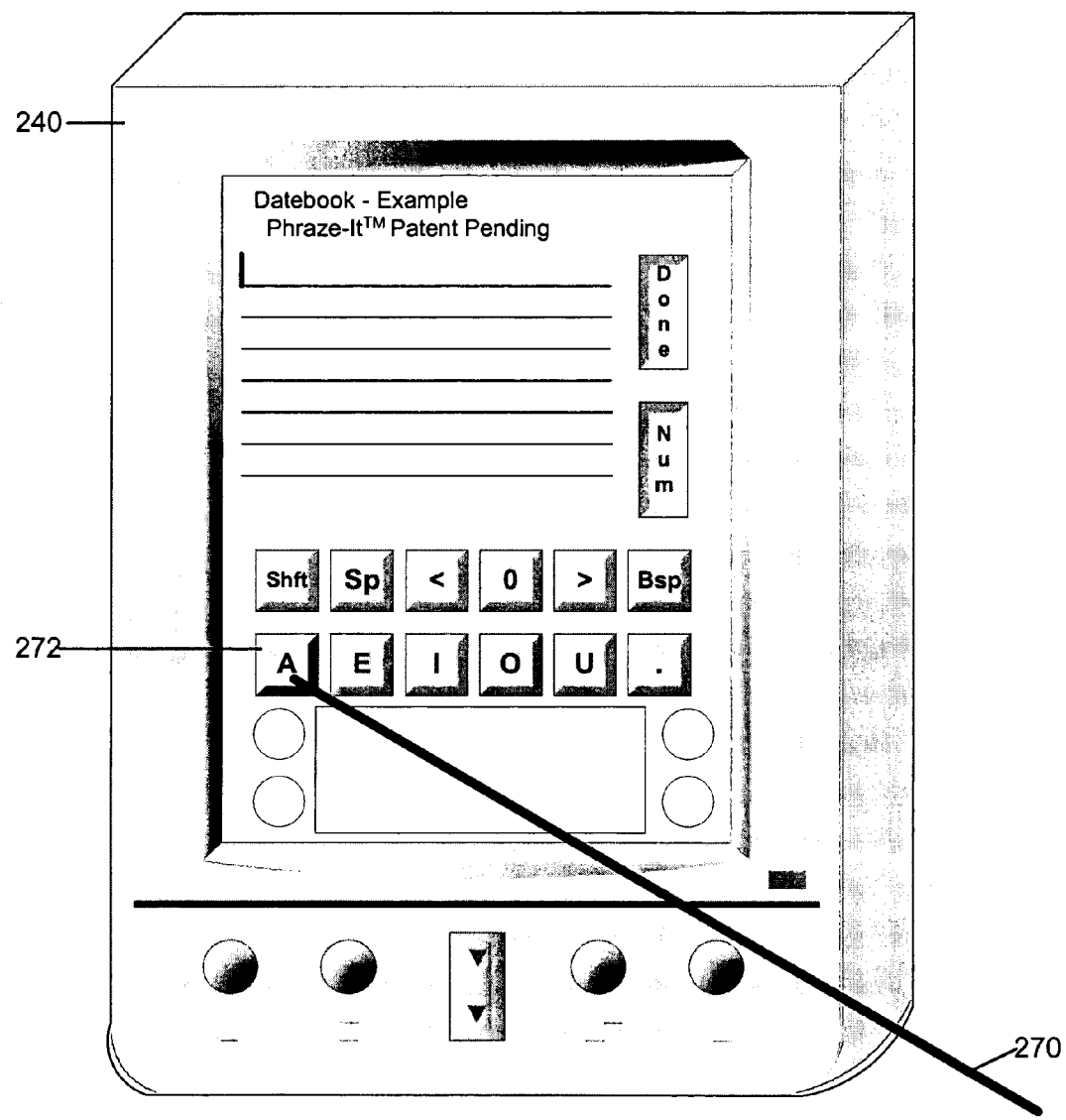
FIG. 15 illustrates how the user may select one of the control keys to enter data into the device.

FIG. 15 illustrates how the user may select one of the control keys to enter data into the device. In the embodiment shown in FIG. 15, the character selection mechanism is distributed horizontally along the bottom of the display area. A set of control buttons 270 are displayed within the key selection mechanism, representing an initial set of control keys. In this instance the five vowels "A", "E", "I", "O", "U", and an additional "." key are distributed along a bottom set of control keys while a selection of commonly used punctuation and control keys including "Shift" and "space" are distributed along a upper row of the control key mechanism. Again, it will be evident that other key representations and other layouts and positions can be used for the control key mechanism, depending on the particular device or needs of the application.

Figure 16:
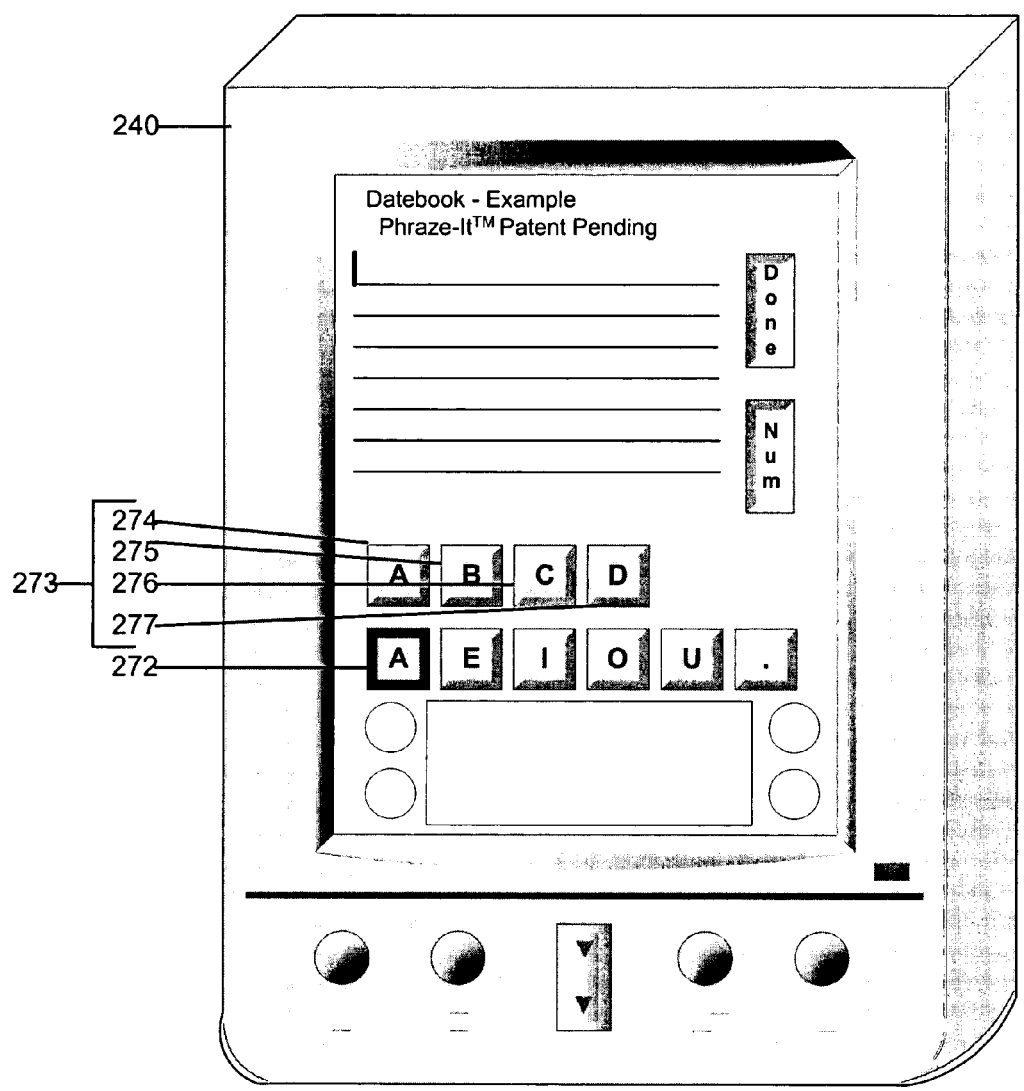
FIG. 16 illustrates how in this implementation, once the control key has been selected a secondary set of control keys appears, in which the original control key also appears as a secondary input key.

FIG. 16 illustrates how in this implementation 240, once the control key 272 has been selected a secondary set of control keys 272–277 appears, in which the original control key also appears as a secondary input key. In some instances the ability to show the control key as one of the secondary input keys, provides for a more intuitive interface for a user, and can be useful in certain implementations.

Figure 17:
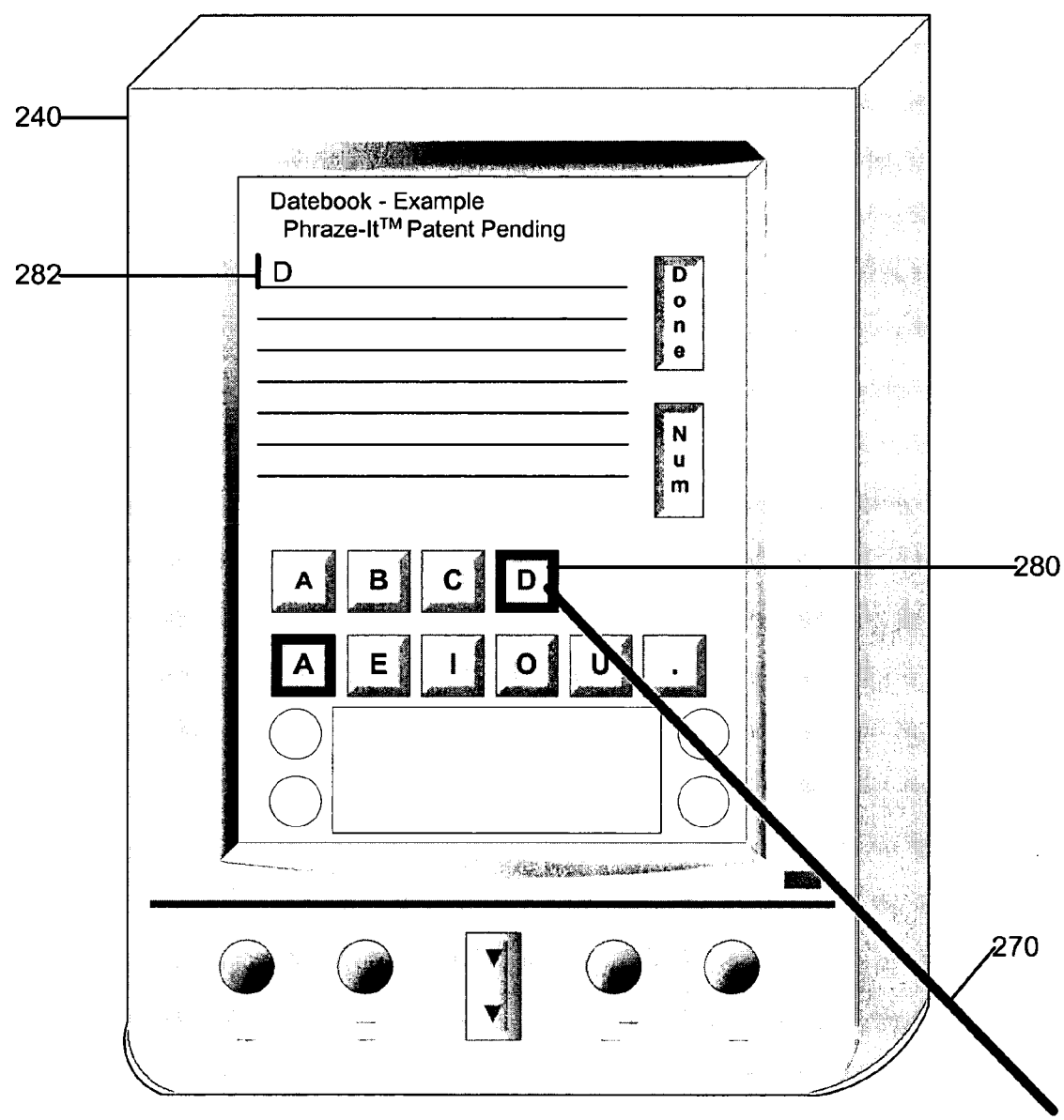
FIG. 17 illustrates how the secondary input keys are again used to enter data into the application.

FIG. 17 illustrates how the secondary input keys 270 are again used to enter data into the application, in this instance selecting the "D" key 280 for entering a "D" into the data application 282.

Figure 18:
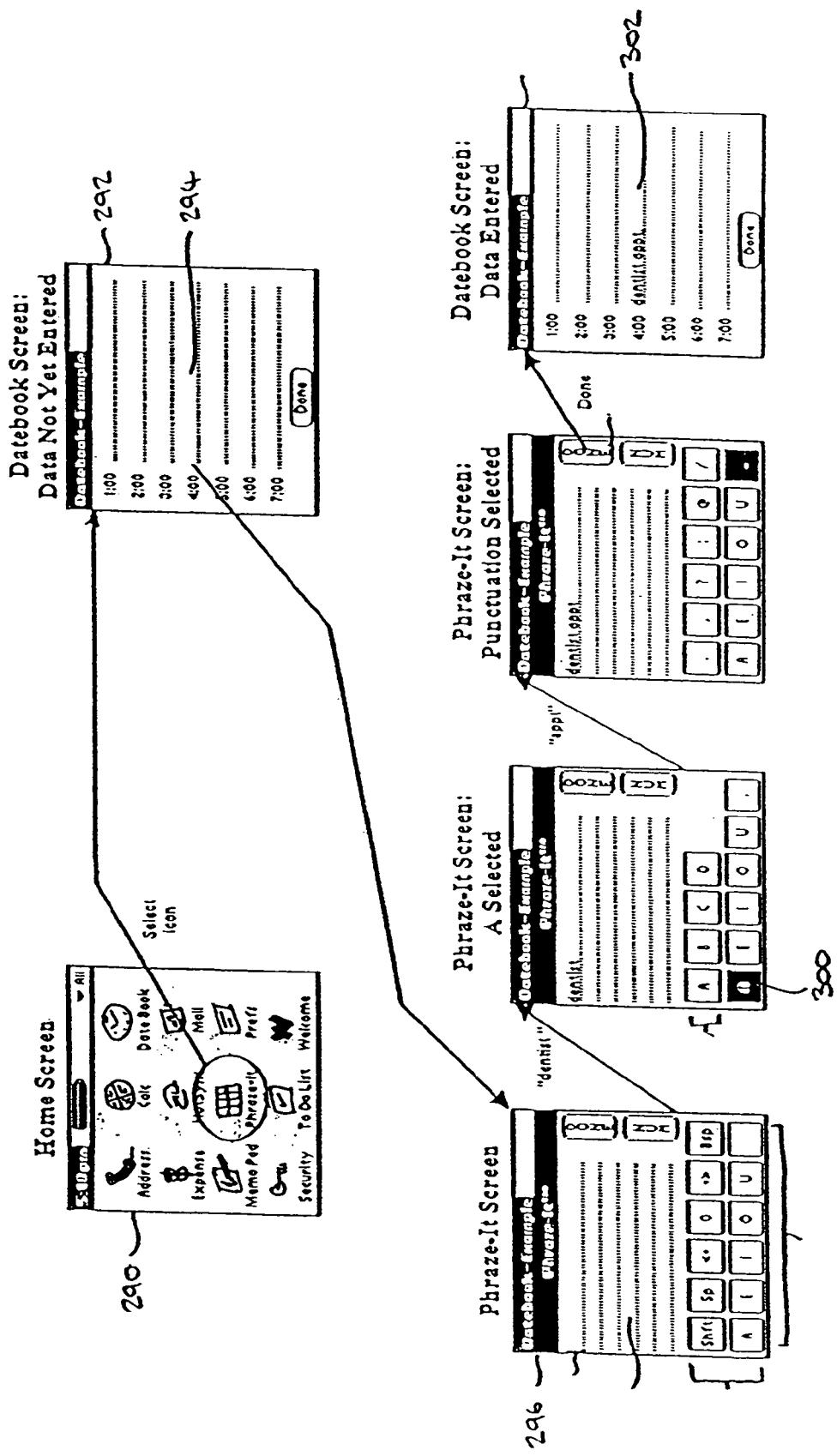
FIG. 18 illustrates an alternate embodiment of the invention that can be incorporated into a PDA style or computer device.

FIG. 18 illustrates an alternate embodiment of the invention that can be incorporated into a PDA style or computer device application 290, 292, 294, 296, 300 and used to enter text 302 into that application. In the example shown in FIG. 18, the user or operator may select the "D" key for entering a character "D" into the device. In most implementations, once the "D" key has been selected, the display returns to the original display shown in FIG. 14, so that the user can proceed to select additional keys, and enter additional data.

Secondary Key Replacement of Control Key

In the example implementations shown above the secondary keys are presented to the user in a position that is somewhat different from that of the selected control key (i.e. the control keys are distributed in two rows, with the A, E, I, O, and U keys along a bottom row, while the secondary keys are displayed along just one row above the A, E, I, O and U keys). However, it will be evident that the secondary keys can actually be displayed in any position, and particularly can be displayed so that they replace most or all of the control keys when a particular control key is selected. For example, the A, E, I, O, and U keys can be presented in a single row, and the secondary keys displayed in this row, replacing the initial control key display.

Figure 35:
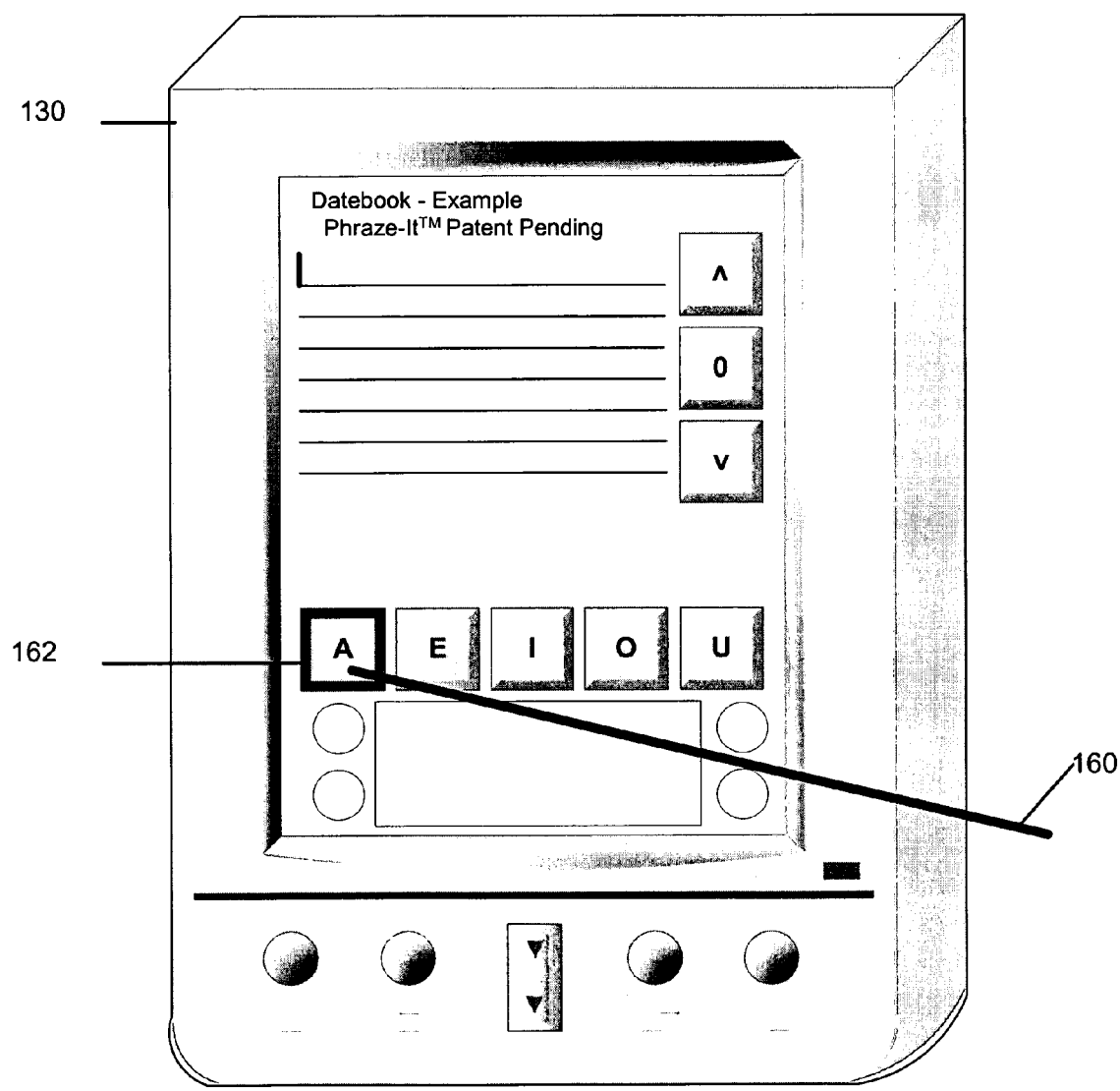
FIG. 35 illustrates how in an alternate embodiment a user can select an initial control key for entering data into the device.

FIG. 35 illustrates how in one alternate embodiment a user can select an initial control key for entering data into the device wherein the control keys occupy just a single line of the input region. In the example shown in FIG. 35, the control keys (in this instance the vowels A, E, I, O, and U) are distributed horizontally along just one row.

Figure 36:
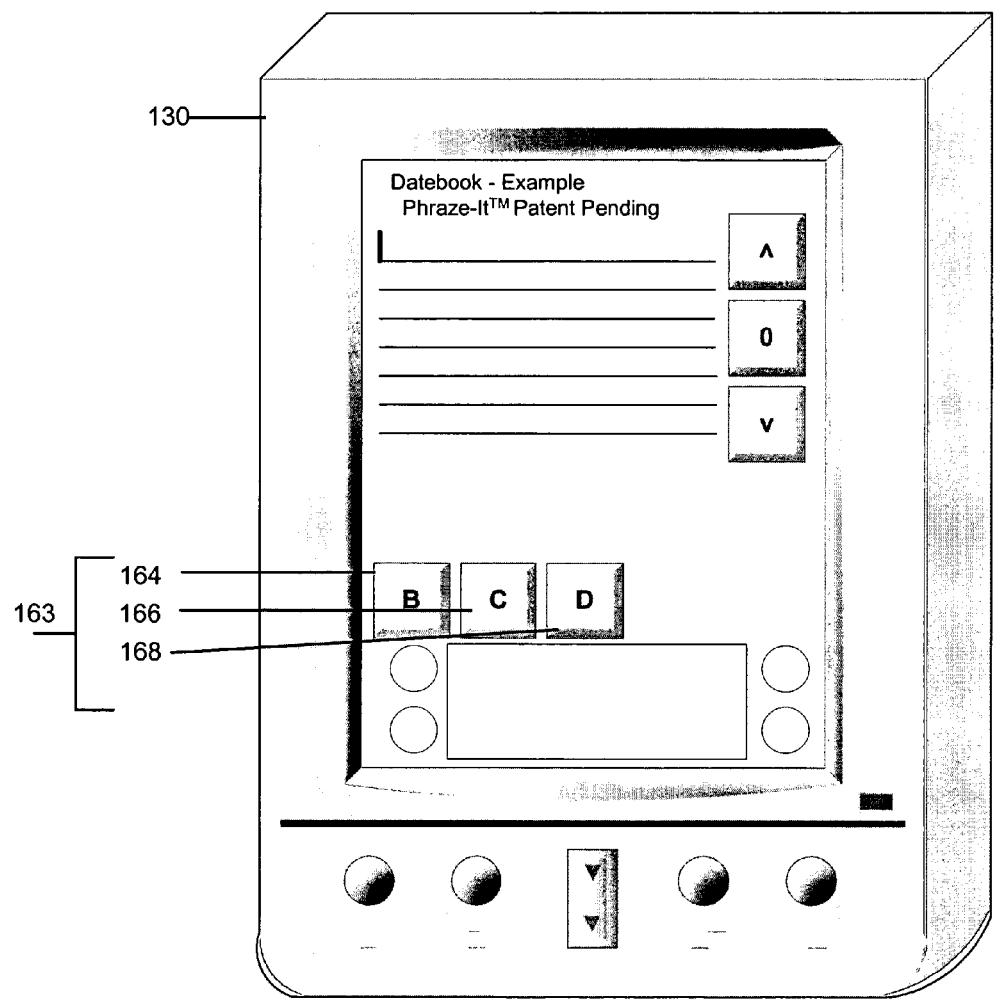
FIG. 36 illustrates how the display of the device changes when an initial control key is selected.

FIG. 36 illustrates how the display of the device changes when an initial control key is selected. As shown in FIG. 36, the secondary keys replace the entire row of control keys, which in the example shown means that when the "A" key is selected, all of the vowels are replaced with consonants B, C, and D, for further selection by the user or operator. The embodiment shown in FIG. 36 corresponds approximately to the five-button embodiment described above. It will be evident that other embodiments can be used, including for example a six-button embodiment, in which selection of the "A" key causes the A, B, C, and D keys to be displayed. Other implementations and distributions can be developed within the spirit and scope of the invention.

Secondary Button Selection Mechanism

Figure 19:
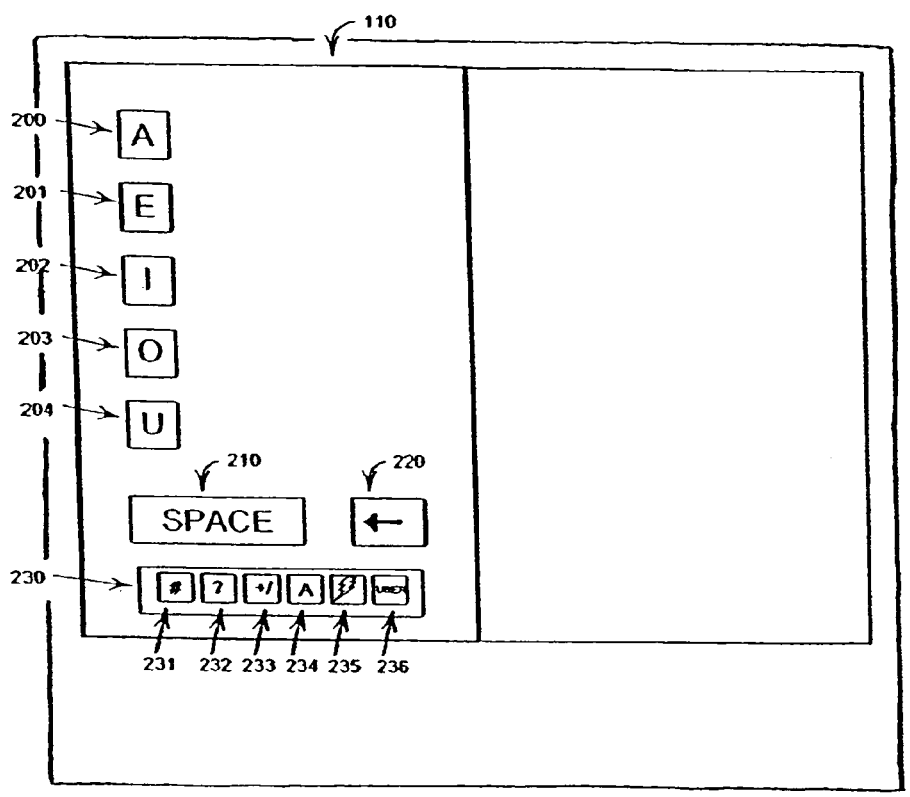
FIG. 19 shows an illustration of the character selection interface provided by one embodiment of the invention as used to select a character.

FIG. 19 shows an illustration of the character selection interface provided by one embodiment of the invention as it can be used to select a character or keystroke. Some of these and related features are described in further detail in related application "RAPID ENTRY OF DATA AND INFORMATION ON A REDUCED SIZE INPUT AREA", Ser. No. 09/592,323, filed Jun. 13, 2000, which is incorporated herein in its entirety. The input section 110 of the viewing area 100 allows a user to select characters. As shown in the embodiment of FIG. 19, short set of graphic images or characters is initially displayed on the input section 110 including, among other images, control buttons 200–204, a space bar button 210, a backspace button 220, and a menu bar 230. Other images and buttons can be recorded depending on the particular implementation.

The control buttons can be any selection of letters, numbers, characters, mathematical symbols, punctuation, or other objects. In FIG. 19, for example, the control buttons 200–204 are buttons representing A, E, I, O, and U respectively, i.e. the vowels of the English alphabet. Each of the control buttons 200–204 has a set of secondary buttons associated with it. So, for example, in one embodiment, control button 200 has associated with it secondary buttons for representing the letters A, B, C, and D. Control button 201 has secondary buttons E, F, G, and H associated with it. Control button 202 has secondary buttons 1, J, K, L, M, and N associated with it. Control button 203 has secondary buttons 0, P, Q, R, S, and T associated with it, and control button 204 has secondary buttons U, V, W, X, Y, and Z associated with it. As described, in some embodiments, the set of secondary buttons also include a button for the character represented as the selected control button, namely A, E, I, O, or U, depending on which is selected by the user.

Upon selection by a user of one of the desired control buttons 200–204, the processor receives a signal, and displays the associated list of secondary buttons. The non-selected control button may continue to be displayed or may be hidden, minimized or removed from view, depending on the desired implementation.

Figure 20:
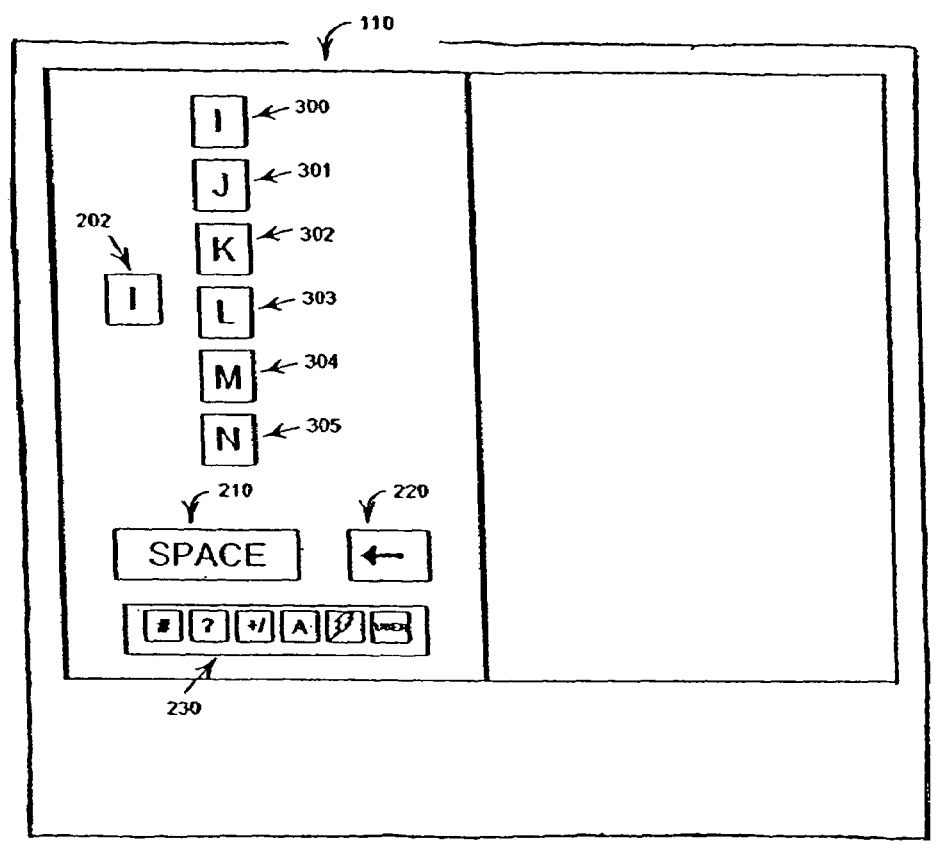
FIG. 20 shows a further illustration of the character selection interface provided by one embodiment of the invention as used to select a character.

FIG. 20 shows a further illustration of a character selection interface provided by one embodiment of the invention, as it is used to select a character. If, as shown in FIG. 20, the user selects control button 202, the remaining control buttons 200, 201, 203, and 204 are hidden or removed from display in the input section 110, and the secondary buttons 300–305 associated with the selected control button 202 are then displayed in the input section 110.

In one embodiment, the secondary buttons 300–305 may be oriented in a vertical fashion to the right of the control button 202, but close enough to the control button 202 to ergonomically enhance speed and ease of entry. In some embodiments, this spacing or positioning may be adjusted by the user. Alternatively, the secondary buttons 300–305 may be displayed in a variety of user-selected arrangements, including among other arrangements, horizontal, circular, semi-circular, and diagonal. Further, in some embodiments, the secondary buttons 300–305 may be displayed on a physically separate touch-sensitive display screen. Other embodiments may separate the control buttons and secondary buttons so that they are operated with different means. For example, the control buttons may be operated by the left side of the device while the secondary buttons are operated by the right hand. This is particularly useful in handheld device implementations. Control mechanisms other than control "keys" can also be used. For example, a jog wheel, such as found in some telephone devices, can be provided as a control key selection mechanism. Rotating the jog wheel can be used to select both the control button, and/or the secondary button.

In other embodiments, the control buttons 200–204 may remain on the input section 110, while the secondary buttons 300–305 are displayed in one of the above-described arrangements next to the control buttons 200–204. In some embodiments, the non-selected control buttons 200, 201, 203, and 204 may be displayed with reduced shading or differing color to show that they have not been selected.

In another embodiment, the non-selected control buttons 200, 201, 203, and 204 may remain active, thereby allowing the user to change the set of secondary buttons 300–305 currently being displayed by selecting one of the previously non-selected control buttons 200, 201, 203, or 204.

Regardless of the implementation used, once the user selects a control button and the secondary buttons are displayed, the user may then select one of the secondary buttons 300–305. Upon user selection, a signal is sent to the processor, which in turn stores the user-selected character or other symbol on a storage medium, or sends a signal to the display section 119 to display the selected character or other symbol or communicates the key selection to another process or application for further use.

In some embodiments, if the user does not select a secondary button 300–305 within a predetermined time, the secondary buttons 300–305 can be removed from the input section 110, and the original set of control buttons 200–204 are returned to the input section 110.

In addition, the user may desire to have the character that is being input capitalized. In some embodiments, the user may capitalize a character by simultaneously touching the selected control button 200–204, in this example 202, and the desired secondary button 300–305. For example, if the user desires to input a "L", the user would simultaneously touch the area on the input section 110, representing the control button 202, and the area representing the secondary button 303. The processor receives a signal from the input section 110 and in return stores an "L" on a storage medium, or sends a signal to the display section 119 to display an "L".

Alternatively, in another embodiment, the user may quickly tap the input section 110 representing the desired secondary button 300–305 two times in succession, thereby alerting the processor to store or display a capital letter. Further, if the user wishes to capitalize all characters that will subsequently be input, they may quickly tap the area representing a control button 200–204 twice, thereby setting what is known as a "caps lock". The user may remove the caps lock by repeating the process of quickly tapping the area representing a control button 200–204 twice.

In some embodiments, a button representing a "shift" key is displayed on the input section 110. In such embodiments, a user can capitalize a character by touching the "shift" button and then the desired secondary button 300–305.

Once the user has selected a secondary button 300–305 to be input, the processor then removes the secondary buttons 300–305 and returns the original set of control buttons 200–204 to the input section 110. A slight delay can be introduced between the time the desired secondary button 300–305 is selected and the removal of the buttons. This delay gives the user enough time to capitalize the desired character by the process described above but is short enough in duration to enhance the speed of overall operation and input.

In some embodiments a menu bar 230 displays additional available control buttons, functions, and options that are currently available to a user. In one embodiment, the menu bar 230 may display the buttons 231–236, which represent different sets of control buttons, for example, one for entering numbers 231, one for entering punctuation 232, one for entering mathematical functions 233, one for entering standard characters 234, one for checking battery supply 235, and one for additional or customized system or user features 236. Other embodiments could include sets of control buttons other than those listed here. If the user desires to change the set of control buttons, or their arrangement, from those displayed on the input section 110, the user selects the desired control button 231–236 from the menu bar 230. The processor receives a signal from the menu bar in response to the user's input and subsequently removes the current set of control buttons, e.g., 200–204, from the input section 110 and displays a new set of control buttons on the input section 110. Thus, it should be clear that control buttons and secondary buttons can be designed to accommodate virtually any input language or any type of character set or symbol set that might be desirable to input and display.

In addition, in some embodiments a user may select the user button 236 from the menu bar 230 allowing selection of optional features. In some embodiments, this can be used to select, among other things, how the buttons are being displayed on the input section 110, the size of the buttons, and the brightness/tint of the viewing area. For example, the control buttons can be arranged for either right- or left-handed users and in any desired shape and order. In some embodiments, a user could select to have the control buttons displayed vertically, as shown in FIG. 19, horizontally, circularly, semi-circularly, diagonally, or in any other arrangement.

A space bar button 210 is included in some embodiments to allow the user to easily input a space character. In most implementations the space bar button 210 is located in an area that is easily accessible by the user to increase speed of input and ergonomic comfort. For example, the space bar button 210 may be located in a position easily accessible to the user by use of their thumb. Once the area of the input section 110 that is displaying the space bar button 210 is touched by the user, a signal is sent to the processor which in return stores a space character on a storage medium (not shown) and sends a signal to the display section 119 to display a space in the information that is currently being displayed. The display section 119, in response to the signal displays a space in the information currently being displayed. Alternatively, in some embodiments, the space bar button 210 may be included in the punctuation button set, which in FIG. 19 is represented by button 233.

The backspace button 220 allows the user to easily remove previously entered information. When the area of the input section 110 that is displaying the backspace button 220 is touched by a user, a signal is sent to the processor which in response to the signal removes the previously selected character or other symbol from memory and sends a signal to the display section 119 to remove the previously selected character or other symbol from the display. The display section 119 in response to the signal removes the character or other symbol from the display section 119 of the viewing area 105.

Figure 21:
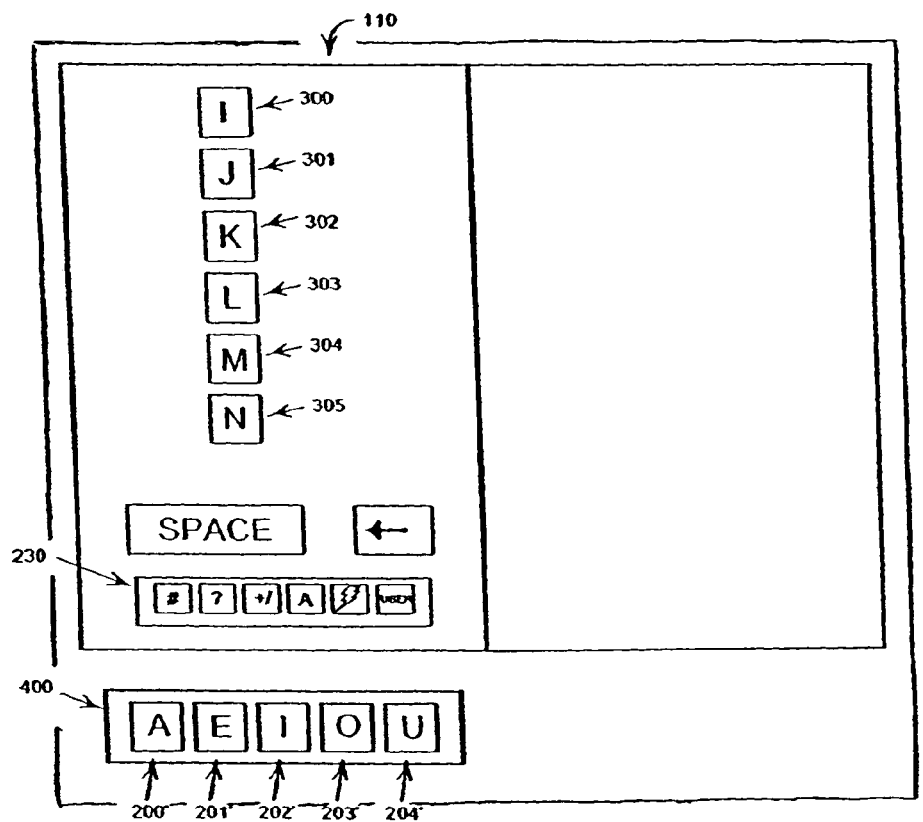
FIG. 21 shows an illustration of the character selection interface provided by an alternate embodiment of the invention.

FIG. 21 shows an illustration of the character selection interface provided by an alternate embodiment of the invention. In the embodiment of FIG. 21, an additional keypad 400 is provided, functioning as part of the input section 110, in communication with the processor. The keypad 400 contains control buttons 200'–204'. In some embodiments that use this feature, the input section 110 of the viewing area 105 does not initially display any buttons. In other embodiments, the input section 110 of the viewing area 100 initially displays the menu bar 230.

The user performs the step of selecting a control button 200'–204' by pressing one of the buttons on the keypad 400. This selection sends a signal from the keypad 400 to the processor, which in return sends a signal to the input section 110 of the viewing area 100 to display the associated list of secondary buttons 300–305. The remaining procedure of the user selecting an item may be performed as described above. It is to be understood that although a 5-key keypad is illustrated, any number or arrangement of keys could be used, including a standard typewriter-style (QWERTY) keyboard, commonly used for English and other languages.

Additional embodiments and variations on the above described interfaces and character selection mechanisms are described in further detail in copending application "RAPID ENTRY OF DATA AND INFORMATION ON A REDUCED SIZE INPUT AREA", Ser. No. 09/592,323, filed Jun. 13, 2000, which is incorporated herein in its entirety.

Alternate Horizontal Key Layouts for Portable Devices

The control button/secondary button mechanism described above can also be used to provide alternate embodiments in which the control and secondary keys are distributed in a different manner. Some if these embodiments are described below with particular application and PDA style devices although it will be evident that the mechanisms and technologies described herein may be offered to a user with a wide variety of devices.

Figure 22C:
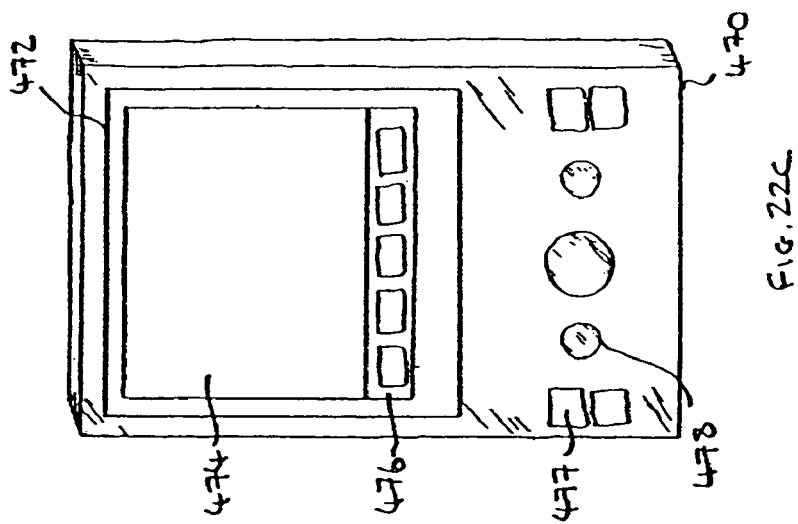
FIGS. 22A through 22C illustrate various embodiments of the invention as they may be used with or incorporated into PDA style devices.
Figure 22B:
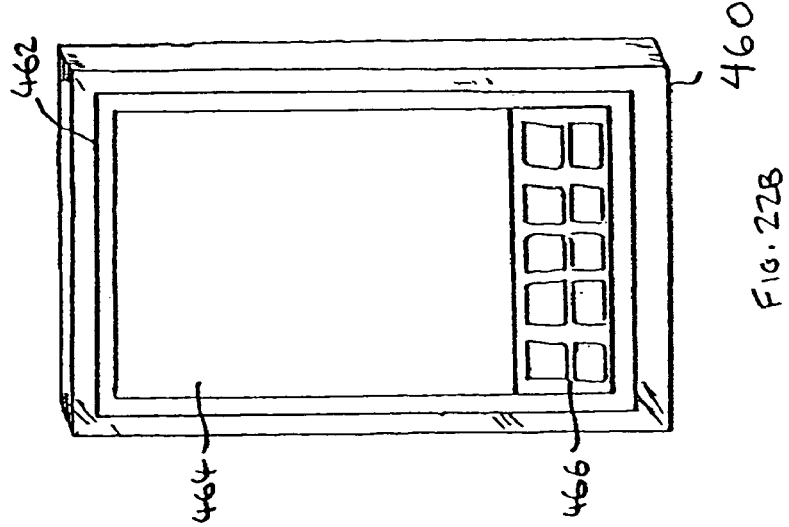
Figure 22A:
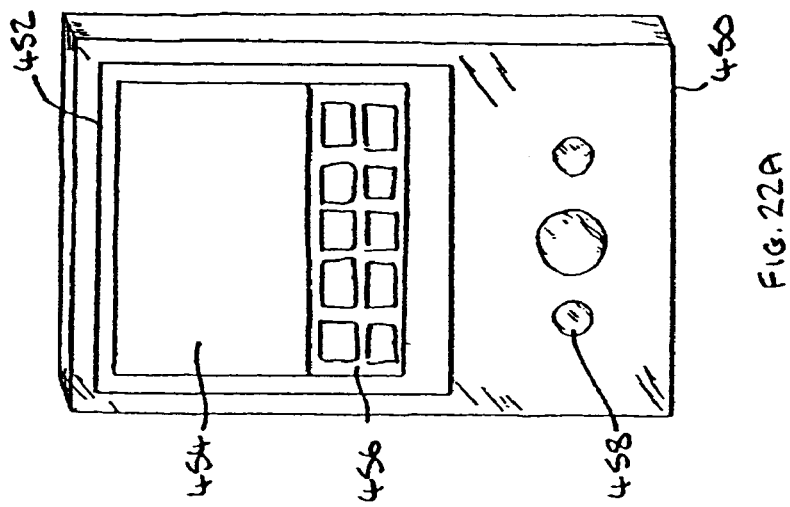

FIGS. 22A through 22C illustrate various embodiments of the invention as they may be used with or incorporated into PDA style devices. The interface can also be used with other communications or computer devices, electronic gaming machines, or handheld computers, such as, for example, those used by law enforcement agencies and delivery companies. As shown in FIG. 22A, for example, the PDA device 450 includes an interface 452 which in most instances is a touch sensitive display, that can be operated by the user using either their finger or a stylus device. The interface area 452, includes both a text entry screen 454, and a character selection region 456. The character selection region 456 includes both control keys and secondary input keys as described in further detail above. Using the character input mechanism 456, the user can quickly and easily enter data into the data input region of the PDA device. The device shown in FIG. 22A includes regular PDA control buttons 458, which in some embodiments may be used as additional control buttons. FIG. 22B illustrates an alternate embodiment of the PDA style device, in which the PDA device 460 includes a larger interface area 462, which similarly includes a data input screen 464, and a key selection region of the screen 466. As with the other embodiments, the key selection mechanism 466 may be used to select and/or enter key strokes into the display screen 464 for use by the device. FIG. 22C illustrates a different implementation, in which the PDA device 470 includes an interface region 472, including a data entry and viewing screen 474, and a set of control buttons 477. An additional set of buttons 476 are used to provide key selection into the device. As described in further detail below the set of control buttons 477 can be provided as hard buttons (i.e. mechanical rather than touch-sensitive) to control the initial selection of the key, while the on-screen buttons 476 are used to select the particular character. The device shown in FIG. 22C also incorporates the standard PDA type buttons 478 that may be used in conjunction with the interface and control buttons to select particular characters. It will be evident to one skilled in the art that the implementation shown in FIGS. 22A through 22C are given for purposes of illustration and many other variations of these embodiments can be envisaged.

Vertical Layout for Portable Devices

Figure 23B:
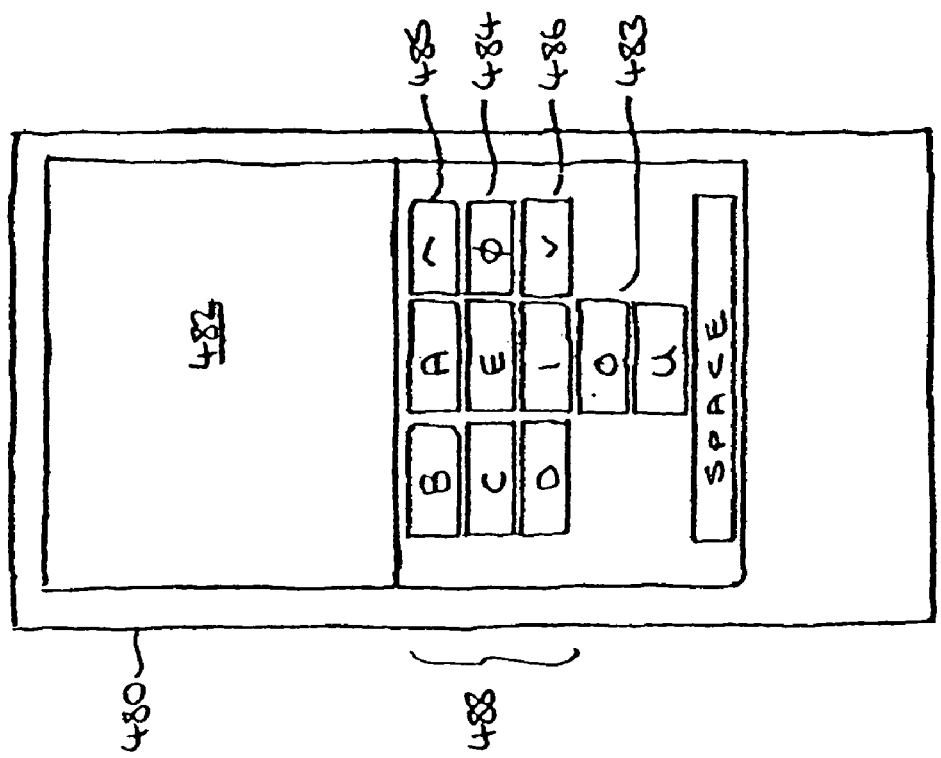
FIGS. 23A and 23B illustrate an alternative embodiment of an interface that may be used with a PDA software application, in which the selection keys are arranged vertically.
Figure 23A:
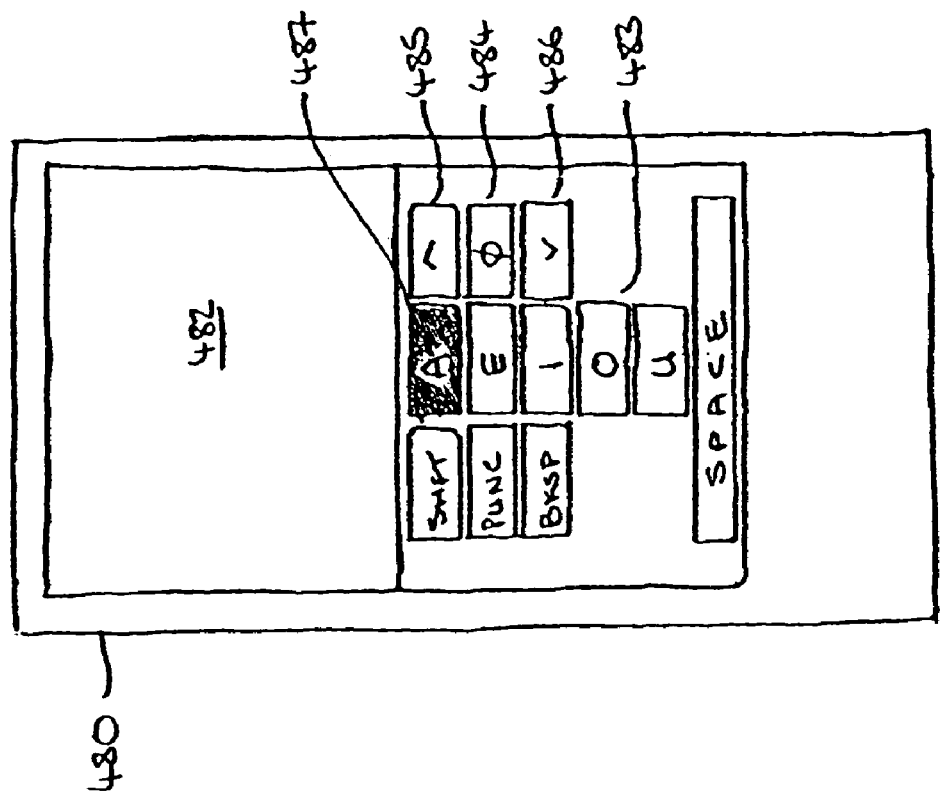

FIGS. 23A and 23B illustrates an alternative embodiment of an interface that may be used with a PDA style device, in which the selection keys are arranged vertically. As shown in FIG. 23A, the interface 480 includes, a data entry and display portion 482, wherein the control keys 483 are arranged vertically. The secondary selection keys 488 are also arranged vertically as are the number selection keys 484, and number increment and decrement keys (485 and 486 respectively). When a user selects one of the control keys, for example the "A" key 487, the secondary set of keys 488 appear vertically and to the left of the control keys. It will be evident that, while the keys shown in FIGS. 23A and 23B are distributed vertically down the center of the device, for ease of use in data entry, and particularly so that the secondary keys are not obscured by the users fingers or stylus, other implementations may place a portion of the keys at either side of the data display area, for ease of use in entering keys.

The vertical (column) embodiment may in some instances be a more rapid manner of entry to devices than the horizontal embodiments described above. Since some PDA devices such as the Palm OS devices (other than the Samsung I300) do not permit removal of the Graffiti entry area, the key selection mechanism in those environments is best suited to a horizontal layout, so that there is sufficient visual display room to enter several lines of characters, text, numbers, symbols, etc. Pocket PC, Windows CE devices and other devices typically have a screen large enough to support data input using the vertical (column) configuration.

Benefits of the vertical (column) input method and system include: Input with index finger and middle finger may be faster than the horizontal mode; there should be less hand movement; easy input with two index fingers or two thumbs; the method allows for alternatives to give the users a more user friendly choice of where the columns will be (e.g. right edge, left edge, middle of screen), and on which side of the vowels the associated buttons will be located for ambidextrous use; and, the configuration of a middle screen may be switched to a mirror image for the purposes of making it ambidextrous. For instance, this layout may be best for selecting the vowels with the middle finger of the right hand and then selecting the associated letters with the index finger.

In most implementations, when a user has made a selection, the screen defaults back to the default screen. Additionally, there may be an optional timer that causes the screens to default back to the default screen.

Alternate Vertical Key Layouts for Portable Devices

Figure 24C:
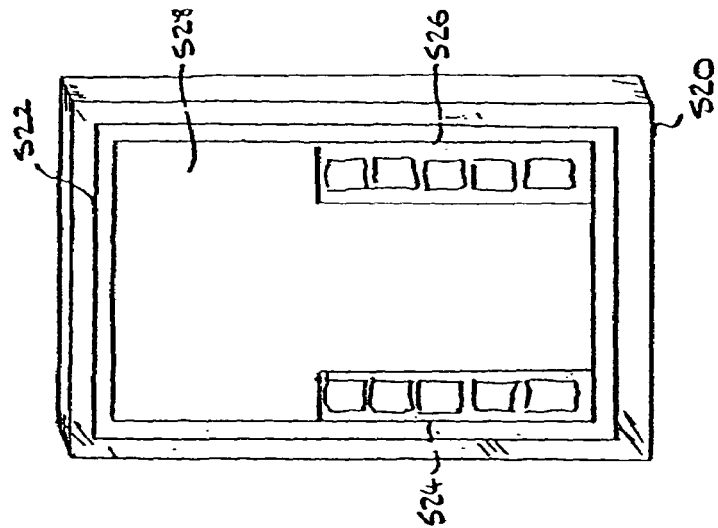
FIGS. 24A through 24C illustrate alternate embodiments of the invention, in which the control buttons and selection keys are distributed in a vertical manner.
Figure 24B:
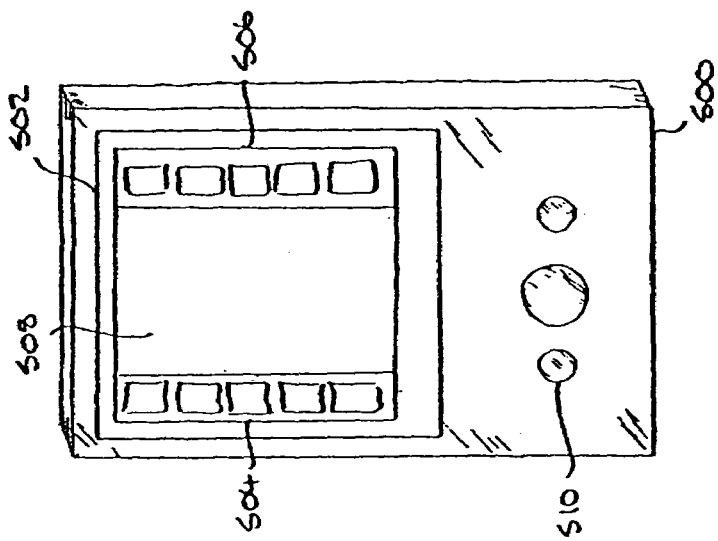
Figure 24A:
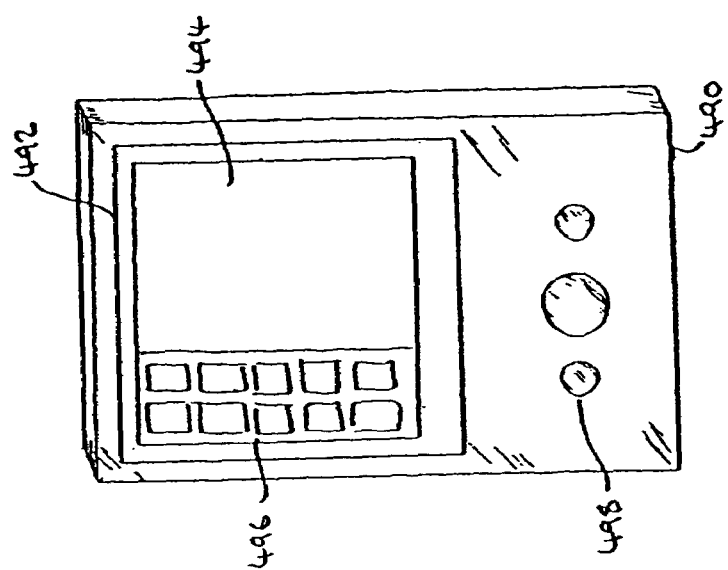

FIGS. 24A through 24C illustrate alternate embodiments of the invention, in which the control buttons and selection keys are distributed in a vertical manner, which in some instances provides for quicker entry of data. As shown in FIG. 24A, for example, the PDA or equivalent device 490 includes an interface 492, which includes a data entry portion 494 and a control key or character selection portion 496, that is distributed vertically either to the left or the right of the data entry portion 494. Since a portable device is typically held in the user's hand, arranging the control keys and/or the selection keys in a vertical manner sometimes allow for quicker or easier access. In some instances the PDAs built in buttons 498 may be used as control keys or control buttons while the key selection mechanism 496 is used merely to select the secondary buttons for entry of the key stroke into the device. FIG. 24B illustrates an alternate embodiment where the PDA device 500 includes an interface 502 in which the control keys and/or secondary selection mechanisms are distributed in different portions of the device. For example, as shown in FIG. 24B, the control buttons 504 are placed to the left side of the data entry portion 508, while the secondary selection mechanism 506 is distributed vertically at the right hand side of the data input area 508. Again the PDA's control buttons 510 may be used to as a secondary control mechanism. Arranging the keys in this manner allows the operator to use one hand to operate one side of the device, for example, the control mechanism 504, while they use their other hand to operate the key selection mechanism 506. FIG. 24C illustrates a further embodiment using a vertical distribution of keys, in which the PDA device 520 includes and interface 522 wherein the text input area 528 takes up substantially all of the front of the device 520, with the character selection mechanisms distributed to the left and right hand sides in a position that they can be used easily by the operator. For example, in FIG. 24C, the character control button 524 is distributed vertically on the left hand side of the screen while the key selection mechanism 526 in distributed vertically at the right side of the screen. It will be evident that other implementations using this vertical arrangement of keys can be envisaged within the spirit and scope of the invention.

Many different variations of key layout and interface mechanism can be used with the above embodiments, and only a small number are described herein. It will be evident to one skilled in the art that many variations on the distribution of keys and/or the input processes of character selection can be provided within the spirit and scope of the invention.

Hard Key Implementations

Figure 25C:
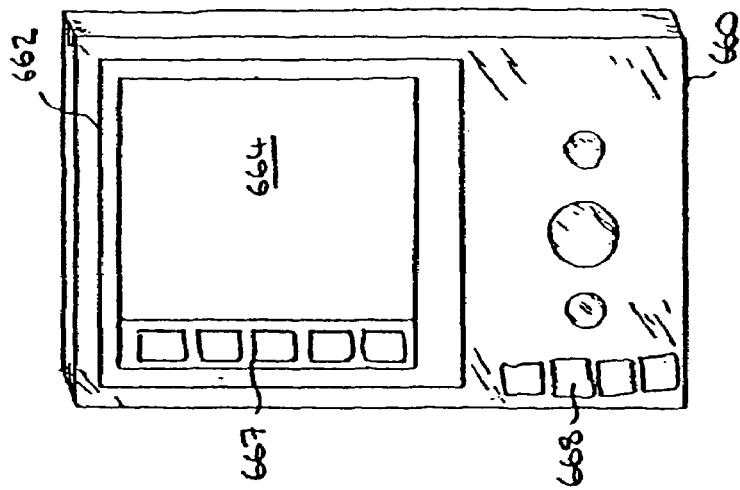
FIGS. 25A through 25C show illustrations of embodiments of the invention as it may be used or incorporated with a handheld computer device that includes "hard keys".
Figure 25B:
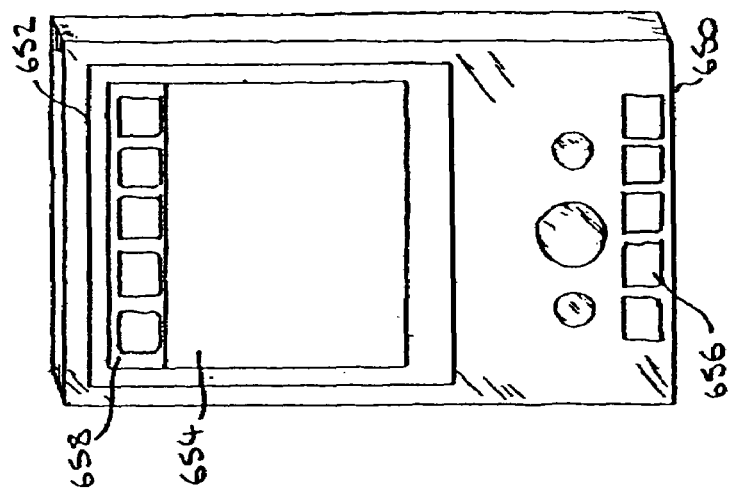
Figure 25A:
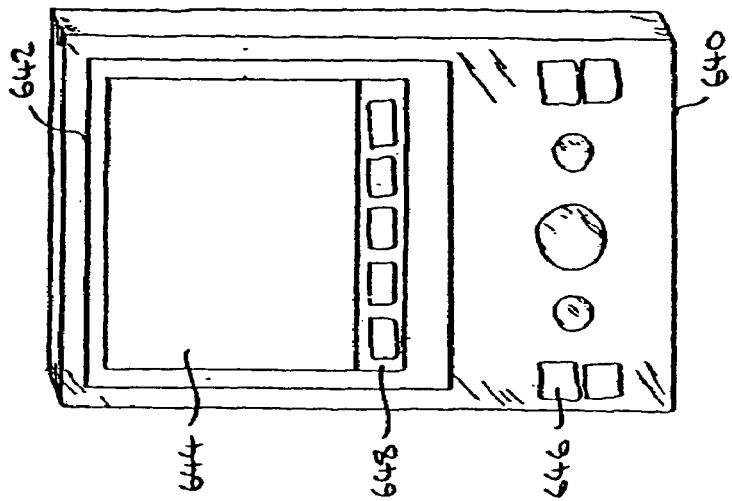

FIGS. 25A through 25C show illustrations of embodiments of the invention as it may be used or incorporated with a handheld computer device that includes "hard keys". As shown in FIG. 25A, the PDA, cell phone/PDA hybrid, cell phone, computing device, communicating device, email device, pagers, digital remote control, Web Tablet, Internet appliance, interactive TV or video device or handheld device 640 includes an interface 642 that includes a touch-sensitive data display screen 644. A set of control buttons 646 is provided as "hard", i.e. mechanically operated buttons on the front of the device. The hard control buttons are arranged such that they can be easily manipulated by the user. An additional set of control and/or secondary buttons 648 are provided on the touch-sensitive screen, as with the previously described embodiments. The hard control buttons are used in a manner similar to the touch-sensitive ("soft") control buttons, but since they do not rely on the underlying software application or the placement of the touch-sensitive display, the hard control buttons can be distributed in an optimal manner for fast data input. FIG. 25B shows an alternate implementation that can be used with a handheld device 650, in which the hard control buttons 656 are distributed along the bottom of the device. The interface 652 includes a set of secondary control mechanisms 658 distributed across the top of the data display area 654. FIG. 25C shows a further embodiment of the invention in which the hard control buttons 668 are distributed along the side of the device 660. The secondary control mechanism 667 is arranged along one side of the interface 262 of the data display area 664.

Many different variations of hard key layout can be used. It will be evident to one skilled in the art that many variations on the hard key control button arrangement can be used within the spirit and scope of the invention.

Miniature Display Screen Implementation

Figure 26A:
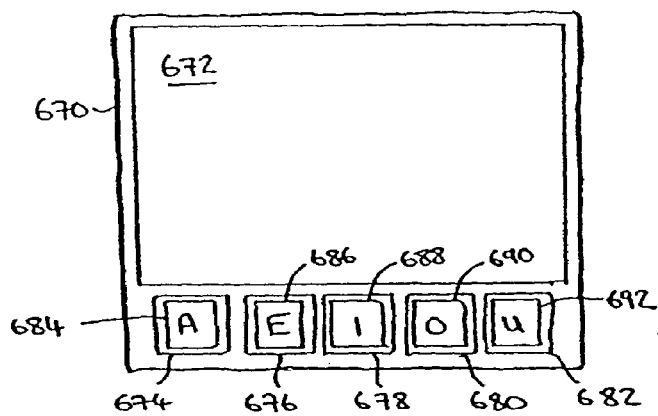
FIGS. 26A through 26C illustrate how control keys or control buttons with miniature display areas can be used in accordance with an embodiment of the invention to provide an input mechanism that allows a user to enter data into a device or application.
Figure 26B:
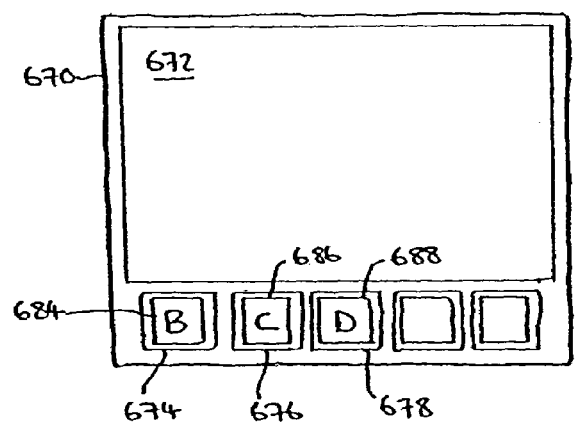
Figure 26C:
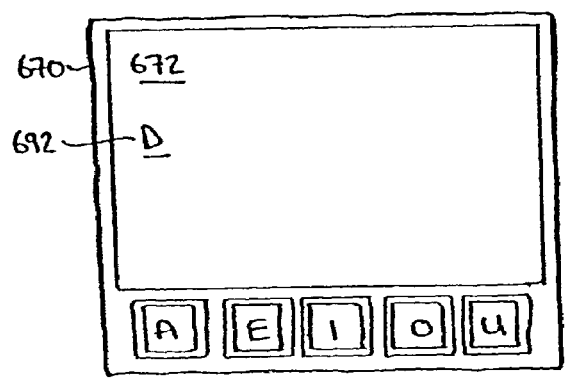

FIGS. 26A through 26C illustrate how keys or buttons with miniature display screens or display areas can be used in accordance with an embodiment of the invention to provide a highly flexible input mechanism that allows a user to enter data into a device or application. As shown in FIG. 26A, the interface 670, 672 includes a set of hard control buttons 674, 676, 678, 680, 682, each of which control buttons includes a miniature display area 684, 686, 688, 690, 692 positioned on top of, or within the control button. In the example shown in FIG. 26A, the control buttons and the miniature displays thereon, initially represent the characters "A", "E", "I", "O" and "U", as with the previous examples described above, although it will be evident that different key representations can be used. As shown in FIG. 26B, once a user selects one of the control buttons 674, 676, 678, the miniature displays 684, 686, 688 on some or all of the control buttons changes to reflect the secondary set of inputs, for example in this instance the "B", "C" and "D" characters. The user or operator can then select one of these characters, for example the "D" character, to enter a letter "D" into the device or application. As shown in FIG. 26C (by 692), once the key has been entered, the miniature displays on the control keys revert back to their original representation.

Figure 27A:
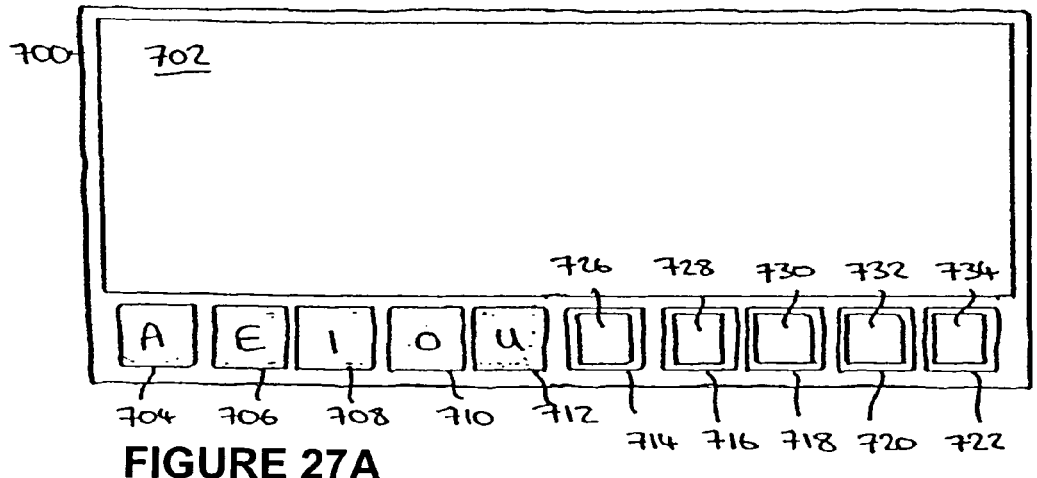
FIGS. 27A and 27B illustrate an alternate embodiment of the control keys having miniature displays thereon, in which the device incorporates a number of regular hard control keys, and control keys each having miniature displays.
Figure 27B:
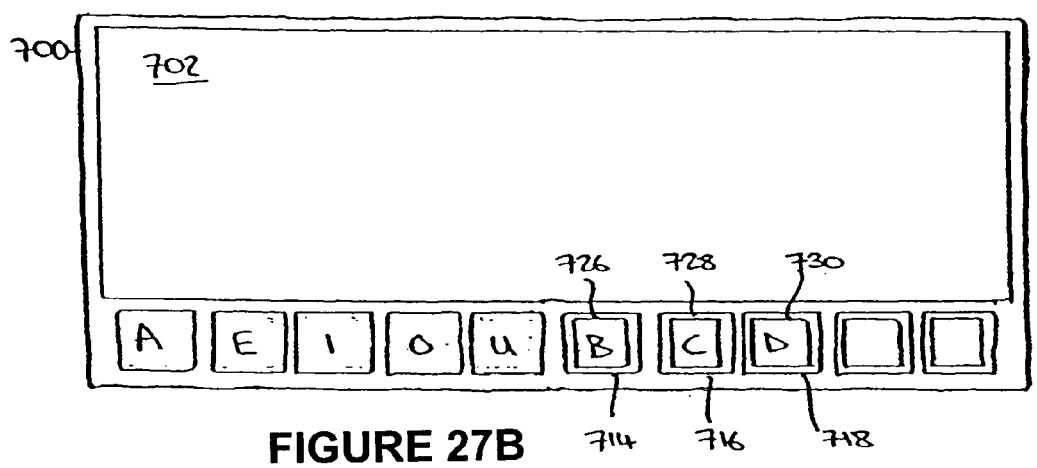
Figure 27C:
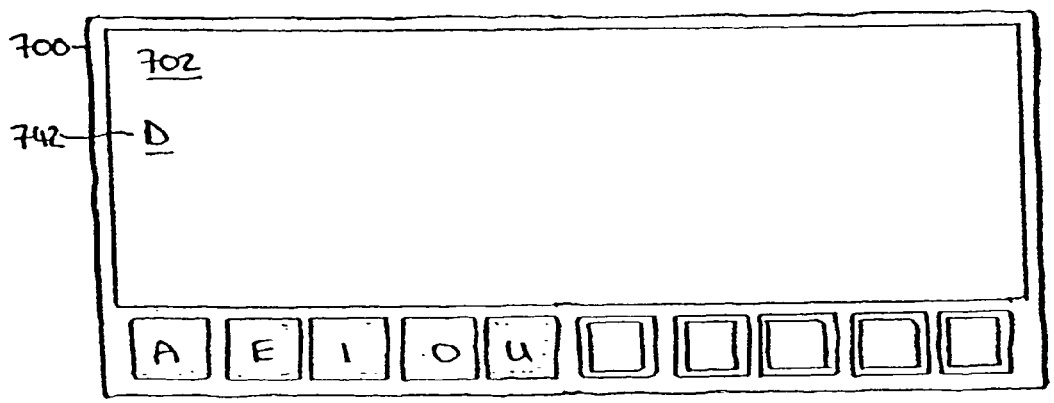
FIG. 27C illustrates the interface returned to its original format.

FIGS. 27A and 27B illustrate an alternate embodiment 700 and screen 702 of the control keys having miniature displays 726, 728, 730, 732, 734 thereon, in which the device incorporates a number of regular hard control keys 704, 706, 708, 710, 712 (i.e. without any miniature display), and an additional set of control keys 714, 716, 718, 720, 722 having miniature displays 726, 728, 730, 732, 734, to provide a mechanism by which the user uses a combination of hard control keys and miniature display control keys to enter data. As shown in FIG. 27A, for example, the letters "A", "E", "I", "O" and "U" are represented as regular hard control buttons 704, 706, 708, 710, 712, while a series of additional control buttons 714, 716, 718, 720, 722 with displays 726, 728, 730, 732, 734 thereon are also presented to the user. In normal use, the user may choose to operate the hard control buttons with their left hand, while their right hand operates the control buttons having miniature displays. As shown in FIG. 27B, once the user selects a particular control button, for example in this instance the "A" key, the miniature display on the control buttons having miniature displays changes to reflect the secondary buttons, in this example the characters "B", "C" and "D". The user may then select one of these secondary characters for entry into the device or the application 742. Once the key has been selected and entered into the application, the interface returns to its original format, as shown in FIG. 27C.

Worked Example with Horizontal Key Implementation

In a typical implementation, the control keys or buttons are presented as a first list of vertically or horizontally arranged letters, and the selection of a particular control key is used to present a second (associated) list of vertically or horizontally arranged buttons or characters, from which the user can select one of those characters for entry into their application.

The FIRST SCREEN/LIST normally displays Control keys/Vowels. In this arrangement, the viewing area has as a first screen a short list of characters, letters or other symbols in an arranged order. For example, the control keys (which in this embodiment are the vowels of the alphabet) can be distributed vertically as shown below:

A

E

I

O

U or they can be distributed horizontally. In one horizontal embodiment the vowels are arranged horizontally on a first touch sensitive screen as shown below:

A E I O U

The SECOND SCREEN/LIST normally displays Associated Letters. In this arrangement, tOnce the user presses or selects a control key or button, i.e. selects a vowel from the list on the screen (for instance with their middle finger, or index finger, or thumb, or with a stylus or mouse or other pointer), an associated list of characters is displayed either side-by-side on the same screen, or on a second screen (The Secondary or Associated letters) for input into the device. For example, where a user has pressed the "A" button on the touch screen, the associated characters displayed are as shown below:

```
Associated Key    A    B    C    D
                  |    |    |    |
Control Key       A
```

The user then touches any of the associated letters for inputting that letter or character into the device. If the user presses "E", then the user will see displayed the following characters near the E:

```
Associated Key    E    F    G    H
                  |    |    |    |
Control Key       E
```

Similarly if the user presses "I" then the user will see displayed the following characters near the I:

```
Associated Key    I    J    K    L    M    N
                  |    |    |    |    |    |
Control Key       I
```

If the user presses "O" then the user will see displayed the following characters near the O:

```
Associated Key    O    P    Q    R    S    T
                  |    |    |    |    |    |
Control Key       O
```

Similarly, if the user presses "U" then the user will see displayed the following characters near the U:

```
Associated Key    U    V    W    X    Y    Z
                  |    |    |    |    |    |
Control Key       U
```

Again, the user touches any of the associated (also referred to as the Secondary letters) to input that Secondary letter into the device. Any letter or character entered appears on the display of the device. For purposes of this embodiment, each vowel has an associated set of letters.

In one embodiment, as soon as the user has inputted one of the associated letters on the screen, the associated list may be removed or hidden and the user is returned to the first screen containing the five vowels. The user then can rapidly repeat the process for entering Secondary letters to enter text.

A similar mechanism as described above can also be provided in, for example, a 5 button variant, as shown below.

```
Associated Key    B    C    D
                  |    |    |
Control Key       A
```

The user then touches any of the associated letters for inputting that letter or character into the device. If the user presses "E", then the user will see displayed the following characters near the E:

```
Associated Key    F    G    H
                  |    |    |
Control Key       E
```

Similarly if the user presses "I" then the user will see displayed the following characters near the I:

```
Associated Key    J    K    L    M    N
                  |    |    |    |    |
Control Key       I
```

If the user presses "O" then the user will see displayed the following characters near the O:

```
Associated Key    P    Q    R    S    T
                  |    |    |    |    |
Control Key       O
```

Similarly, if the user presses "U" then the user will see displayed the following characters near the U:

```
Associated Key    V    W    X    Y    Z
                  |    |    |    |    |
Control Key       U
```

Simple, fast, intuitive entry comes from the ease of tapping two fingers next to each other to produce a character. The first tap is on a vowel, which produces the associated letter. The second tap enters an associated letter. For example, tapping the middle finger and then the index finger in quick succession inputs the desired Associated or Secondary letter. The overall process is easy and comfortable for the user. One such tap of both fingers is the high-speed entry of a letter on to a portable touch screen device. Entry of a six-letter word only requires tapping two fingers six times. There is no need for the hand to move. Using such an interface it can be seen that one hand is sufficient for word processing in a limited area of a portable device. The proximity of the letters means no searching around or moving the hand and this results in faster text entry then with traditional mechanisms.

For example, the word "teach" can be entered as described below using one finger or two fingers, or alternatively one or two thumbs without moving the hand or searching for keys.

First Screen (Control Keys):

Touching the vowel "O" produces an associated group of letters, either on a second screen or grouped around the letter "O" on the first screen.

A E I O U

Second Screen (Secondary Keys) to select T:

O P Q R S T

By touching any of the Associated letters on the Second Screen causes that letter or character to be inputted into the device. In this case the letter "T" has been entered.

Return to the First Screen to select E->E:

```
E F G H
|
A E I O U
```

Return to the First Screen to select A->A:

```
A B C D
|
A E I O U
```

Return to the First Screen to select A->C:

```
A B C D
|
A E I O U
```

Return to the First Screen to select E->H:

```
E F G H
|
A E I O U
```

Thus, as shown above with virtually no movement of the eyes, hand or fingers, the word "TEACH" can be inputted with either one or two hands and in a manner that is quick, comfortable and accurate. The embodiment described immediately above uses the 6-button variant to enter the word "TEACH". It will be evident that a similar example could be given using the 5-button variant, in which the primary difference would be that the selected vowel (the initially selected control button) does not appear on the secondary screen.

Display Screen Feedback Implementation

Figure 28:
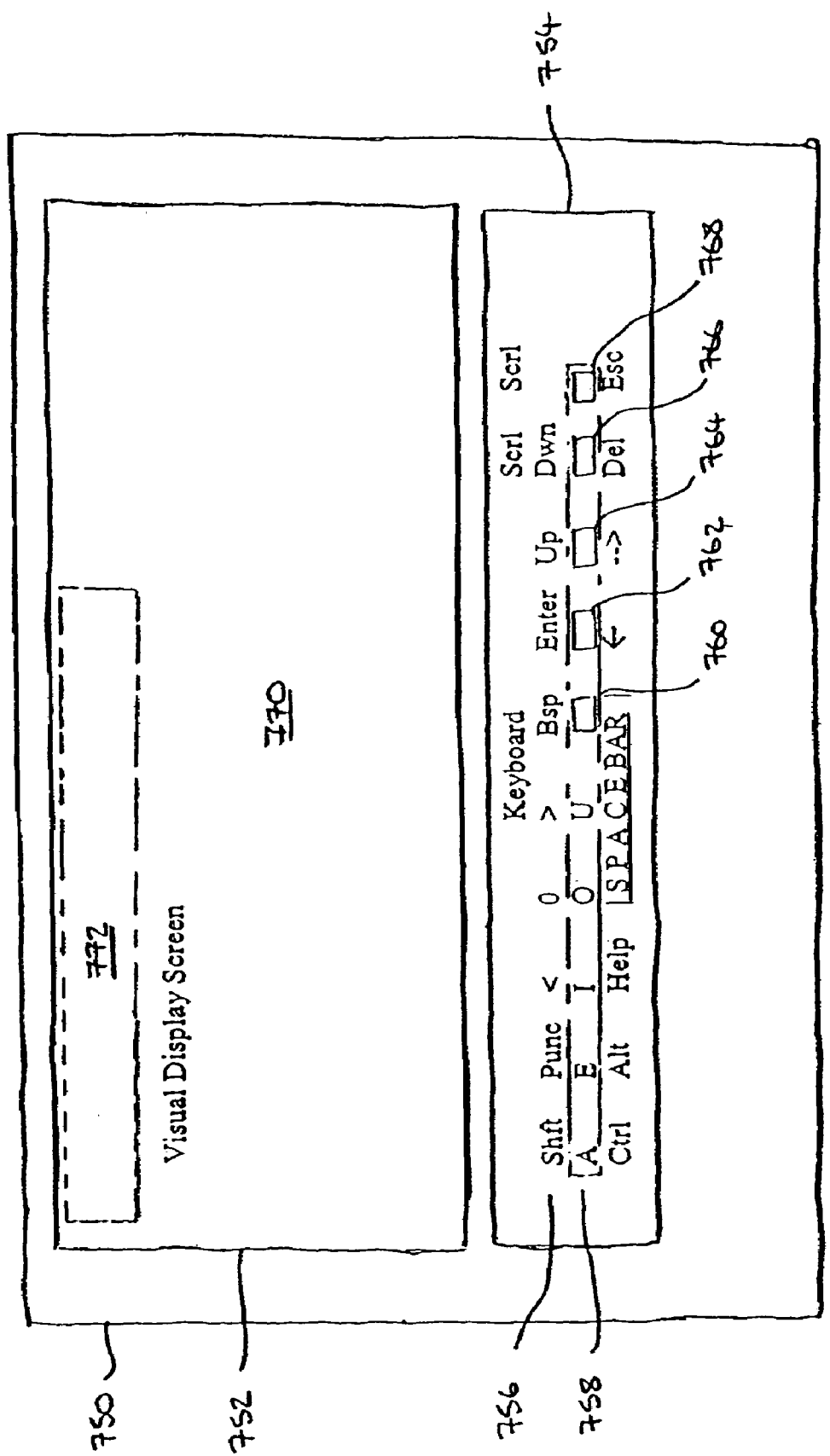
FIG. 28 illustrates an alternate Web Pad embodiment of the invention.

FIG. 28 illustrates how the interface of one embodiment of the invention can be incorporated into a device such as a computer, or a Web pad device, PDA, entry device for an Interactive TV, video device, digital remote control that may include either an incorporated or an external keyboard (not shown). As shown in FIG. 28, this Web pad interface 750 may be displayed on the user's computer screen 752, for example, includes an interface edit screen or display 770 that displays the data or characters entered by the user. A character selection portion 772 is shown at the top of the display screen. The character selection portion is used to display active keys or options available to the user. An additional key selection mechanism 754 which includes a number of control keys 756, 758 and additional keys 760, 762, 764, 766, 768 are displayed at the bottom of the screen. When one of the control keys is selected, the corresponding secondary keys are selected and shown in the key selection window 772 at the top of the user's screen. In this way the user can quickly select keys using the key selection mechanism 754 without taking their eyes off the visual display screen 770. This feature is useful for people who are unfamiliar with large number of characters on their keyboard and who wish to type using just a smaller set of keys and keeping their eyes on a smaller visual display screen.

Figure 29A:
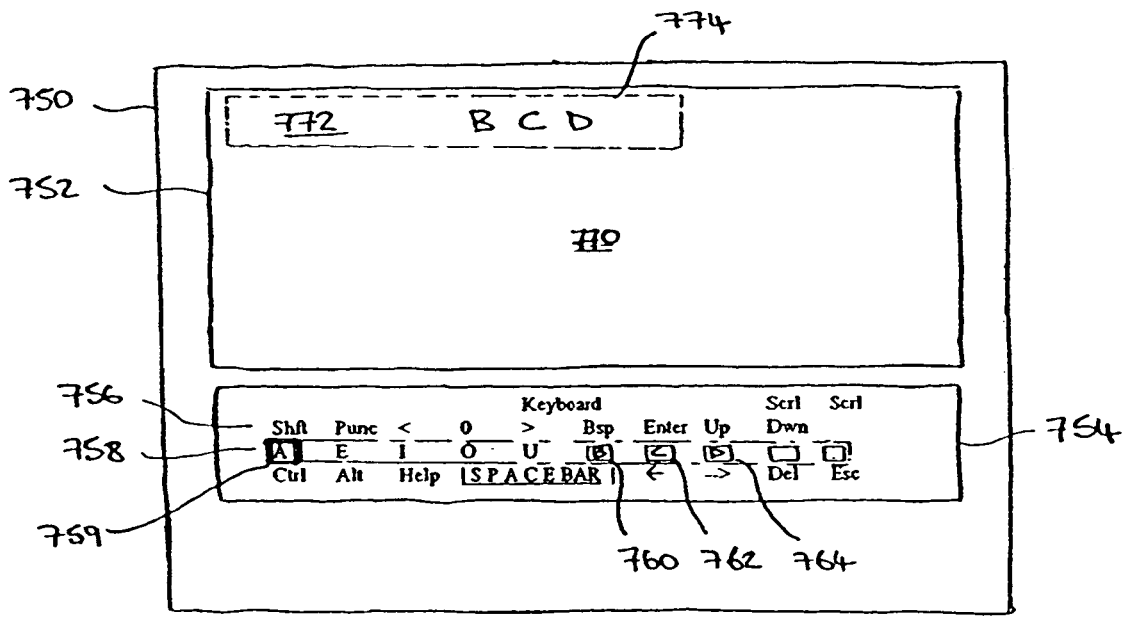
FIGS. 29A and 29B illustrate how the interface such as provided in the Web pad environment can be used to enter data into the Web pad.
Figure 29B:
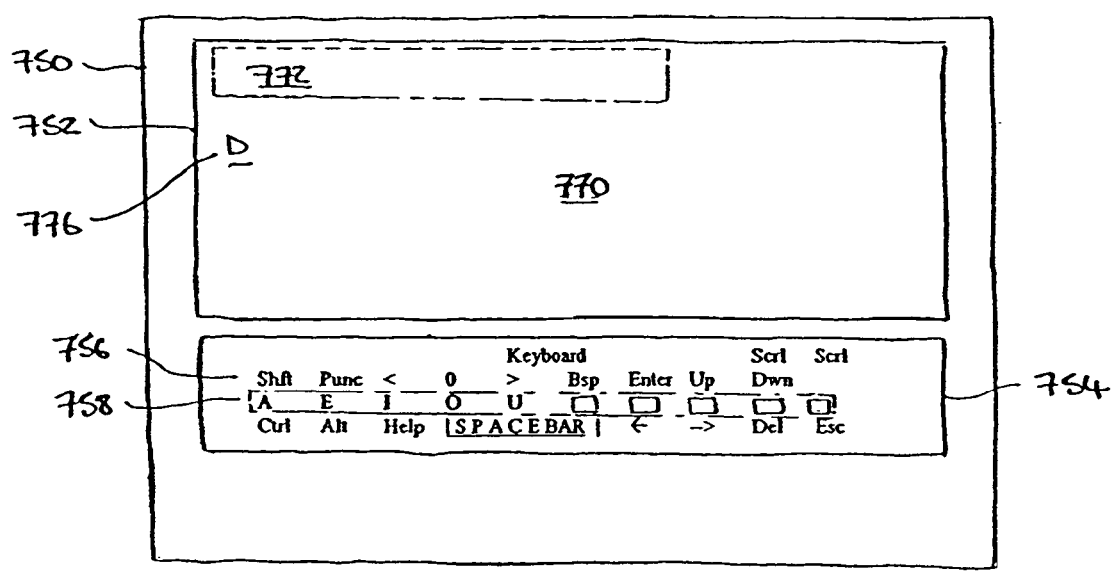

FIGS. 29A and 29B illustrate how the interface such as provided in the Web pad environment can be used to enter data into a device such as a Web pad, PDA or computer. For example, in FIG. 29A, the keyboard includes a number of hard keys and also a number of keys in which a miniature display is mounted to the key, much as in the interface described above with respect to FIG. 27. When the user selects a control key, for example the character "A", the keyboard can reflect the additional buttons by changing the image that appears on the miniature displays. At the same time the visual display screen 752 can represent to the user their available key-selection options 774, in the positions that they correspond to the user's fingers. This visual feedback mechanism is useful in communicating to the user their available key selection options without forcing them to look down at their keyboard. The visual display screen can be designed to take up as little or as much of the available display are as the user desires. Once the user has selected a secondary key, the key is entered into the application 776, and the interface returns to its original format.

Webpad, Tablet PCs, Web Tablets and Internet Appliances, as well as very small notebook computers can all benefit from applying the invention. The following section describes an embodiment of the invention as applied to a simple and intuitive user interface for such devices, and demonstrates how a sentence using alphanumeric, punctuation and other symbols would be entered.

The major features of this embodiment include: the user has the benefit of 10 tactile buttons distributed across the interface like a typewriter keyboard, for a familiar speedy input; the interface takes up less real estate than a large typewriter-style keyboard, and can be adapted to the devices above, without using too much of the real estate that should be reserved for the display screen, and as such the device does not need six rows of keys on its keyboard; the user does not have to look down at the buttons because the visual display area displays the key options at the top of the screen.

The buttons on the visual display screen correspond to the buttons on the entry area. However, since once a vowel is selected in the input entry area, only the associated letters in the same row are available to be pressed, it is not necessary to show all three rows of the input keys on the visual display area. As with the other embodiments described above, once a user enters the associated letter, the icons on the visual display screen can return to the vowels screen. There can also be an optional timeout for defaults, such as the option on the PDA embodiments.

Worked Example with Display Screen Feedback Implementation

In accordance with this embodiment, the middle line of the keyboard provides buttons for the vowels A, E, I, O, U, (control buttons) together with five additional blank keys distributed to the right of the vowels. The blank keys are used to provide the keys that correspond to the associated letters and that are presented upon selection of a control button. However, since in this embodiment the user does not need to take their eyes off of the visual display screen, the associated buttons do not need to have any characters on them. One alternative is that they are left blank. Another alternative is that each has a display screen on them, or each is presented as part of a display screen, such that as soon as a vowel has been entered, the associated letters each are displayed on the associated buttons, as well as on the visual display screen.

For example, a sentence can be entered using one embodiment of the interface as shown below. This embodiment includes 10 keys distributed across the interface and 3 rows of buttons. The first 5 buttons of the middle row are A, E, I, O, U. The next five buttons in the middle row can be blanks.

| Visual Display Screen | | | | | | | | | |
|---|---|---|---|---|---|---|---|---|---|
| Shft | Punc | < | 0 | > | Bsp | Enter | Up | Dwn | |
| A | E | I | O | U | ( ) | ( ) | ( ) | ( ) | ( ) |
| Ctrl | Alt | Help | \|SPACEBAR\| | β | --> | Del | Esc | | |

Since the screen of any of the above described devices is much larger than a PDA, all or some of the keyboard below can be duplicated on the visual display area, so that the user can enter characters without taking the user's eyes off of the screen. Once a user has selected a Vowel, depending on the implementation used the visual display screen can either keep all three lines or change to just showing the Vowel and Associated letters line. Some users may prefer seeing the whole keyboard displayed on the visual display area, while others would be confused with too many choices and might find having this many characters on the visual display slowing them down.

| Shft | Punc | < | 0 | > | Bsp | Enter | Up | Dwn | |
|---|---|---|---|---|---|---|---|---|---|
| A | E | I | O | U | ( ) | ( ) | ( ) | ( ) | ( ) |
| Ctrl | Alt | Help | \|SPACEBAR\| | β | --> | Del | Esc | | |

| Shft | Punc | < | 0 | > | Bsp | Enter | Up | Dwn | |
|---|---|---|---|---|---|---|---|---|---|
| A | E | I | O | U | ( ) | ( ) | ( ) | ( ) | ( ) |
| Ctrl | Alt | Help | \|SPACEBAR\| | β | --> | Del | Esc | | |

For example, the sentence: "Editing began on Mar. 10, 2002 for 98% of the work." The screen when the user selects Shift in order to capitalize the first letter appears as shown below:

| Shft | Punc | < | 0 | > | Bsp | Enter | Up | Dwn | |
|---|---|---|---|---|---|---|---|---|---|
| A | E | I | O | U | ( ) | ( ) | ( ) | ( ) | ( ) |
| Ctrl | Alt | Help | \|SPACEBAR\| | β | --> | Del | Esc | | |

| Shft | Punc | < | 0 | > | Bsp | Enter | Up | Dwn | |
|---|---|---|---|---|---|---|---|---|---|
| A | E | I | O | U | ( ) | ( ) | ( ) | ( ) | ( ) |
| Ctrl | Alt | Help | \|SPACEBAR\| | β | --> | Del | Esc | | |

After selecting Shift, the user selects the "E" twice on the keyboard to enter an "E" into the visual display area:

| A | E | I | O | U | F | G | H |
|---|---|---|---|---|---|---|---|
| E | | | | | | | |

| Shft | Punc | < | 0 | > | Bsp | Enter | Up | Dwn | |
|---|---|---|---|---|---|---|---|---|---|
| A | E | I | O | U | ( ) | ( ) | ( ) | ( ) | ( ) |
| Ctrl | Alt | Help | \|SPACEBAR\| | β | --> | Del | Esc | | |

Next, the user selects "d" by selecting "A" on the keyboard, so the visual display area displays BCD. The user selects the third key on the right-hand side or secondary input:

| Shft | Punc | < | 0 | > | Bsp | Enter | Up | Dwn |   |
|------|------|---|---|---|-----|-------|----|----|---|
| A | E | I | O | U | B | C | D |   |   |
| Ed |   |   |   |   |   |   |   |   |   |

| Shft | Punc | < | 0 | > | Bsp | Enter | Up | Dwn |   |
|------|------|---|---|---|-----|-------|----|----|---|
| A | E | I | O | U | (B) | (C) | (D) | ( ) | ( ) |
| Ctrl | Alt | Help | \|S P A C E B A R\| | β | --> | Del | Esc |   |   |

Next, the user selects "i" by selecting I on the keyboard, so the visual display area displays J, K, L, M, N. The user selects "I" twice on the keyboard:

| Shft | Punc | < | 0 | > | Bsp | Enter | Up | Dwn |   |
|------|------|---|---|---|-----|-------|----|----|---|
| A | E | I | O | U | J | K | L | M | N |
| Edi |   |   |   |   |   |   |   |   |   |

| Shft | Punc | < | 0 | > | Bsp | Enter | Up | Dwn |   |
|------|------|---|---|---|-----|-------|----|----|---|
| A | E | I | O | U | (J) | (K) | (L) | (M) | (N) |
| Ctrl | Alt | Help | \|S P A C E B A R\| | β | --> | Del | Esc |   |   |

Next, the user selects "t" by selecting O on the keyboard, so the visual display area displays P, Q, R, S, T. The user selects "I" twice on the keyboard.

| Shft | Punc | < | 0 | > | Bsp | Enter | Up | Dwn |   |
|------|------|---|---|---|-----|-------|----|----|---|
| A | E | I | O | U | P | Q | R | S | T |
| Edit |   |   |   |   |   |   |   |   |   |

| Shft | Punc | < | 0 | > | Bsp | Enter | Up | Dwn |   |
|------|------|---|---|---|-----|-------|----|----|---|
| A | E | I | O | U | (P) | (Q) | (R) | (S) | (T) |
| Ctrl | Alt | Help | \|S P A C E B A R\| | β | --> | Del | Esc |   |   |

Next, the user selects "i" by selecting I on the keyboard, so the visual display area displays J, K, L, M, N. To enter "i" The user selects "I" a second time on the keyboard.

| Shft | Punc | < | 0 | > | Bsp | Enter | Up | Dwn |   |
|------|------|---|---|---|-----|-------|----|----|---|
| A | E | I | O | U | J | K | L | M | N |
| Editi |   |   |   |   |   |   |   |   |   |

| Shft | Punc | < | 0 | > | Bsp | Enter | Up | Dwn |   |
|------|------|---|---|---|-----|-------|----|----|---|
| A | E | I | O | U | (J) | (K) | (L) | (M) | (N) |
| Ctrl | Alt | Help | \|S P A C E B A R\| | β | --> | Del | Esc |   |   |

Next, the user selects "n" by selecting I on the keyboard, so the visual display area displays J, K, L, M, N. To enter "n" The user selects "N" on the keyboard.

| Shft | Punc | < | 0 | > | Bsp | Enter | Up | Dwn |   |
|------|------|---|---|---|-----|-------|----|----|---|
| A | E | I | O | U | J | K | L | M | N |
| Editin |   |   |   |   |   |   |   |   |   |

| Shft | Punc | < | 0 | > | Bsp | Enter | Up | Dwn |   |
|------|------|---|---|---|-----|-------|----|----|---|
| A | E | I | O | U | (J) | (K) | (L) | (M) | (N) |
| Ctrl | Alt | Help | \|S P A C E B A R\| | β | --> | Del | Esc |   |   |

Next, the user selects "g" by selecting E on the keyboard, so the visual display area displays F, G, H. To enter "g" The user selects "G" on the keyboard.

| Shft | Punc | < | 0 | > | Bsp | Enter | Up | Dwn |   |
|------|------|---|---|---|-----|-------|----|----|---|
| A | E | I | O | U | F | G | H |   |   |
| Editing |   |   |   |   |   |   |   |   |   |

| Shft | Punc | < | 0 | > | Bsp | Enter | Up | Dwn |   |
|------|------|---|---|---|-----|-------|----|----|---|
| A | E | I | O | U | (F) | (G) | (H) | ( ) | ( )) |
| Ctrl | Alt | Help | \|S P A C E B A R\| | β | --> | Del | Esc |   |   |

Entry continues as described above by selecting additional characters, spacers, and punctuation, etc. When entering a number, two methods can be used. The first method is to use a number slider on the keyboard. In accordance with this method, the user selects "1" by scrolling down on the numbers slider of the keyboard, so the visual display area displays the number 1. To enter "1" The user selects "1" on the middle of the slider.

| Shft | Punc | < | 0 | > | Bsp | Enter | Up | Dwn |
|------|------|---|---|---|-----|-------|----|----|
| A | E | I | O | U | F | G | H | |

Editing began on March 1

| Shft | Punc | < | 0 | > | Bsp | Enter | Up | Dwn |
|------|------|---|---|---|-----|-------|----|----|
| A | E | I | O | U | (F) | (G) | (H) | ( ) ( )) |
| Ctrl | Alt | Help | \|S P A C E B A R\| | β | --> | Del | Esc | |

The second method is to enter a number, by going to the numeric screen by selecting Shift and the middle button of the slider. Next, the user selects "1" by scrolling down on the numbers slider of the keyboard, so the visual display area displays the number 1. To enter "1" The user selects "1" on the middle of the slider.

| Shft | Punc | < | 1 | > | Bsp | Enter | Up | Dwn |
|------|------|---|---|---|-----|-------|----|----|
| 0 | 1 | 2 | 3 | 4 | 5 | 6 | 7 | 8 | 9 |

Editing began on March 1

| Shft | Punc | < | 0 | > | Bsp | Enter | Up | Dwn |
|------|------|---|---|---|-----|-------|----|----|
| A | E | I | O | U | (F) | (G) | (H) | ( ) ( )) |
| Ctrl | Alt | Help | \|S P A C E B A R\| | β | --> | Del | Esc | |

Cellular Telephone Implementation

Figure 30:
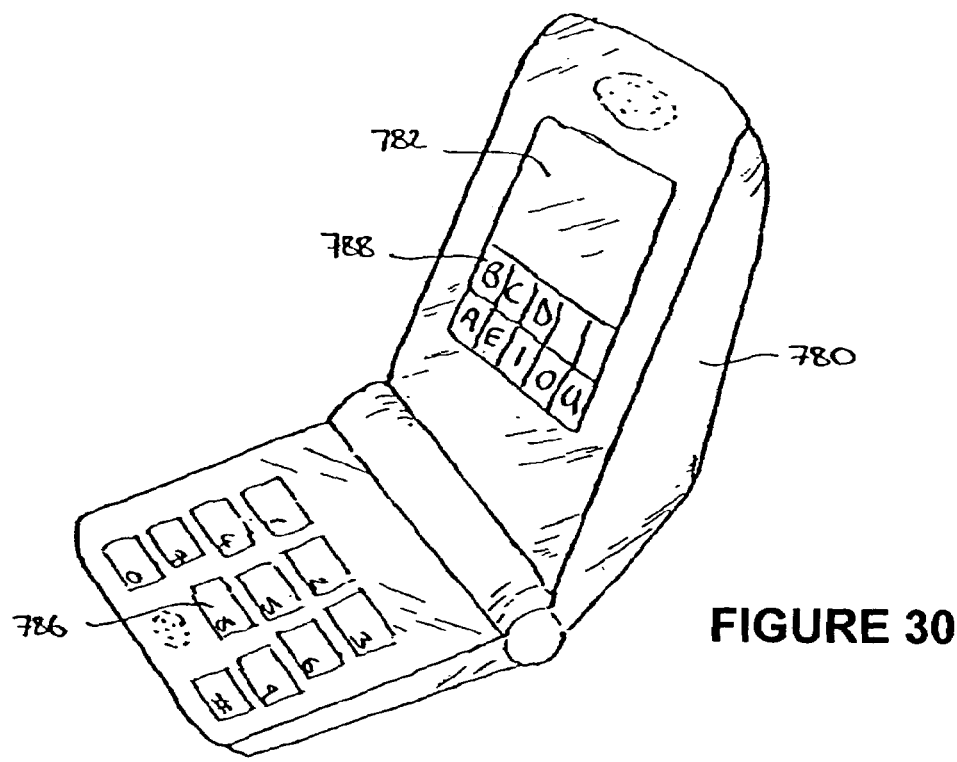
FIG. 30 illustrates a cell phone embodiment of the invention.

FIG. 30 illustrates an additional embodiment of how the invention can be used in conjunction with, or incorporated into, a cellular telephone device. As shown in FIG. 30, a cellular telephone device 780 which includes a display screen 782 may be used to provide an embodiment of the invention that allows the user to quickly enter data into the cellular telephone, for example, to look up or enter telephone numbers and contact information. As shown in FIG. 30, the cellular telephone device includes a set of control keys 784, which in this implementation are provided as hard keys, although it will be evident that the control keys can also be incorporated as "soft" keys into the telephone's display or touch-sensitive interface. An additional or secondary key selection mechanism 788 is displayed on the interface 782. Using the control keys 784 and/or a selection of the key selection mechanism 788, the user is quickly able to enter data into the device without using a full sized keyboard. The standard numeric keyboard typically used to enter numeric information into the cellular telephone 786 may also be used as a form of control button mechanism for use as control buttons in key selection.

Figure 31:
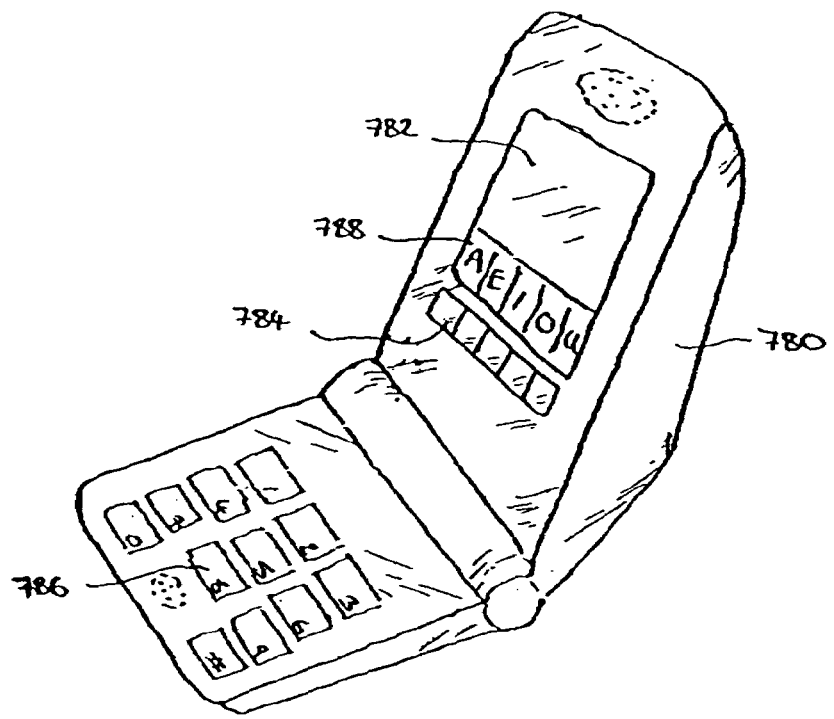
FIG. 31 illustrates an alternate embodiment in which the primary control mechanism is represented as a single row of characters

FIG. 31 illustrates an alternate embodiment in which the primary control mechanism is represented as a single row of characters 788, including the keys "A", "E", "I", "O" and "U", by which the user can enter data into the device. Optionally a set of hard control keys or characters 784 can be used to select keys.

Figure 32:
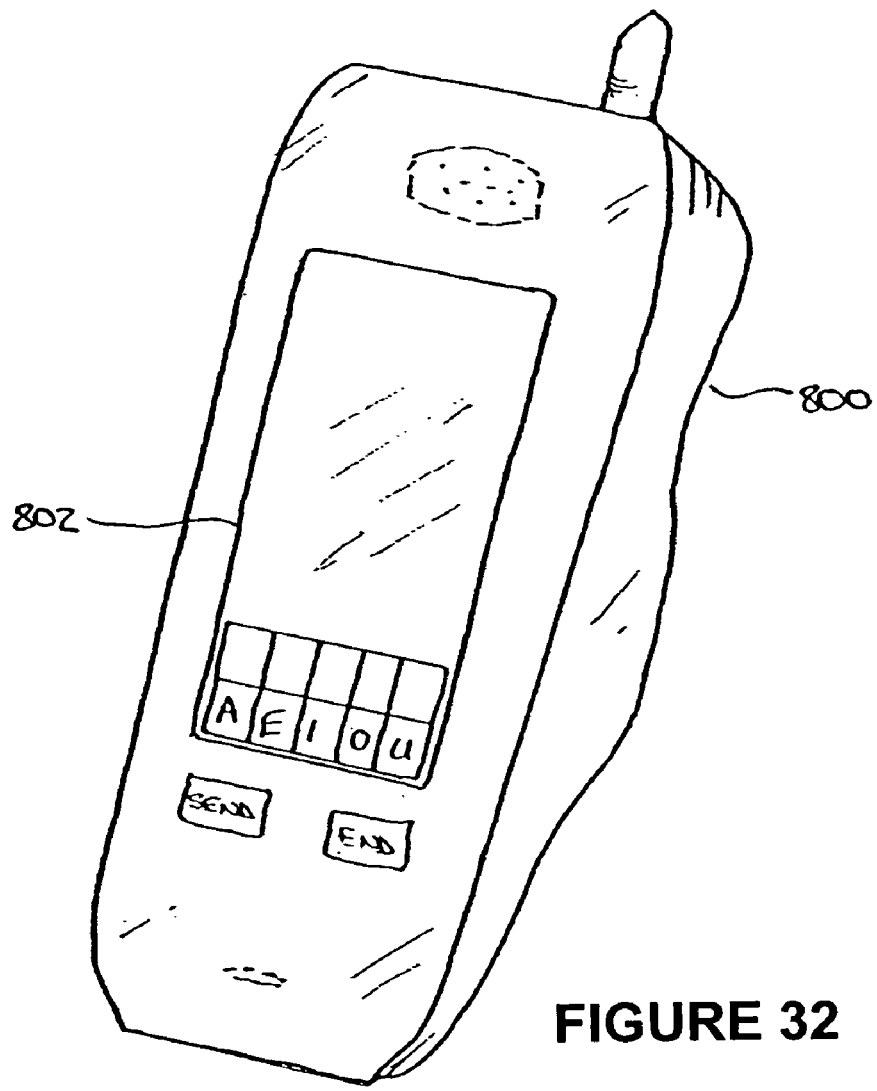
FIG. 32 illustrates an alternate embodiment of the cellular phone implementation in which the regular keypad has been disposed of altogether.

FIG. 32 illustrates a further embodiment of the cellular phone implementation 800 in which the regular keypad has been disposed of altogether. In the example shown in FIG. 32, instead of a regular keypad for use in entering data, the front of the phone is replaced with a touch screen interface 802 in accordance with an embodiment of the invention.

Implementation using Braille Keys

Some embodiments of the invention may include textured (for example Braille) control and/or secondary buttons to assist those with vision disabilities to enter data using the interface. In accordance with one embodiment, the interface may include five hard buttons for vowels, with each button indicating the character in Braille or in some other raised character providing a tactile feel. Five associated button, also having a Braille or similar tactile feel can optionally be provided in the same row. In one implementation that mimics the Webpad embodiment described above, 10 hard buttons are provided across the interface, the first five hard buttons which represent the vowels having a raised symbol for the vowel represented, so that a person who does not have his or her sight would be able to feel the raised portion of the button. Upon feeling each of the five buttons, such a person would know which button is associated with which vowel.

| RAISED | ASSOCIATED |
|--------|-----------|
| (A) (E) (I) (O) (U) | ( ) ( ) ( ) ( ) ( ) |

Upon physically feeling a vowel button with a raised character (such as a raised Braille character for the letter A) to indicate the button, the user is presented with the Associated Letters associated with, in this instance, the letter A. It will be evident that this is a similar mechanism as described above with respect to the Webpad embodiment, and with respect to the miniature-display interface in Figures the key distinction being that the secondary keys present a tactile change, rather than a visible change.

| RAISED | ASSOCIATED |
|--------|-----------|
| (A) (E) (I) (O) (U) | (B) (C) (D) ( ) ( ) |

The user learns through use that there are only three choices (B, C, D) once the raised letter A has been selected. With the intuitive grouping of the letters associated with A, it is clear to the user that to enter the letter B, the user must select the first hard button for the associated letters. Selecting the first hard button of the Associated Letters enters the letter on the screen or storage. The user can press any of the raised vowel keys twice to enter the desired vowel. Selecting a vowel key with a raised letter brings up the ability to enter an Associated letter by knowing the sequence of Associated Letters. For the A button, the sequence is B, C, D; For the E Button, the sequence is F, G, H; for the I button the sequence is J, K, L, M, N; for the O button the sequence is P, Q, R, S, T; and for the U button, the sequence is V, W, X, Y, Z An alternate embodiment for the raised letters or Braille characters includes five Hard buttons for vowels with raised Braille or other raised character indicating through a tactile feel what each such vowel button is. Upon selecting one of the five hard buttons with a raised character, the user can enter the Associated letter by using one of the same five buttons. It will be evident that this is again a similar mechanism as described above with respect to the Webpad embodiment, and with respect to the miniature-display interface in Figures the key distinction being that the secondary keys present a tactile change, rather than a visible change.

R A I S E D
(A) (E) (I) (O) (U)

The user learns through use that selecting a vowel key with a raised letter brings up the ability to enter an Associated letter by knowing the sequence of Associated Letters. For the A button, the sequence is B, C, D; For the E Button, the sequence is F, G, H; for the I button the sequence is J, K, L, M, N; for the O button the sequence is P, Q, R, S, T; and for the U button, the sequence is V, W, X, Y, Z. For instance to enter an A the user can press the A Button twice.

R A I S E D
(A) (E) (I) (O) (U)

To enter an R, the user can press the O (4th) button which has the raised Braille or other character once and then the R (3rd) button to enter the letter R To enter the letter F, the user can press the E (2nd) button once and then press the first button once to enter the letter F.

Implementation using Audio Feedback

In an alternative embodiment, the device may include the capability to provide audible feedback, such that for each letter entered, the device sounds out that letter or character to assist a user who has poor or no sight. This can be an optional setting that can be switched on or off. Many PDA and other electronic devices today have sound and volume capability.

Implementation using Joystick Device

Figure 33:
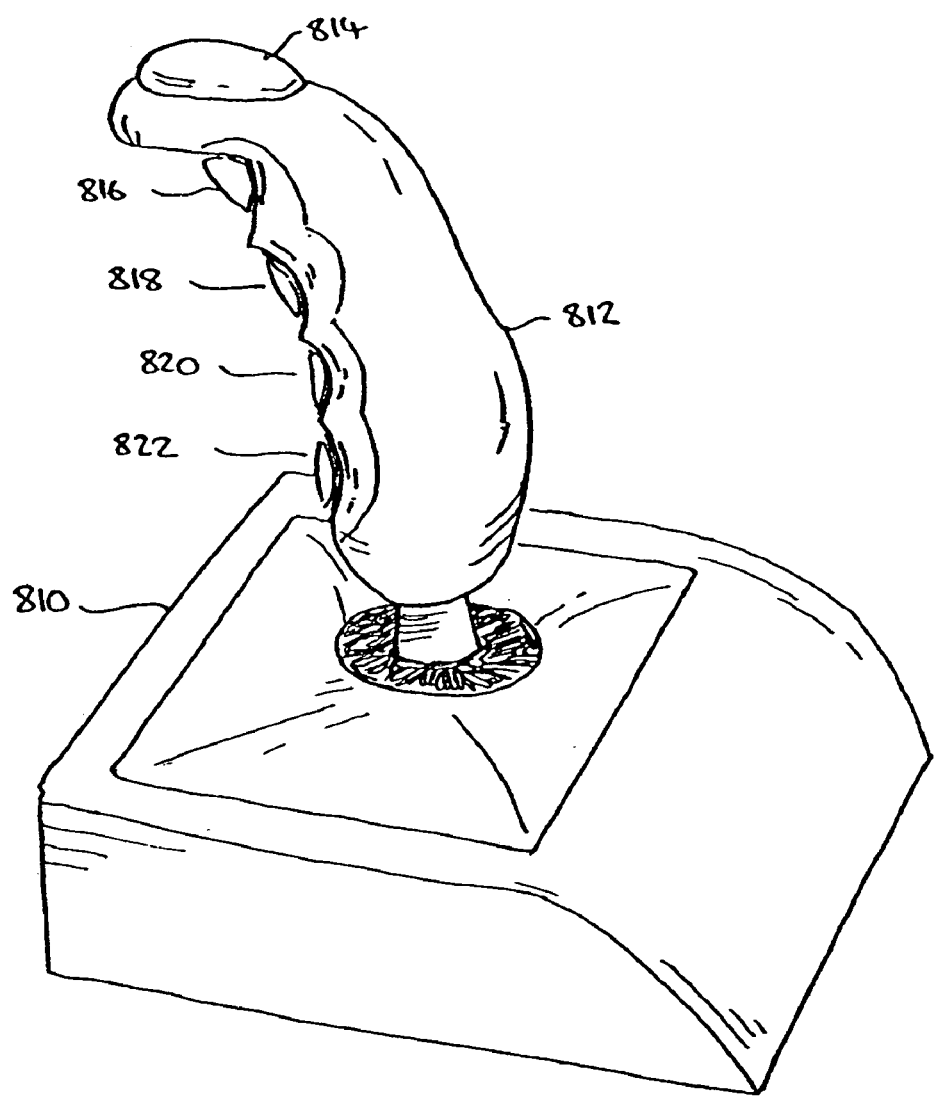
FIG. 33 illustrates a joy stick input mechanism that can be used with an embodiment of the invention to enter characters into a device such as a computer system, or into an application running on the device.

Another embodiment allows for a joystick type of device or two joystick shaped handles attached to each other on one device, each for one hand. FIG. 33 illustrates a joystick input mechanism 810 that can be used with an embodiment of the invention to enter characters into a device such as a computer system, game device, Interactive Television, PDA, Cell phone, Web Tablet, avionics equipment, digital binoculars, digital remote control, steering device, simulator, Internet appliance, or into an application running on such devices. The joystick input mechanism is particularly useful for people who have problems using a regular keyboard, or who have other disabilities that prevent them from using a regular keyboard. In operation the joystick mechanism operates in a similar manner to a regular keyboard mechanism in that the operator first selects a particular control keys and then selects one of the secondary buttons or keys associated with that control key. The device of FIG. 33 can be used with a visual feedback mechanism such as found with the Web pad embodiment described above, such that when a user selects one of the control keys, the available secondary keys associated with that control key are displayed on the users screen for further selection by the user. The joystick 810 has one button 814 on top for the thumb and four buttons 816, 818, 820, 822 on the column 812 for pressing by each of the other four fingers. The ergonomic grip has the buttons placed to suit the shape of the fingers like a joystick. Joysticks usually have an indentation for each finger to rest comfortably and for the tactile feel of knowing exactly where each button is resting. In other words, the joystick type of grip has a button placed comfortably for the thumb on top and for each of the fingers to correspond with the index finger button 816 being the E, the middle finger button 818 being the I, the fourth finger button 820 being the O and the little finger button 822 being the U. An alternative may be for the thumb gripping the column rather than the top of the joystick.

Holding either one or two of these joystick grips allows the system and method provided by the interface of the invention to be extended for use with physical devices. For instance, an A can be formed by the thumb pressing twice on the A button on top. A B can be formed by pressing an A button with the thumb and the Associated B button is pressed by using the index finger to actually enter the letter B. Similarly, the letter J is entered by gripping with the middle finger button to select the I and then pressing with the thumb to select J, since J is the first in the subset of Associated letters for the I button. This embodiment is also useful for gripping a joystick in each hand and for the Braille embodiment set forth above.

Where a user has one joystick in each hand, the first joystick can have the vowels on it, in the sequence of thumb=A, index finger=E, middle finger=I, fourth finger=O and little finger equals U; while the second joystick the thumb=Shft, the index finger=punc, the middle finger=Space, the fourth finger=Backspace and the fifth finger has another button for other functions.

The joysticks may be connected in one device for use by both hands (like an accordion has buttons for two hands) or each joystick may be separate. In either case the joysticks would be connected by wire or wirelessly with each other and with the device that contains the memory, storage and display screen. Without limitations, wireless conductivity could be by Bluetooth, 802.11 or any other wireless standard. This embodiment is also useful with devices where the user is looking at a display screen, eyeglasses with display screens, periscope, goggles, nightvision goggles, or through binoculars where such devices or equipment is right up against the user's face and the user cannot look away to enter information. In these instances the user can grip the joystick with both hands while looking into or though such devices and simply enter information through the joysticks without looking away.

Implementation using Virtual Glove

An additional embodiment discussed herein is the user of a virtual glove with sensors that senses the movement of each finger. All of the aspects of the joystick set forth above are applicable to the glove with sensors (electronic, mems). The Vowels glove could be put on either hand depending on the choice of the user. The other glove serves just like the second joystick in the example above. Once user has put on the vowel glove, whenever the user moves the thumb, this selects the associated letters for the vowel A. Moving the index finger selects the associated letters for the vowel E. It is just like the joystick embodiment. The gloves also communicate by wire or wirelessly through Bluetooth, 802.11 or any wireless standard to implement the REDI concept.

Numeric Keypad Implementation

Figure 34B:
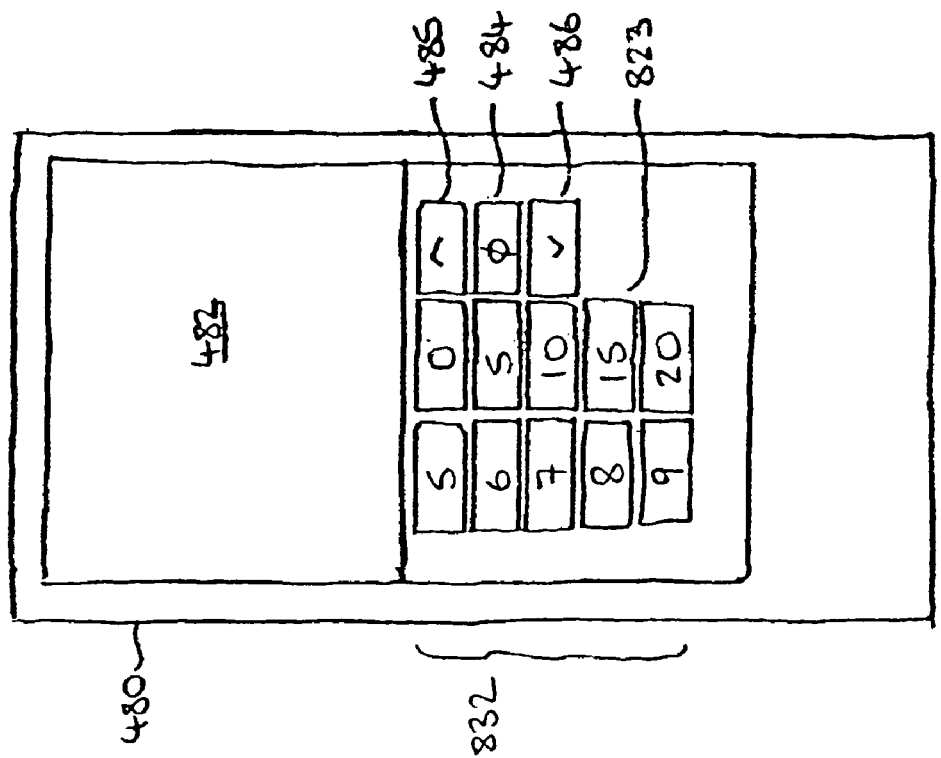
FIGS. 34A and 34B illustrate alternate embodiments of the invention, in which the control buttons and selection keys are used to provide a numeric input.
Figure 34A:
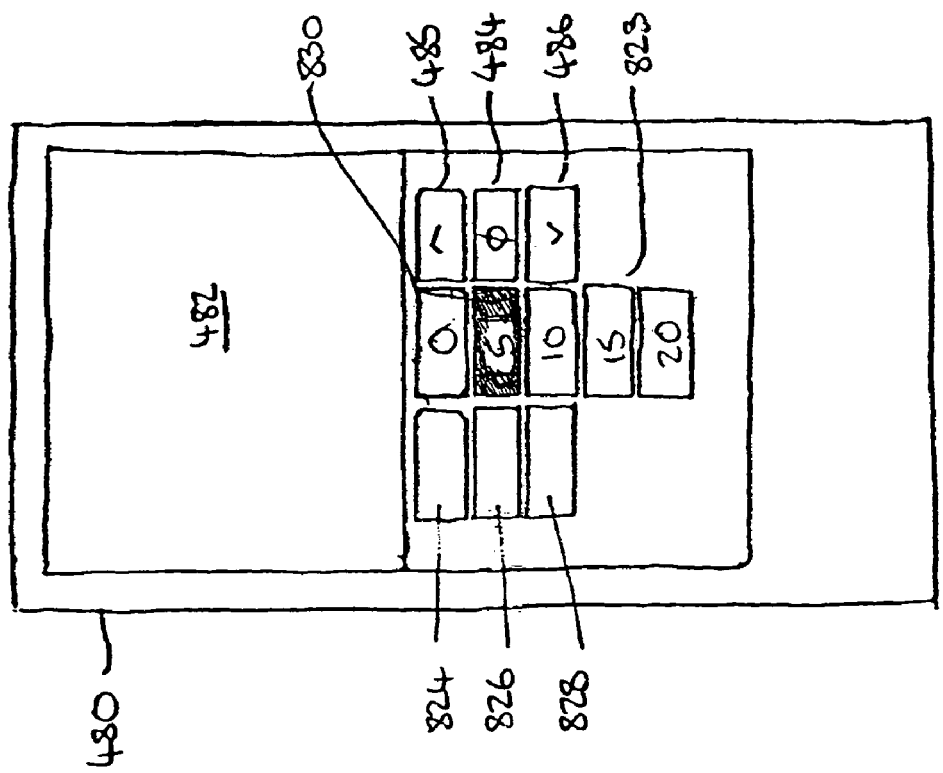

It will be evident that the invention is not limited to text-based control and secondary key input. FIGS. 34A and 34B illustrate alternate embodiments of the invention, in which the control buttons and selection keys are used to provide a numeric input.

This type of input mechanism may be useful in, for example, entering the time on an alarm clock, electronic, computing, entertainment or communicating device, or for programming a VCR or making a selection of video, audio or other programming, or for entering numbers onto forms or spreadsheets. As shown in FIG. 34A, a sequence of numbers 823 is substituted for the sequence of letters A, E, I, O, U, using for example the mapping shown below:

| Control | Secondary |
| --- | --- |
| 0 | 0, 1, 2, 3, 4, |
| 5 | 5, 6, 7, 8, 9 |
| 10 | 10, 11, 12, 13, 14 |
| 15 | 15, 16, 17, 18, 19, |
| 20 | 20, 21, 22, 23, 24, |

An additional set of buttons 824, 826, 828 (indicated as blank buttons here) can act as additional function or control buttons or can be used as secondary buttons. Pressing a control button 830 brings up a set of Secondary Buttons associated with that button, as shown in FIG. 34B. Selecting a Secondary Button inputs that number. For example, if the user or operator wants to type the number 6—the user selects the control button 830 for 5 and then the Secondary buttons 832 are displayed, including the numbers 5, 6, 7, 8, 9. The user then presses the 6 button to enter it. If the user wants to press five, (since 5 is a control button) the user has a choice of either pressing the 5 button twice on the Control button screen or pressing the 5 on the control button screen and pressing it again on the Secondary Button Screen.

This mechanism can be used for example in programming an alarm clock or VCR etc. Setting the time: The Five control button scenario above is sufficient to set an alarm clock, VCR, Video device, audio device, Point of Sales terminal, touch screen, PDA, Cell phone etc for a twenty four hour day.

Setting the time for 6:27:

| Control | Secondary |
| --- | --- |
| 5 | 6 |
| 0 | 2 |
| 5 | 7 |

Setting the clock at 5:55

| Control | Secondary |
| --- | --- |
| 5 (six times) | |
| or | |
| 5 | 5 |
| 5 | 5 |
| 5 | 5 |

The above methodology demonstrates how any well known standardized sequence of characters, each is predictive of a subset of other well known sequence of characters, can be used to provide a data and information input mechanism.

Additional Variations and Implementations

While the embodiments described above illustrate the variety of implementations that may incorporate or use the invention, many other variations can be implemented, including but not limited to the following:

The vowel screen can be displayed with vowels arrayed in a column (vertical) whereupon choosing a vowel, the associated letters appear arrayed also in a column either to the left or right of the vowels column, while the vowels column remains on the screen.

The vowel screen can be displayed with vowels arrayed in a column (vertical) where upon choosing a vowel, the vowel screen disappears and is replaced by the associated letters arrayed in a column.

The vowel screen can be displayed with vowels arrayed in a row (horizontal) where upon choosing a vowel, the associated letters appear also arrayed in a row either above or below the row of vowels, while the vowels row remains on the screen.

The vowel screen can be displayed with vowels arrayed in a row (horizontal) either above or below the row of vowels, while the vowels row disappears and is replaced by the associated letters arrayed in a row.

The interface can include two rows on a first screen each with six on screen keys, a first screen with one row for vowels and an additional punctuation on screen button, and a second row for caps, backspace, space, and numbers slider appearing on the second row above the vowels row.

The interface can include 6 buttons in each row so that it can accommodate the punctuation button on the same row as the vowels, and include the caps, space, backspace and three slider buttons on the second row of the first screen (vowel screen).

In some implementations, before the user presses a vowel, the second row (the upper row) displays caps, space, backspace, and the three buttons for the numbers slider, while the lower row is for the 5 vowels and the punctuation button. Once the user inputs a vowel, the upper row characters are replaced with the letters associated with the vowel that was selected by either a finger or a stylus.

The purpose of the numbers slider is to permit easy input of alphanumeric information without needing to switch to another screen with an on-screen keyboard and then switch back. This is useful for entering addresses for instance (1234 Main Street). The slider or scroll bar has a key for scrolling down (left) and a key for scrolling up (right) and a on screen key in the middle that shows the number to be selected. Upon selection of that number, the number is entered as described in the documents above.

Touching the punctuation button (on the same row or column as the vowels, brings a new screen with a list of common punctuation characters, such as period, comma, question mark, colon, @, backslash, apostrophe, right parenthesis, left parenthesis, etc.

Layouts can be chosen to be suited for entry alternatives that require the vertical (column) of vowels and associated letters to appear in different places on the screen. A right handed person may want the vowels arrayed in the right edge of the device with the additional column (functions such as caps, backspace, space, numbers slider) or the associate letters immediately to the left or alternatively with the vowels disappearing. This would give the right-handed person the possibility of holding the device in his right hand and inputting using the same hand. A left handed person may want the vowels on the left edge in a column with all the features above reversed, so that such person can hold the device and input with the left hand. If the vowels are arrayed in the middle, the functions column and associated letters column may appear to the left or to the right depending on whether the person is left or right handed.

The interface can also be used to provide a mechanism for quickly browsing or searching indexed data structures or applications. For example, the interface can be readily implemented with a contacts book or electronic Rolodex-like application to allow a user to use the combination of control key and secondary key input to quickly move to a set of entries beginning with a particular character or numeral, or to quickly move to a set of entries intuitively grouped or collected together under a single icon.

INDUSTRIAL APPLICABILITY

Several features and benefits of the invention can be seen from considering the embodiments described above. Some of these benefits include, but are not limited to, the following:

Faster Speed of Data Entry

The system and method provided by the invention allows for rapid entry of data. "Two Finger typists" type this way already using two hands. Bookkeepers are used to entering numbers rapidly because they have a device with a limited number of keys located near each other. The elegant solution provided by the invention means that two finger typists do not have to hunt and peck. They have a limited ergonomically small area with a limited set of characters all of which are set close enough to each other that the user does not have to pick up his or her hand to enter characters. Just like guitar or banjo players who use the thumb, index finger and middle finger to rapidly pick strings located near each other in a limited area, the invention provides an interface in which the characters are close to each other. Any combination of the index finger and middle finger, or thumb and middle finger, or thumb and index finger are ergonomic. There is no hunting around a keypad or keyboard or confirming that handwriting recognition has captured the input. A one finger typist can do word processing fast with two fingers. This method and system can transform cell phones, PDAs, digital remotes etc. into fast instant messaging and word processing platforms.

Increased Accuracy

When using the invention, there is no waiting to see if a predictive keypad text entry is correct and changing to another word if the predictive entry is incorrect. Similarly, there is no struggle with handwriting recognition. Traditional miniature keyboards are cumbersome and inaccurate and generally poorly sized for adult males. With the invention, the characters can be programmable to reverse the columns for left-handed users. All users can benefit from ergonomic layout of choosing from a short list of characters distributed in single or multiple columns (or rows) and capable of being used with one hand, one finger or a stylus.

Greater Ease of Input

The grouping and proximity of associated letters and small set of letters to choose from make it very easy to input, and requires no hunting around for letters of a keyboard or alphanumeric keypad. The user's eyes and hands do not need to wander around a keyboard, and their fingers do not need the exactness and dexterity of tedious existing methods. It will be evident that other features can be provided to assist the user or operator with ease of editing. For example, a user can utilize hardware, such as a jog wheel, to scroll up or down, or they use an on screen interface either by way of an onscreen scrolling icon or by pointing to a particular line. For instance, some implementations may provide both an onscreen arrow after several lines have been typed and a shift-down arrow to move one or more lines down. Other implementations may include the ability to move the cursor by pointing at a letter that has already been typed and then correcting by backspacing or spacing.

Intuitive User Interface

The proximity of letters appearing on the screen and following vowels is instinctive from pre-elementary school.

Applicability to Other Languages

Implementations of the invention can be modified so that any characters can be entered to accommodate numerous languages. No predictive text entry needs to be fashioned for different languages.

Convenient Keyboards for Mobile and Desktop

This technology is applicable to cell phones, digital remote controls, computers, interactive TV, Web pads, wireless keyboards, Internet appliances, PDAs, handhelds etc.

Space Saving Design to Maximize Viewing Area

Unlike any other system, the user interface provided by the invention can be distributed within a very limited space, leaving room for the user to have as much display screen space as possible. The input area is small. Potentially keypads can be eliminated.

Ergonomic Layout

The interface described by the invention is more ergonomic than a on-screen keyboard. The typewriter and computer keyboard have demonstrated that handwriting is sub-optimal. There is no need for a cumbersome folding keyboard.

Device Memory Saving

No need for an extensive handwriting or predictive text program.

Manufacturer Cost Savings

This touchscreen method and additional embodiments should remove the need for alphanumeric keypads. For millions of people who type on a computer keyboard with two fingers this is much faster than actually typing while searching for keys from a whole keyboard. A user on a device equipped with this proprietary technology can use the index finger and middle finger (or thumb and index finger) very rapidly to input. Another very easy, rapid and accurate means is using both index fingers, one for the primary short list of characters and the other for the Secondary or Associated list of characters. Also, with a stylus, a user can rapidly input without having to roam a whole on-screen keyboard. There is no need for an extraneous and expensive cell phone type of alphanumeric button keypad or QWERTY keyboards.

Medical Applications

Physicians are notorious for poor penmanship and their need to input prescriptions quickly. Increasingly the medical profession is moving to portable text entry for which this invention is very useful.

Ability to Work with Predictive Text Entry

If desirable, the Invention can be coupled with predictive word entry.

Disabled Users

Users with disabilities, who can not communicate using penmanship or hunting for keys on a keyboard, especially a smaller one, will find choosing one character out of two columns or two rows very easy.

Left-handed Users

This Invention can be a boon for left handed users in that the columns can be switched. Alternatively, instead of columns, the user can choose a row across the bottom of the device.

In summary, the invention is intuitive, easy to learn, accurate, consistent, efficient, effective, easy and rapid entry, and creates a real information entry platform on a small electronic device. It can replace inefficient input methods as the preferred mode of input of information, while doing so on a small electronic device. Although a touch-sensitive screen is used frequently herein as exemplary, it is to be understood that any on-screen keyboard could be easily substituted and is contemplated. For instance, in most of the embodiments discussed above, the touch-sensitive display could be replaced with an on-screen keyboard that is activated by a pointing device, such as a stylus, pen, pointer, mouse, touch pad, heat device, light device, laser, wand, or infrared, radio, or sound signals. In some embodiments of the present invention, the device has the capability of communicating with other computing devices for, among other things, transferring, receiving, synchronizing, and storing information. Such communication may be made using, for example, infrared, radio frequencies, other wireless communication medium, cable or twisted-pair. Additionally, some embodiments may have a microphone and a speaker which can be used with, or in place of, the buttons, on-screen display, or touch-sensitive display for input of information and to record, store, and play back audio information.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A portable information or data device that allows a user to input data in the form of text or other information as a series of characters, text, numbers, punctuation, or other symbols, comprising:
   a touch sensitive screen for entry and display of the data;
   a plurality of control buttons within a region of the touch sensitive screen, and accessible by the touch of the screen, wherein each of said control buttons is associated with a single datum and with a set of secondary data entry buttons;
   a plurality of secondary data entry buttons, that replace some or all of the plurality of control buttons on the touch sensitive screen when one of the control buttons is selected, wherein each secondary data entry button represents a single datum; and,
   wherein the user can first select a control button, followed by selection of any of the secondary data entry buttons associated with that control button, to enter the represented datum into the portable information or data device and wherein said control buttons and said secondary data entry buttons represent all the letters of the alphabet and fewer than all such letters being displayable on said touch sensitive screen at any one time.

2. The portable information or data device of claim 1, wherein the plurality of secondary data entry-buttons replace only some of the control buttons.

3. The portable information or data device of claim 1, wherein the text, characters, numbers, and symbols entered appear on the touch sensitive screen and/or on a separate display area of the device.

4. A method of using a portable information or data device that allows a user to input data such as text or other information as a series of characters or other symbols, comprising the steps of:
   providing a touch sensitive display screen for entry and display of the data including a plurality of control buttons arranged within a region of the touch sensitive display screen, and accessible to the user by touch of the screen, wherein each of said control buttons is associated with a single datum and with a set of secondary data entry buttons;
   receiving by touch of the screen a user selection of one of said control buttons;
   displaying on said touch sensitive display screen, in response to said user selection of one of said control buttons, a secondary data entry input including a plurality of secondary data entry buttons, wherein each said secondary data entry button represents a single datum that by touch of the screen can be input into the system;
   receiving a user selection of one of said secondary data entry buttons; and
   entering into the portable information or data device the datum represented by the selected secondary data entry button.

5. The method of claim 4, wherein the control buttons are comprised respectively of the vowels A, E, I, O, U, and the secondary data entry buttons for each such vowel are the consonants following each of said vowels and preceding the next vowel in the alphabet.

6. A method, according to claim 5, further comprising displaying, in response to selective user inputs, all the letters of the alphabet on the touch sensitive display screen, in which fewer than all the letters are displayed at any one time.

* * * * *